United States Patent
Coutts et al.

(10) Patent No.: US 6,311,165 B1
(45) Date of Patent: Oct. 30, 2001

(54) TRANSACTION PROCESSING SYSTEMS

(75) Inventors: Michael G. Coutts, Birkhill; Lee G. Dove, Coupar Angus, both of (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/229,045

(22) Filed: Jan. 12, 1999

(30) Foreign Application Priority Data

| Apr. 29, 1998 | (GB) | 9808995 |
|---|---|---|
| Apr. 29, 1998 | (GB) | 9808997 |
| Jul. 25, 1998 | (GB) | 9816178 |

(51) Int. Cl.[7] .................................................. G06F 17/60
(52) U.S. Cl. ........................ 705/21; 235/379; 710/1; 710/8; 705/43
(58) Field of Search ...................... 705/8, 43, 21; 235/379, 380; 902/9, 11, 12, 40, 39; 700/244, 241; 710/1, 8

(56) References Cited

U.S. PATENT DOCUMENTS

| 4,179,735 | 12/1979 | Lodi ..................................... 713/100 |
| 4,621,326 | * 11/1986 | Rawlins ................................ 364/408 |
| 4,660,168 | 4/1987 | Grant ..................................... 705/8 |
| 4,775,931 | * 10/1988 | Dickie et al. .............................. 710/9 |
| 4,917,792 | 4/1990 | Murakami ............................ 209/534 |
| 4,922,419 | 5/1990 | Ohashi et al. ......................... 705/43 |
| 5,537,626 | * 7/1996 | Kraslavsky et al. ................... 395/828 |
| 5,659,801 | 8/1997 | Kopsaftis ............................... 710/62 |
| 5,737,585 | 4/1998 | Kaneshima ............................. 703/20 |
| 6,195,694 | * 2/2001 | Chen et al. ............................ 709/520 |
| 6,196,456 | * 3/2001 | Taylor ................................... 235/379 |

FOREIGN PATENT DOCUMENTS 9602034   1/1996  (WO) .

OTHER PUBLICATIONS

Sachs, M. W. et al. "Fibre Channel and Related Standards." IEEE Communications Magazine. Aug. 1996. pp. 40–50.*
Sachs, M. W. et al. "LAN and I/O Convergence: A Survey of the Issues." Computer. Dec. 1994. pp. 24–32.*

* cited by examiner

Primary Examiner—Tariq R. Hafiz
Assistant Examiner—Leslie K. Nguyen
(74) Attorney, Agent, or Firm—Gates & Cooper LLP

(57) ABSTRACT

A banking, retail or other transaction network can comprise a number of terminals, for example an ATM, where each terminal comprises a plurality of peripheral devices such as a user interface, card reader, receipt printer and cash dispenser. The applications software for the peripheral devices can be held in a central server located externally of the terminal and linked to the terminal through a communications link. The link can extend to the individual peripheral devices so that they are direct clients of the server. Additionally the individual peripheral devices can be connected to each other over the link to enable them to communicate directly with each other on a peer-to-peer basis. Each peripheral can have an independent control application. In use, the independent control applications may communicate with each other so that a peripheral operates in response to a signal generated by another peripheral. A peripheral for use in such a terminal, and a network of such terminals are also described. A mainframe or server computer accessing a banking or other information database (e.g., a legacy host) can be connected to the central server through an information signal connection.

42 Claims, 37 Drawing Sheets

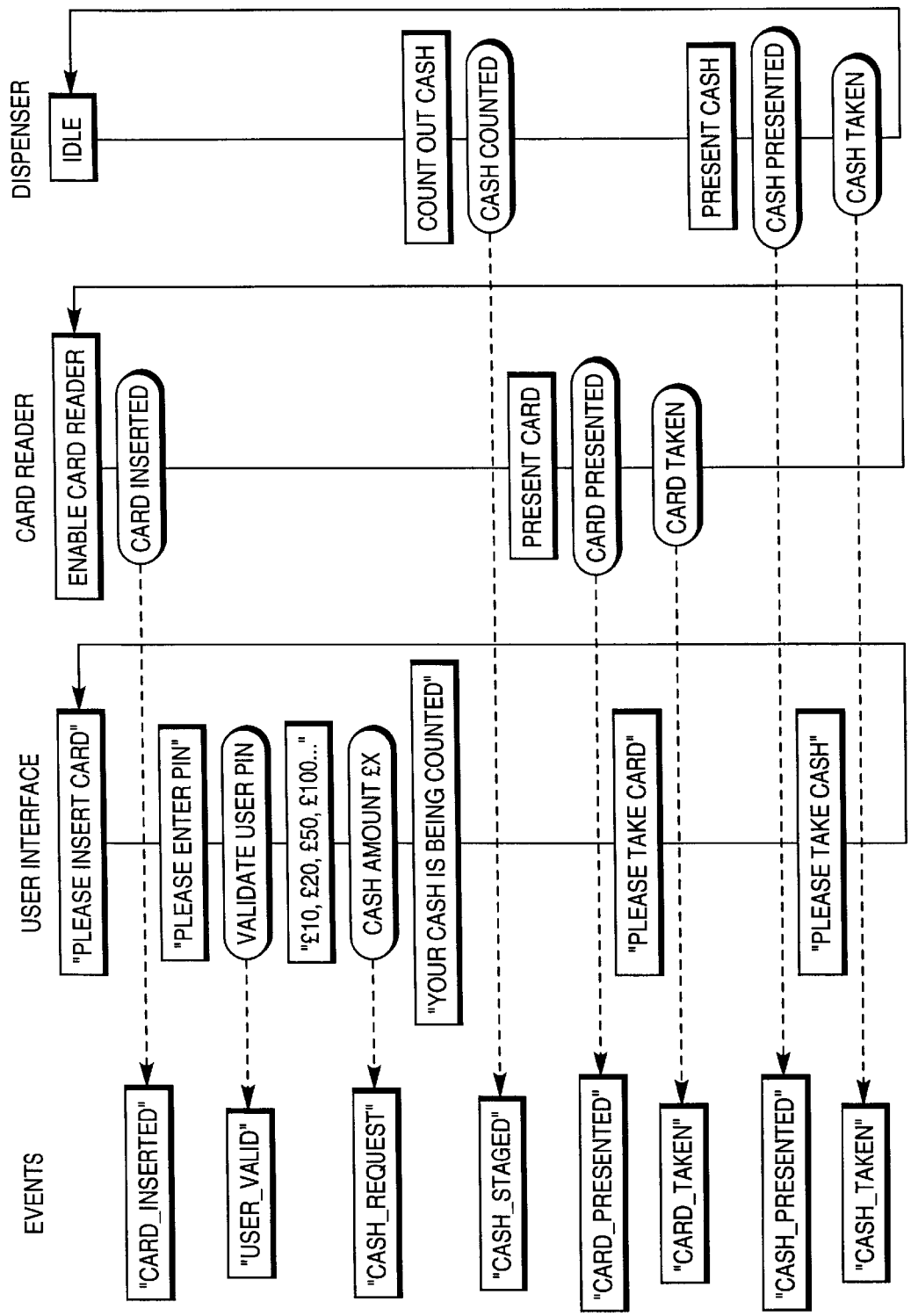

FIG. 6
PRIOR ART
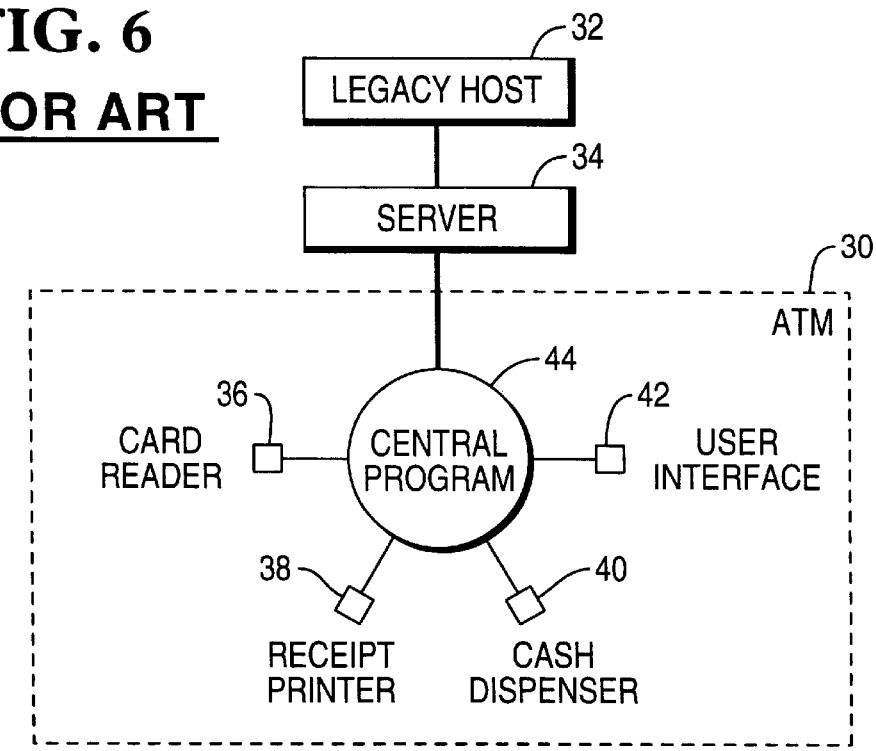
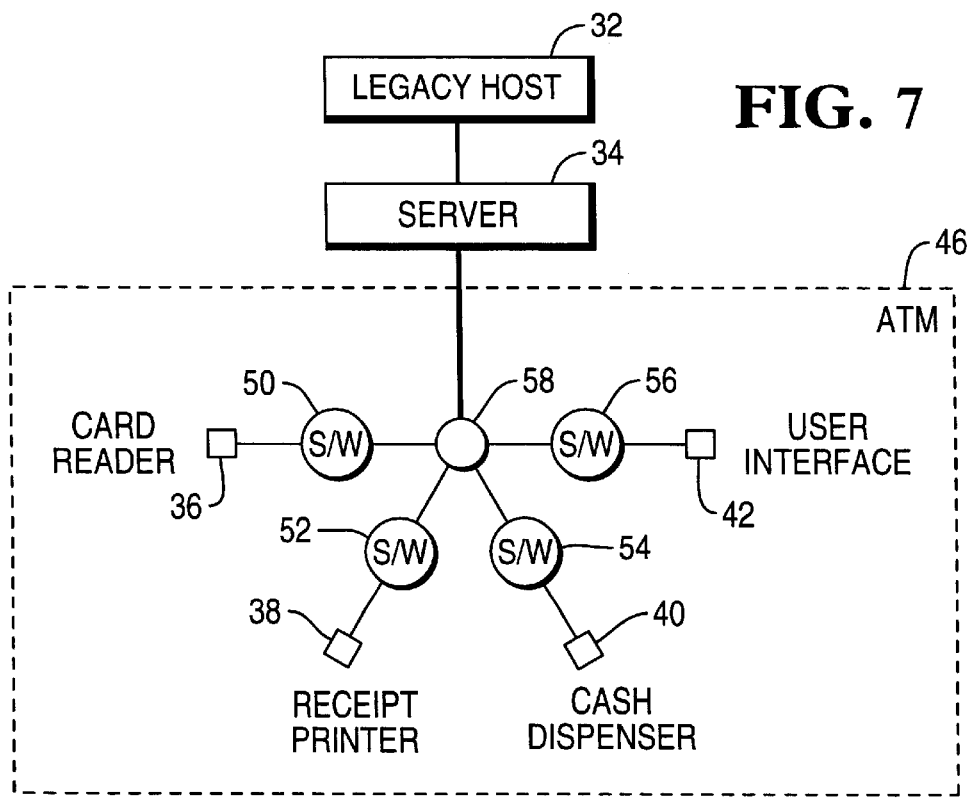
FIG. 7

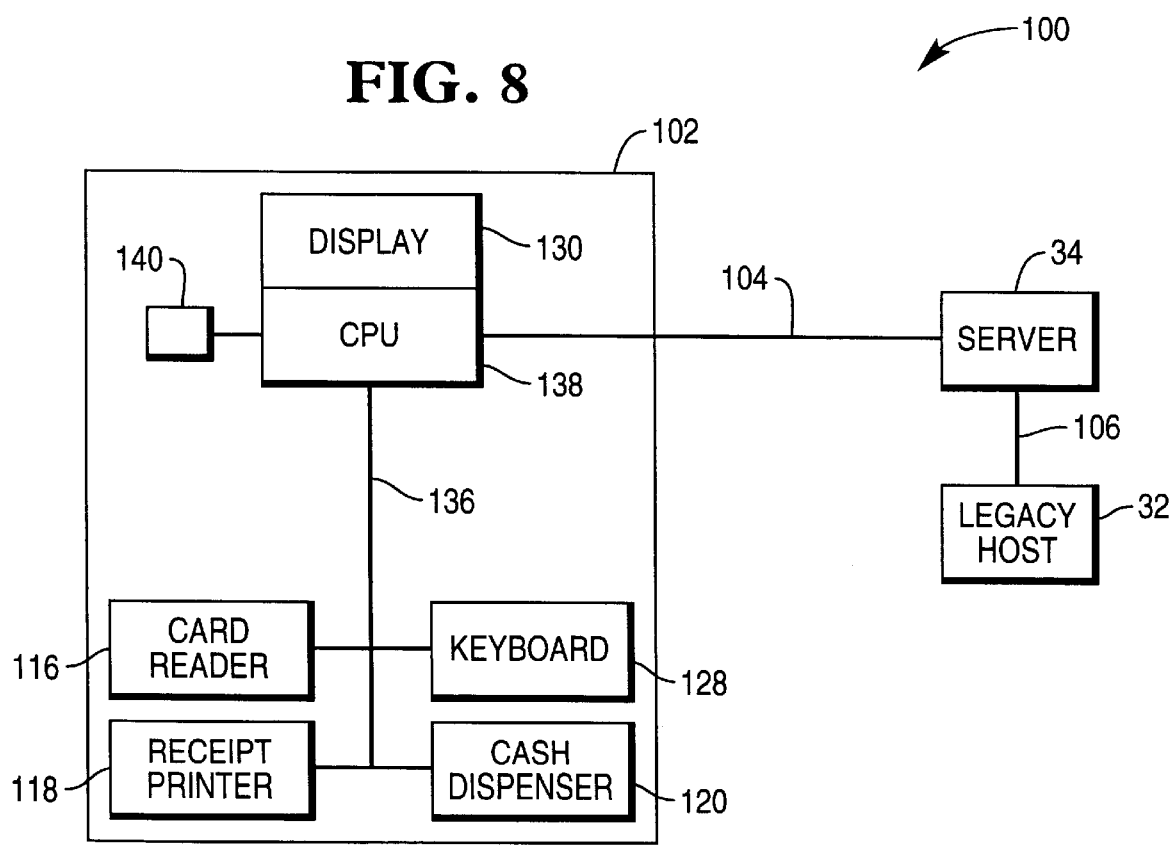
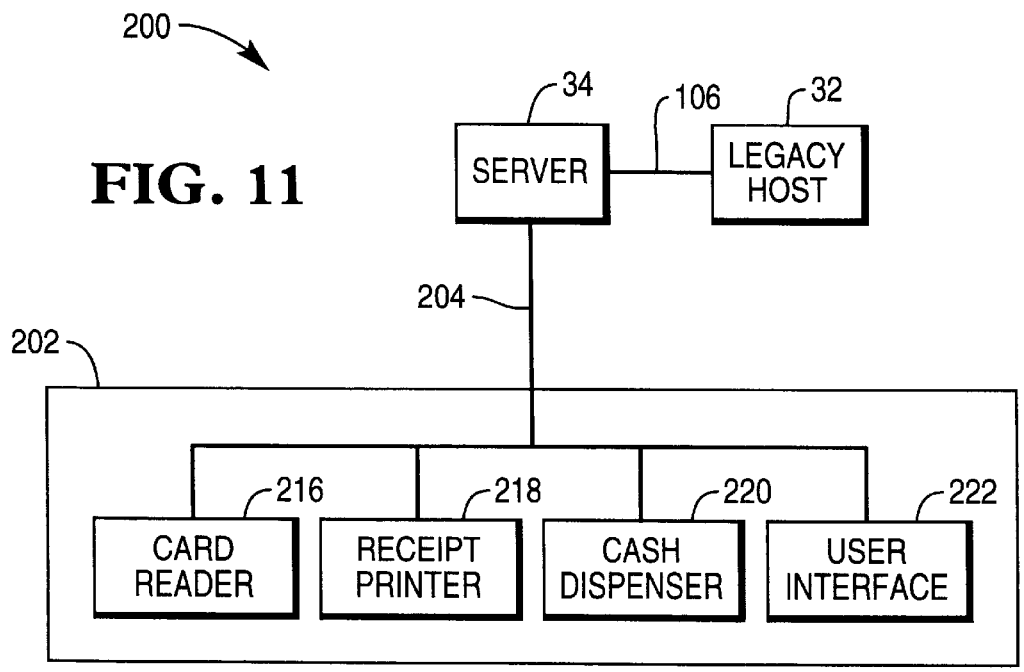

FIG. 9A

| PERIPHERAL DEVICE | PROCESSOR ADDRESS | PORT |
|---|---|---|
| RECEIPT PRINTER | 178.132.152.212 | 6000 |
| CASH DISPENSER | 178.132.152.212 | 6010 |
| KEYBOARD | 178.132.152.212 | 6020 |
| DISPLAY | 178.132.152.212 | 6030 |
| SELF (CARD READER) | 178.132.152.212 | 6040 |

FIG. 9B

| PERIPHERAL DEVICE | PROCESSOR ADDRESS | PORT |
|---|---|---|
| | | |
| | | |
| | | |
| | | |
| SELF (CARD READER) | 178.132.152.212 | 6040 |

FIG. 9C

| PERIPHERAL DEVICE | PROCESSOR ADDRESS | PORT |
|---|---|---|
| | | |
| CASH DISPENSER | 178.132.152.212 | 6010 |
| | | |
| | | |
| SELF (CARD READER) | 178.132.152.212 | 6040 |

FIG. 12

| PERIPHERAL DEVICE | PROCESSOR ADDRESS | PORT |
|---|---|---|
| RECEIPT PRINTER | 178.132.152.38 | 6000 |
| CASH DISPENSER | 178.132.152.42 | 6010 |
| KEYBOARD | 178.132.152.43 | 6020 |
| DISPLAY | 178.132.152.47 | 6030 |
| SELF (CARD READER) | 178.132.152.52 | 6040 |

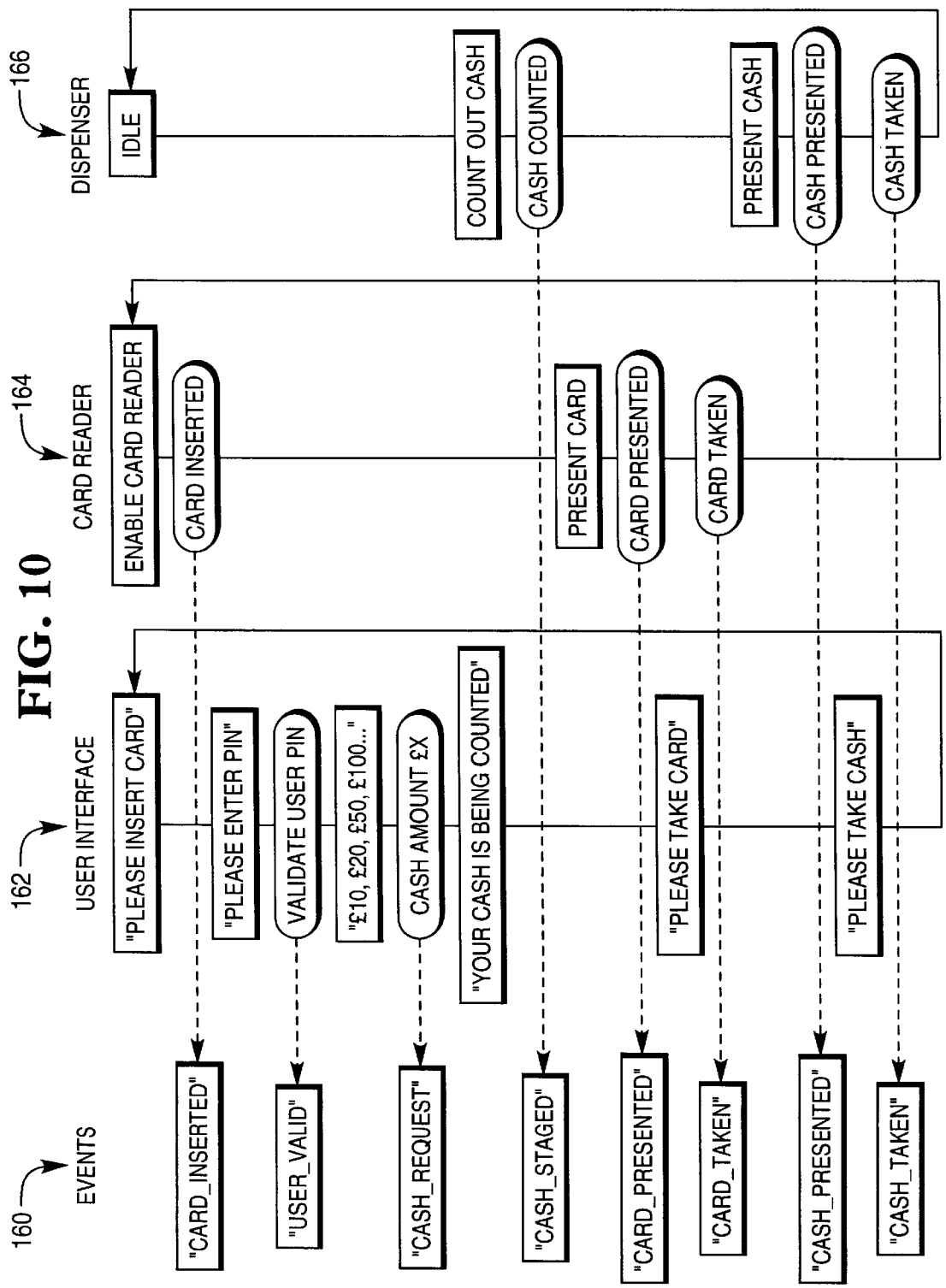

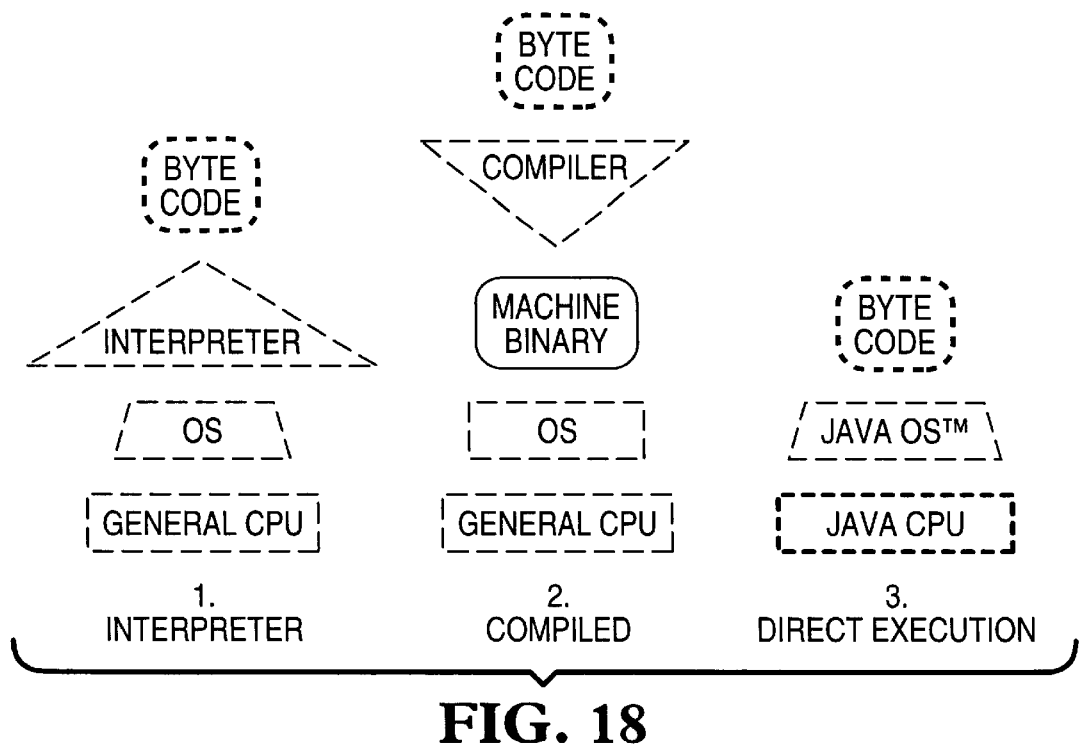
FIG. 18
FIG. 19
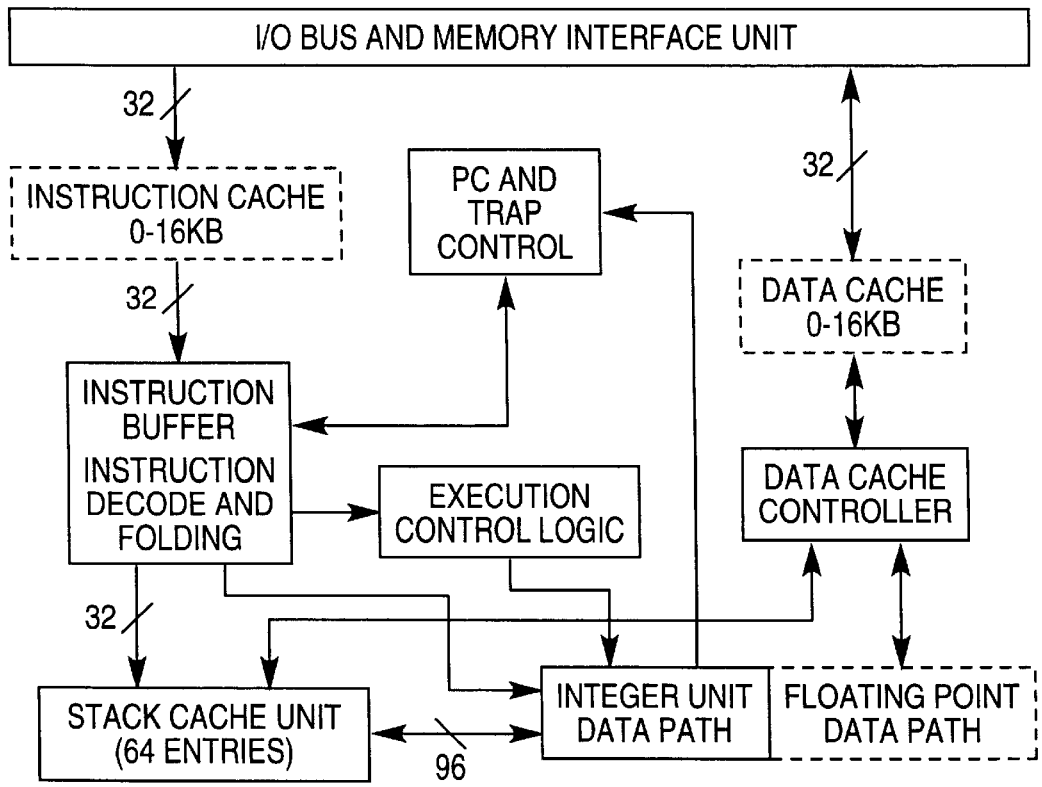

```
□--□ message
    ├--🗎 Message.java
    ├--🗎 MessageApp.java
    ├--🗎 ReceiveMessage.java
    ├--🗎 Registry.java
    ├--🗎 RegNode.java
    └--🗎 TransmitMessage.java
```

| FIELD NAME | PURPOSE |
|---|---|
| message | A string object containing the actual message. |
| value | A value that can be associated with the above message. |
| me | The name of the sending module, for example, CARD_READER. |
| id | Unique ATM identification number given to every module in the team. |
| port | Port number of the server, when a return message can be sent. |
| scan | Identifies the message type. |

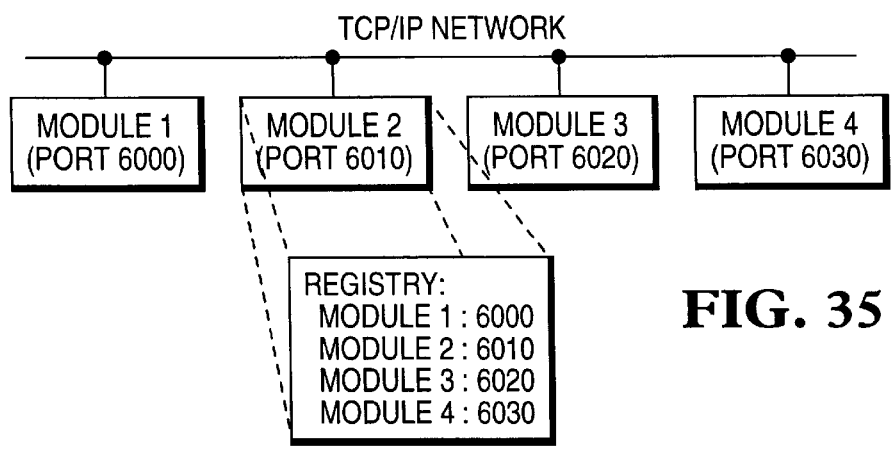

| JAVA CLASS FILES | SUMMARY |
|---|---|
| Account | All access to the TopEnd server was achieved through the use of this class. It defined a simple bank account, with a balance and the amount of cash involved in the last transaction. The UTTA modules could access bank details through this class without concern about contacting TopEnd. |
| Fault | Fault defined a whole set of constant variables which were used by the three modules that simulated hardware errors - namely, the card reader, receipt printer, and cash dispenser. Its use was primarily to make the code easier to read. |
| StringNode | Because Java did not allow for the use of templates, for each kind of linked-list created the nodes for different data types had to be redefined. StringNode were used to create linked-lists where each node contained a simple String instance. |
| Timer | Timer was used throughout the code for the purpose of delaying a module's application flow. Delays were used where the software was simulating what the hardware does - for example, one was used within the cash dispenser to halt execution while it 'pretended' to transport the cash from the cassette to the staging area. |
| ATMInterface | This class provided standard interface methods for the card reader (Ulysses version) to talk to hardware. The CardReader class only knew about ATMInterface, however, it was actually UlyssesInterface that is instantiated to do the work. |
| CardReader | The Java frame that contained application-control flow code for running a card reader module. There were two versions of this - the first which was only a software simulation, whereas the 'Hardware' version sent and received commands to control a real card reader. |
| ErrorDialog | The frame containing all the simulation error choices associated with the normal card reader. Note, that the ErrorDialog class was not found in the hardware version of the card reader as it was not used. |

FIG. 56B

| JAVA CLASS FILES | SUMMARY |
|---|---|
| StringClient | An extension of the Thread class that allowed for the sending of simple String based messages across a network using sockets. This class was used to send card reader commands to the Windows-Ulysses program. |
| StringServer | An extension of the Thread class that continuously listened on a socket for incoming String based messages. |
| UlyssesInterface | Deals with the command messages from the CardReader and also the response messages that were received from Windows (via StringServer). The class simply passed on the command messages, however, the incoming ones were deciphered and the correct response was passed back to the CardReader. |
| CashDispenser | The Java frame that contained application-control flow code for running a cash dispenser module |
| ErrorDialog | The frame containing all the simulation error choices associated with the above cash dispenser class. |
| Message | Message was a serialised object class, designed for sending across a network from module to module, being reconstructed at the receiving end. As well as the actual message, the Message class contained additional fields for information relating to the sending module. |
| MessageApp | This is the class that the four modules actually imported to handle their messages for them. It controlled both the ReceiveMessage thread and the registry of active modules. It contained interface methods that allowed a module to send and receive the messages. |
| ReceiveMessage | An extension of the Thread class that continuously listened on a socket for incoming messages from other modules. Once received, the class would pass the message back up to MessageApp for collection by a module. |
| Registry | Registry contains all the methods that dealt with accessing and maintaining a list of active modules in the ATM. The same instance of a Registy class within a Java virtual machine (such as the card reader) would be used and accessed by MessageApp, ReceiveMessage, and TransmitMessage. |
| RegNode | Defined the data that was stored at each location in a module's registry. It is used within a linked-list. |
| TransmitMessage | An extension of the Thread class that allowed for the sending of messages (based on the Message object) across a network. |

FIG. 56C

| JAVA CLASS FILES | SUMMARY |
|---|---|
| ReceiptPrinter | The Java frame that contained application-control flow code for running a receipt printer module |
| ErrorDialog | The frame containing all the simulation error choices associated with the above receipt printer class. |
| Application | This is the main application-control flow for the user interface. It is the most complex of the four control flows as the display is the main form of interaction with the user. As well as the control flow, the class also contained code required to draw the various screens within its frame. |
| ApplicationThread | The thread created within this class was used to control two things - the display of screens on the main user interface, and to monitor the limits set for the various time-outs. If one occured, then this class informed the main Application of the event. |
| DisplayField | DisplayField objects were used within the UserInterface class to provide text output to the screen. Using a larger font than normal, this class let the programmer position text accurately that will respond automatically to changes in the screen size and position. |
| EchoField | EchoField was used in several places within the main interface display. Firstly, during the PIN entry (or PIN entry retry) screen, an EchoField object was used to display '*' characters as each number was entered. It was also used to show user input in the cash entry screens, except this time no attempt to hide the characters was made. |
| UserInterface | The main frame for the user interface. This only created an area for the display to happen. All the control flow and display code could be found within the Application class. |
| WindowButton | WindowButton was a special implementation of a button, that allowed for large on-screen buttons (that could contain images), that can expand or contract in size according to the size of the user interface. These 'buttons' could either contain just text, a picture, or a picture without the ability to press the button. |

FIG. 57

| C++ FILE NAME | SUMMARY |
| --- | --- |
| StdAfx.h | This is part of the standard included files for any Visual C++ MFC application. |
| StdAfx.cpp | A Visual C++ MFC specific file included in the prototype code for other user-created code to function. |
| Resource.h | A Visual C++ specific file that contains the code for Windows, controls, icons, etc., used within the prototype. |
| UlyssesApp.h | Defines variables and functions used by the UlyssesApp class that was actually responsible for creating and running the main application. |
| UlyssesApp.cpp | Contains the function definitions for starting up the application and creating the dialog instance. |
| Message.h | Various user defined message maps were used within the main dialog class to receive messages from the Java virtual machine. These messages are defined in this file, where they can then be used by any class or function that includes it. |
| Server.h | To properly run the server listening for Java messages in its own thread, the code for it was declared in a separate file from the main dialog. Server.h contained two functions - one that actually listens for the text messages on the network, and another to post those messages back to the dialog window. |
| UlyssesDlg.h | Defines the variables and functions used by the main dialog class. |
| UlyssesDlg.cpp | This is the main application class file for the UlyssesApp prototype. This class was responsible for creating and setting up the Java server, registering itself with hardware (via the Ulysses API), and also passing messages between Java and the hardware. |
| SettingsDlg.h | Defines the variables and functions used by the settings dialog box that a user could pop up. |
| SettingsDlg.cpp | This contains the code for the settings box that allowed a user to decide if and where messages to Java are to be sent. |

FIG. 58

| Response to... | T-Code | Meaning |
|---|---|---|
| ACCEPT | 0 | Ok, reader enabled, no card present. UNSOLIC_RESPONSE to follow. |
| | 1 | Ok, card staged in reader, reader disabled. No UNSOLIC_RESPONSE to follow. |
| | 2 | Track not supported, read disabled. All commands available. |
| | 3 | Device inoperative - do not issue any commands until severity is checked. |
| | 4 | Card jam - eject or capture card. |
| | 5 | Invalid or jammed card in reader, card ejected and UNSOLIC_RESPONSE message to follow. |
| READ | 0 | Successful read. |
| | 1 | Read error, all commands available. |
| | 2 | Track not supported, all commands available. |
| | 3 | Device inoperative - do not issue any commands until severity is checked. |
| | 4 | Card jam - eject or capture card, or card removed, or too many read errors. |
| | 5 | Blank track, all commands available. |
| | 6 | No card present, all commands available. |
| WRITE | 0 | Card written Ok. |
| | 1 | Write error, all commands available. |
| | 2 | Track 3 write not supported, all other commands available. |
| | 3 | Device inoperative - do not issue any more commands until severity is checked. |
| | 4 | Card jam - eject or capture card, OR too many write errors. |
| | 5 | Write error, invalid data (length or format). |
| | 6 | No card present, all commands available. |
| EJECT | 0 | Card ejected, can be removed - all commands available. |
| | 1 | No card present, all commands available. |
| | 2 | Card captured, reader clear - all commands available. |
| | 3 | Device inoperative - do not issue any commands until severity is checked. |
| CAPTURE | 0 | Card captured Ok. |
| | 1 | Transport clear, no card to capture. |
| | 2 | Transport clear, card removed by customer |
| | 3 | Device inoperative - do not issue any commands until severity is checked. |
| UNSOLICITED | 0 | Card removed Ok. |
| | 1 | Card detected entering reader. |
| | 2 | Card inserted and staged Ok. |
| | 3 | Device inoperative - do not issue any commands until severity is checked. |
| | 4 | Card jam - eject or capture card. |
| | 5 | Invalid card inserted in reader. Card ejected, UNSOLIC to follow. |
| | 6 | Shutter jammed closed on attempted card entry. |

TRANSACTION PROCESSING SYSTEMS

CROSS-REFERENCES TO RELATED APPLICATIONS

The disclosure of the inventors' commonly assigned U.S. patent application entitled "Transaction Processing Systems Maintenance," filed on even date herewith, is hereby fully incorporated herein by reference.

BACKGROUND OF THE INVENTION

1. Field of the Invention

This invention relates to transaction processing systems, such as banking or retail transaction systems, and in particular, to associated transaction processing terminals and networks.

2. Description of Related Art

Transaction processing networks, such as banking and retail transaction networks, may commonly comprise one or more transaction terminals connected to a server. Typical transaction terminals may comprise automated teller machines (ATMs), retail point-of-sale (POS) terminals, general self-service terminals (SSTs), and transaction kiosks. Each terminal generally has a central processor, typically PC based, which controls the operation of the terminal, application flow and user interface presentation. Application software and files used by the application are typically stored on a hard disk or other mass storage device within the terminal. The terminal generally is connected to a server through a connection, which may be a high order communications link or a modem and telephone based link into the network. The server may access an information database (e.g., a "legacy host") to assist in processing a transaction.

Numbers of other terminals, which may be of the same or of a different kind, may be connected in the transaction network. Simple client-server transactions may be conducted between a terminal and the host in order to obtain specific customer information used in the processing of a customer's transaction. In the case of an ATM the transaction may typically be a cash withdrawal or a balance request. In the case of a retail POS terminal a typical transaction may be a sale that makes use of price lookup.

A transaction terminal generally includes peripheral devices that are often very specific to the function of the terminal. Typical peripheral devices included in an ATM are a card reader, a cash dispenser, a receipt printer and a user interface (e.g., an encrypting keyboard and a display). Typical peripheral devices included in a POS terminal are a card reader, a bar code scanner, a receipt printer and a user interface (e.g., keyboard and display). Such peripheral devices are not all normally found on a general-purpose computer and must be incorporated both physically and electrically and be provided with appropriate control software. The serial and parallel ports associated with the central processor of a personal computer ("PC") can be used to supply control signals to the peripheral devices. Alternatively, a proprietary communications system can be employed; for example, the communications system known as Serial Distributed Control ("SDC") is used in ATMs manufactured by NCR Corporation. In either case, peripheral devices generally require some form of localized or embedded processing capability to conduct communications with the central processor and to implement its commands upon the device.

The above approach has a number of failings. The desired main task of a central processor is to present information, graphics and animation to the user. However, the processor has also been required to conduct control operations and possibly maintenance operations on the peripheral devices connected to it. Therefore either a larger processor may be required to obtain a given level of user interface performance or this performance may be adversely affected by the control operations of the processor on the peripheral devices.

Additionally, a terminal's peripheral devices have been configured to act as simple command processing systems, with all application control being conducted from the central processor. Peripheral processing capability was therefore not always well used, particularly hen invoked in a start-stop manner.

Furthermore, when it was desired to change the control logic for a peripheral device this often could only be done by changing the ROM (read-only memory) parts on the device or else by loading new driver software through the central processor over the communications channel within the terminal. All applications software, peripheral device drivers and user interface files have commonly been held in a mass storage device within the terminal. Collectively the installed software many times comprised a large monolithic system, in effect a central program used to control the various aspects of the terminal operation, from the user interface presented to the control of the peripheral devices. The installed software further generally included the necessary application business logic and error handling routines. In order to upgrade the software associated with any individual function or module it was thus often necessary to install a new suite of program files onto the terminal's mass storage device and to otherwise disrupt the terminal's operation for software maintenance. Particularly in the case of ATMs where security is a significant factor this could be an arduous task requiring secure disc build operations at each individual terminal.

While this type of software upgrade approach may be feasible, although cumbersome, for driver software in current use, it may not be practical for transaction terminals in the future, which may be required function in a much more dynamic manner, e.g., by dynamically changing their capabilities at transaction run time and not just at the start of day. Examples of this may arise in connection with the need to operate with so-called "smart" cards of various kinds.

Smart cards generally have built-in electronic processing and data storage facilities. Card readers for such cards may need to be able to both read from and write to different kinds of smart cards and to the underlying applications contained within those cards, and may thus be called upon to dynamically change their capabilities or manner of operation at run time. Smart card readers may thus be required to use different drivers or control logic dependent on the actual smart card that is inserted. There may also be a requirement to dynamically download new applications software for transfer from the terminal to various types of inserted smart cards. However, installing and maintaining various smart card reader drivers, control logic implementations and smart card applications may well put further strains on systems maintenance.

Printers may require the dynamic download of different graphics drivers to support various different graphics formats. Also, dispensers may not be limited to dispensing cash only but may be required to dispense other media such that alternative or additional control software may be called for at run time.

While application development tools are becoming available that may allow the developer to consider peripheral modules as functional components, maintenance issues will remain if application business logic and error handling facilities for these components are made to reside within a single central application program.

SUMMARY OF THE INVENTION

It is an object of the invention to provide transaction terminals or networks in which one or more of the above stated objectives are met, or problems are overcome or mitigated.

General objectives of the invention are met by providing modules or peripheral devices adapted to function as constituents of a transaction terminal operating through a server in a transaction network, characterized in that the devices or modules (or associated processes) and server can independently communicate. Communications with the server may be direct or through a controller such as a router acting as a firewall to block unwanted communications with other devices. This structure, for example, may variously allow each module's operating or application software and required data files to be independently introduced or updated via the server at start up, selected maintenance intervals or dynamically at the time of transaction. Conveniently, the software may be in the form of downloaded byte code or applets, such as JAVA® program code, executable using Web browser, virtual machine or compiler functioning incorporated within the module. The need for local hard disc storage can thus be eliminated and modules can be independently serviced without significant disruption of the operations of the terminal or other modules. Further, a module's software and data files can be isolated to the module's immediate or selected requirements, allowing for associated files and file updates to be better targeted to specific functions and thus more limited in size. Another advantage of the module to server communications structure is that it allows a module's state and operational history to be directly monitored through the server with minimal disruption to operations of other terminal elements.

General objectives of the invention are alternatively or further met by providing modules or peripheral devices adapted to function as constituents of a transaction terminal, characterized in that the devices or modules (or associated processes) communicate with each other, e.g., via peer to peer communications, by device specific addressing or by broadcast messaging. Conveniently, a module may operate as a state machine, executing its own event driven application programming. Modules may communicate their respective states to other modules and execute operations based upon a module's state and events within one or more other modules. This type of architecture allows use of relatively low cost local or embedded processors within various modules, mitigating requirements for a higher cost PC based processor used for centralized processing within a transaction terminal.

According to the invention a banking, retail or other transaction network can comprise a server and one or more terminals each containing a plurality of peripheral devices where the server is arranged to store applications and driver or other operational software for the peripheral devices and communication links can be provided from the server to individual peripheral devices to enable such software to be downloaded directly from the server to the devices.

The peripheral devices can each include their own, preferably embedded, processors to which the communication links are able to download software from the server.

In carrying out the invention the a terminal's peripheral devices may each include a hardware controller to control the hardware of the device, and a local processor in the device operates the hardware controller in a manner determined by software downloaded to the processor through the communications link.

In a preferred embodiment communication links enable the peripheral devices of a terminal to communicate with each other.

The peripheral devices for a transaction terminal may be selected, for example, from the following peripheral devices, namely: a user interface, a card reader, a receipt printer, a bar code scanner and a cash dispenser. The user interface may comprise a keyboard and a display unit. The card reader peripheral is preferably capable of reading from and writing to smart cards.

The peripheral device communication links may be dedicated links. Alternatively they may comprise a modem and information signal transfer capability for enabling transfer of signals from the modem through a telephone network to a server.

In embodiments of the invention there may be provided a banking, retail, or other information database and a communications link between the information database and a central server.

According to the invention a banking or other transaction terminal can include a plurality of peripheral devices where communication links are provided from individual peripheral devices to link said devices for independent communications with an external server. A banking, retail or other transaction network may accordingly comprise a plurality of transaction terminals each including a plurality of peripheral devices, a central server, and communication links from the terminals to the server, where the communication links connect peripheral devices in a terminal for communications with the server.

Alternatively, communication links may extend to the server from multiple peripheral device control applications executing on a central processor in the terminal, where each such control application supports and is associated with a different peripheral device. In one embodiment a transaction terminal may include a central processor providing processing capabilities for a plurality of peripheral devices each of which may have its own independent control process or application running on the central processor. The control processes or applications may be so constructed that they can communicate directly with each other, or directly with an external server on a connected network.

Thus, a transaction terminal may comprise multiple peripheral devices, and the different peripheral devices or their associated operational processes may have individual access to or by a central server in the network. The network may further include an information database (legacy host) with a communications link between the database and the server to assist a transaction.

BRIEF DESCRIPTION OF THE DRAWINGS

In order that the invention may be more fully understood reference will now be made to the accompanying drawings in which:

FIG. 5 is a flow chart of a typical sequence of events at an ATM terminal embodying the invention, FIG. 6 is a diagram illustrating a conventional ATM network and the software control of peripherals within an ATM, FIG. 7 is a diagram illustrating the software control of peripherals within an ATM in accordance with one embodiment of the present invention, FIG. 8 is a block diagrammatic representation of an ATM network in accordance with an embodiment of the invention, FIGS. 9A, B and C are tables illustrating a feature of the embodiment of FIG. 8, FIG. 10 is a flow chart of a typical sequence of events in an ATM terminal as shown in FIG. 8, FIG. 11 is a block diagrammatic representation of an ATM network in accordance with an alternative embodiment of the invention, FIG. 12 is a table illustrating a feature of the embodiment of FIG. 11, FIG. 18 is a block diagram of three types of Java programming environments, FIG. 19 is a functional block diagram of the picoJava processor core, FIG. 33 is a software file directory listing of messaging files for networked peripheral devices or modules used in a prototype Ultra Thin Client Team application architecture for a simulated ATM terminal, according to one possible embodiment of the invention, FIG. 34 is a listing of elements of messages exchanged by networked peripheral device or module processes used in a prototype Ultra Thin Client Team application architecture for a simulated ATM terminal, according to one possible embodiment of the invention, FIG. 35 is a simplified block diagram of the internal registry use by networked peripheral devices or modules in a prototype Ultra Thin Client Team application architecture for a simulated ATM terminal, according to one possible embodiment of the invention, FIG. 57 is a listing and description of C++ program files used for operation and control of card reader networked peripheral device or module in a prototype Ultra Thin Client Team application architecture for a simulated ATM terminal, according to one possible embodiment of the invention, and FIG. 58 is a listing and description responses to messages by a card reader networked peripheral device or module in a prototype Ultra Thin Client Team application architecture for a simulated ATM terminal, according to one possible embodiment of the invention.

Description of the Preferred Embodiments

EXAMPLE 1

Figure 1:
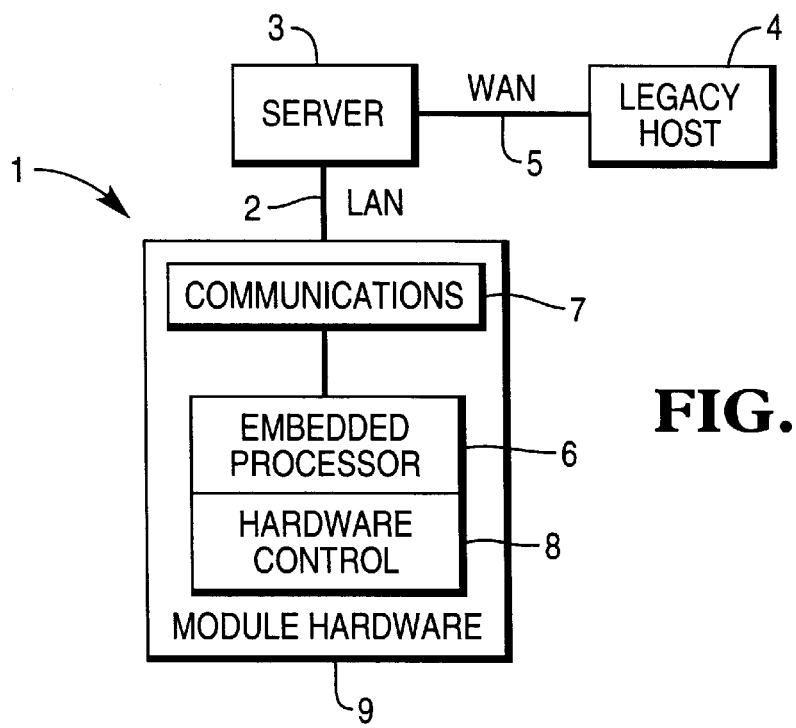
FIG. 1 is a block diagrammatic representation of one peripheral device and its place in a transaction network embodying the invention.

Referring now to FIG. 1 there is shown therein a block diagram of a typical peripheral device 1 used in a network embodying the invention. Device 1 is connected over a Local Area Network (LAN) 2 to a central server 3. A legacy host 4 is also connected to server 3 via a Wide Area Network (WAN) 5. Device 1 contains a processor 6, which can be a low cost embedded processor, to which is connected a communications system 7. Communications system 7 together with LAN 2 form a communications link between device 1 and server 3. Also contained within device 1 there is hardware control electronics 8 for controlling the module hardware 9 of device 1. A number of different peripheral devices such as device 1 and each having different functions can be grouped together in a transaction terminal.

Processor 6 is able to communicate through communications system 7 and LAN 2 with server 3 and with any associated devices connected to LAN 2. Processor 6 uses communications system 7, LAN 2 and server 3 in order to load applications and drivers for hardware control electronics 8 as required. Processor 6 applies the loaded driver software to hardware control electronics 8 to control module hardware 9. Dependent upon the application loaded from server 3 to device 1, it is possible for the software to access legacy host 4 over LAN 2, server 3 and WAN 5 as required.

Figure 2:
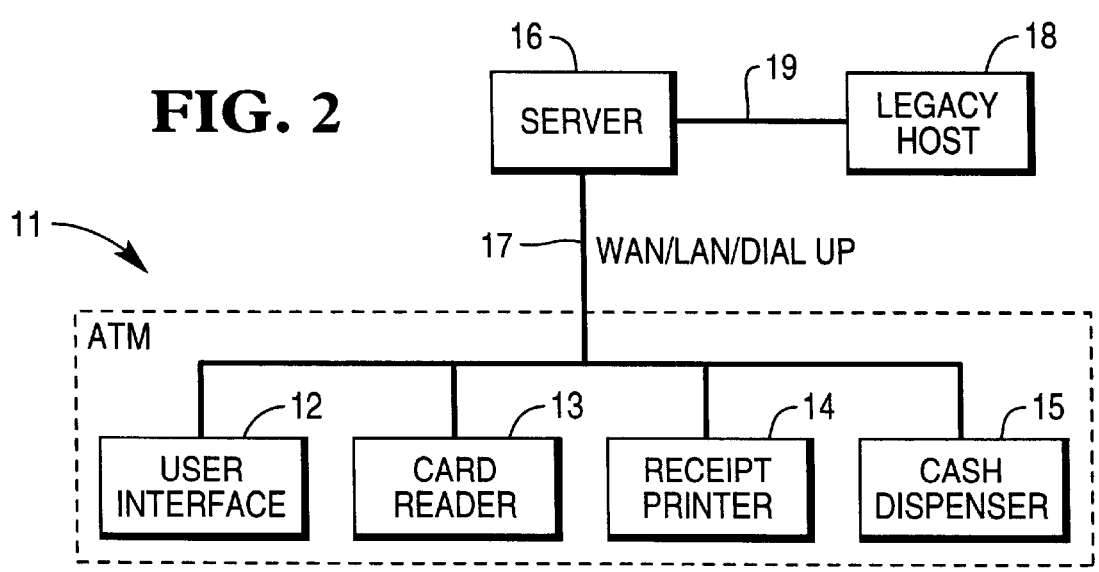
FIG. 2 is a block diagrammatic representation of a banking or retail transaction network embodying the invention and showing one terminal.

Referring now to FIG. 2 there is shown therein a block diagram of an ATM 11 having a plurality of peripheral devices each of which is an example of a typical peripheral device 1 described with reference to FIG. 1. In the example illustrated ATM 11 has various peripheral devices each of which fulfill a different function. As shown, there can be a user interface 12, a card reader 13, a receipt printer 14 and a cash dispenser 15 making up the ATM 11. User interface 12 can comprise a keyboard and a display unit, for example. A typical ATM keyboard will have a numeric keypad and a small number of additional keys, which may be labeled "ENTER", "CANCEL" and so on.

A server 16 is positioned at a suitable location externally of ATM 11. ATM 11 is shown connected to server 16 by a communication link 17, which can be of any known type. For example link 17 may be part of a local area network (LAN), a wide area network (WAN) or else a dial up connection. Link 17 may be a high bandwidth network connection to allow for efficient and rapid download of software and may use the TCP/IP transfer protocol, although for single off-site terminals lower speed dial-up modems can be used. Other banking transaction terminals, in addition to ATM 11 may be linked to server 16 through other communication links similar to link 17.

A preferred feature of communication link 17 is that each peripheral device or module in ATM 11 has independent access to server 16 through link 17 and is thus an individual client to server 16. Server 16 can be connected to legacy host 18 (which can include a banking, retail or other information database) through a further information signal communication link 19. Server 16 may also contain the application software used by the modules in ATM 11. The same applications software can also be used by corresponding modules in other terminals of the network which are linked to server 16.

The modules in ATM 11 may access link 17 using standard networking protocols such as TCP/IP in order to connect both to server 16 and to the other modules. Each module may contain an embedded processor and appropriate hardware control electronics in order to be able to manipulate the hardware that constitutes the module. This can be done either by embedding the silicon description of the processor within module specific control chips or through the use of a generic embedded processor, which uses general-purpose input/output software to access module specific control chips as peripheral devices. Within such embodiments of the invention the individual module applications may run directly on the embedded processor.

In addition to link 17 providing a direct connection from each module to server 16, link 17 may also enable communication to take place among the individual modules of ATM 11 themselves. Thus, for example, information as to the operational state of any of the modules can be communicated to other modules.

In operation and with the applications software being held in server 16, the modules of ATM 11 can require only a very simple boot code to be present in ROM or PROM or in Flash RAM in the modules themselves to allow them to boot up, initiate a network session with server 16 and download the current version of the applications software to each module. The downloading operation may use standard protocols such as BOOTP or TFTP. Software upgrades can be easily achieved by upgrading the software held on server 16 and restarting the modules either directly at ATM 11 or via server 16. This allows for the remote administration of an entire transaction network.

The banking transaction network described above may be operated according to a number of application architectures.

In one architecture a master/slave relationship can exist between user interface 12 and each of the other peripheral devices. Application flow can be conducted by the user interface module with the other peripheral modules being commanded to carry out specific tasks as required. Commands can be issued over the communications links using standard network sockets, remote method invocation or remote procedure calls.

In an alternative preferred architecture a peer to peer relationship can exist between all of the modules of ATM 11. The occurrence of significant events can be broadcast to ensure synchronization of individual applications operating within each module.

The ability of peripheral modules within a transaction network to dynamically load required software components provides for an efficient and easily controllable mechanism for supporting the required functionality. For example for card reader 13 to be able to recognize different types of smart card as well as magnetic stripe cards, card reader 13 needs to be a multiple type card reader. To this end different software drivers can be available and accessible to support the different types of electrical interfaces, data streams and communications protocols for each type of card. In addition, various mechanical and electrical considerations would generally be addressed to accommodate interfacing with the various card types.

Figure 3:
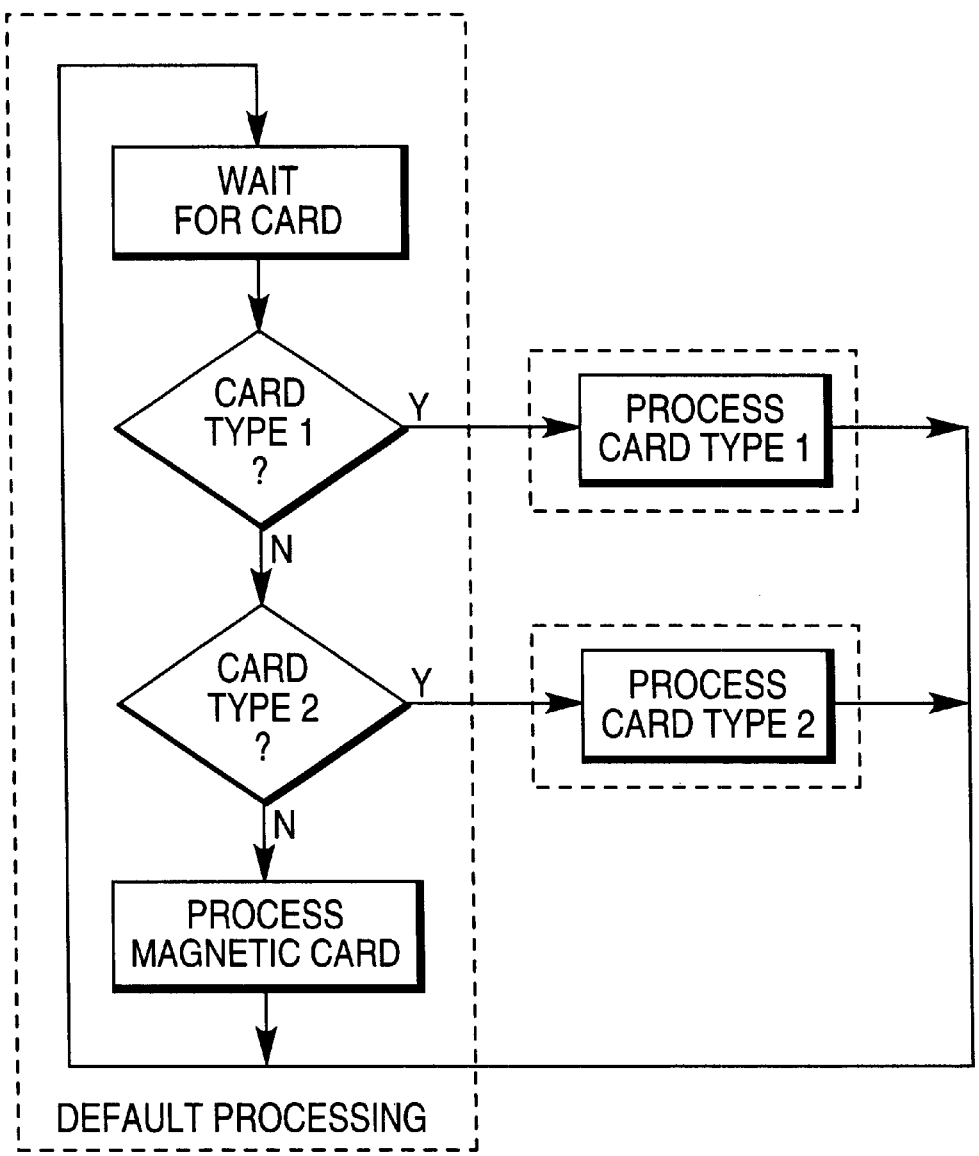
FIG. 3 is a flow chart of card reader control software for detecting different types of card.

The flow chart of FIG. 3 illustrates a basic application flow for recognizing two types of smart card with the processing of a magnetic stripe card as the default. A default program can be loaded initially to wait for a card to be inserted. On detection that an attempt is being made to insert a card into card reader 13, the program can provide for the opening of shutters and for the energizing of drive motors as required and then identify the type of card that has been inserted in accordance with the flow chart illustrated in FIG. 3. Unlike card readers that need to have all the necessary routines available all the time, either locally in ROM or else downloaded at the start of the day, a terminal embodying this example of the invention may initially download only the default program, and when the presence of a Type 1 or Type 2 card (as indicated in the flow chart of FIG. 3) is detected, the relevant program for the detected card can be downloaded.

While the flow chart of FIG. 3 shows only two types of card, the disclosed architecture can readily be programmed to detect any other number of cards. If it is desired to support another type of card, a default program may need to be increased in size by only a small amount sufficient to support the extra decision block and type identification. Support for particular card and transaction types can be readily updated, added or deleted, incrementally as desired. Associated software changes can be made at the start of day, at some other maintenance time or interval, or dynamically as needed at the time of a transaction. This contrasts with terminals and associated card readers that may need to have their operational programming replaced or increased by the total size of the routines required to process an extra type of card or application embedded in the card. Similar programming considerations may apply to other modules such as printers and media dispensers.

In the case of printers, technologies such as the World Wide Web can bring large amounts of graphic imagery to self service and point of sale terminals so that printers at such terminals may require the ability to print out hard copy of such imagery. Printer 14 can be programmed to load Web pages directly over communication link 17 from server 16 as well as loading the appropriate printer driver software to support the graphics, fonts and other imagery in the downloaded Web pages. Such software can be resident in server 16 and be loaded to the printer only as and when required. As these drivers consist of code and data it is possible to load individual graphic imagery, along with its own printer driver software, in order to customize receipts, statements and the like either as part of a branding exercise or as a customization exercise for a user. These graphic images can be purely transitory, so as to take up memory space in the printer module only for the duration of their task.

The traditional cash dispenser may be replaced by more of a general multi-media dispenser, with the media to be dispensed ranging from paper in the form of currency notes, airline and other tickets and books of stamps and on to plastic media such as ski passes. Accordingly there is a requirement to support different media types at the dispenser which require different timing and control parameters for the different stacks of media material held by the dispenser. With the disclosed architecture, appropriate software can be readily downloaded from server 16 through link 17 at run time without the need to store every alternative driver program at the dispenser.

With each peripheral module having a direct connection through communication link 17 to server 16, it can communicate directly and independently with the server 16 not only to download software but also to obtain data specific to a current transaction while it takes place. For example a request may be made for information specific to the user and appropriate to conduct the current transaction. Thus dispenser 15 may require the users current balance in order to determine if the user had sufficient funds to cover a requested cash withdrawal. User interface 12 may also require account balance and bank statement information in order to present these to the user.

With each peripheral device or module in ATM 11 individually connected to server 16, the network can be capable of downloading software from server 16 whenever it is required, for example on startup or on resetting. Furthermore the latest version of a particular software application can be instantly made available to all terminals in a network by loading it into server 16 without the need for physical access to any of the terminals. In addition terminal specific software can be made available at the server. Such terminal specific software may comprise marketing messages for display at a terminal.

By having a direct connection from the peripheral devices to the server it is possible to allow the peripheral software applications to take a more active role in the overall operational flow. This allows the user interface processor to concentrate on its primary task of providing user interface display graphics, animation or video facilities. The processing power required to operate individual peripheral devices can then be selected to optimize the cost/performance ratio.

It is desirable to monitor the operation of the modules and for this purpose various logs and hardware tallies can be provided for. An embedded processor at a module can be programmed to generate such logs and tallies and report the results. Access points can be provided over a network to allow for diagnostic operations including the downloading of monitoring information. The reports can be in HTML form thus allowing a standard Web browser to access the information.

EXAMPLE 2

Figure 4A:
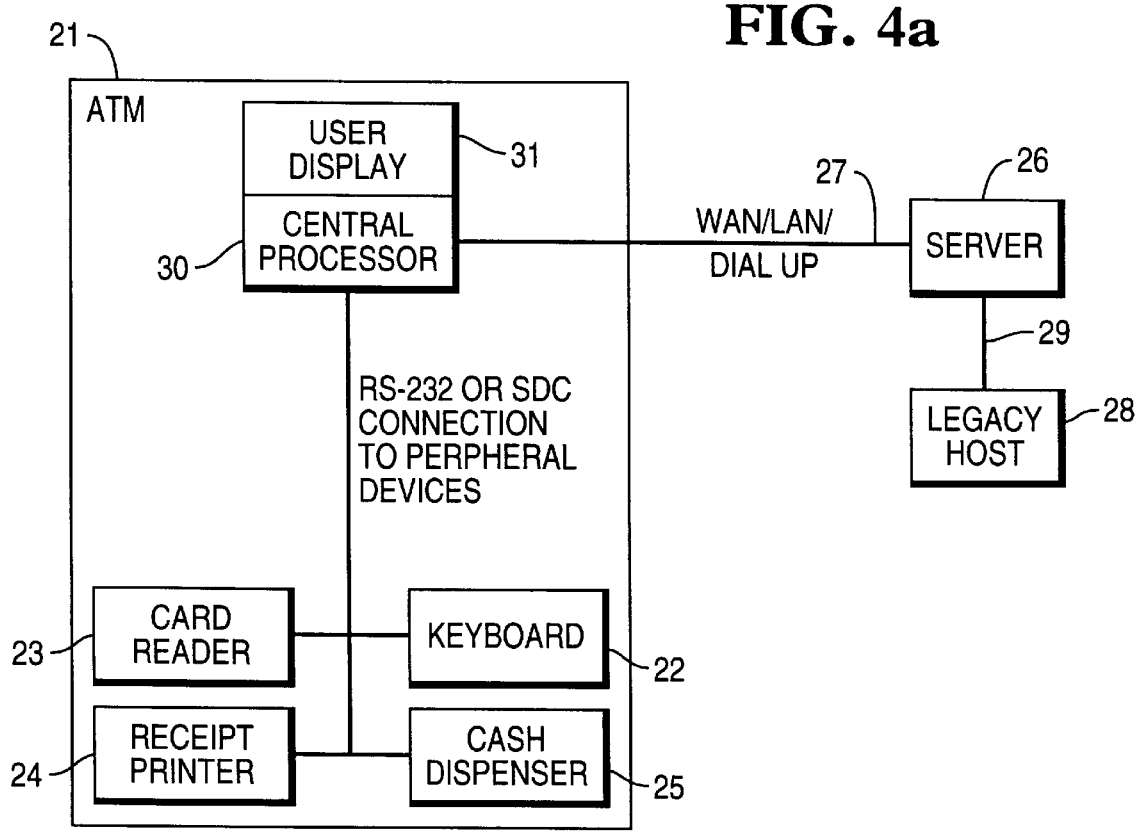
FIG. 4A is a block diagrammatic representation of a transaction network embodying the invention and showing one terminal.

Referring to FIG. 4A there is shown therein a block diagram of a transaction network comprising an ATM 21 connected through a network connection 27 to a server 26. A transaction database (or legacy host) 28 is also connected to server 26 via a communications link 29. ATM 21 has a number of peripheral devices. These are a card reader 23, a receipt printer 24, and a cash dispenser 25. These devices are connected through suitable parallel or serial ports to a central processor 30 provided in ATM 21. ATM 21 also includes a keyboard 22 and a user display 31. A communications link 27 is provided from ATM 21 to server 26. Link 27 is typically a high order communications link to allow for efficient transfer of data from server 26 to ATM 21 although lower speed dial-up modems could be used if desired. When ATM 21 is turned on all application software is loaded from the mass storage device (not shown) associated with the central processor 30. Once operational the individual module applications running on central processor 30 use client-server techniques to communicate with server 26 to obtain customer specific transactional information from legacy host 28.

Figure 4B:
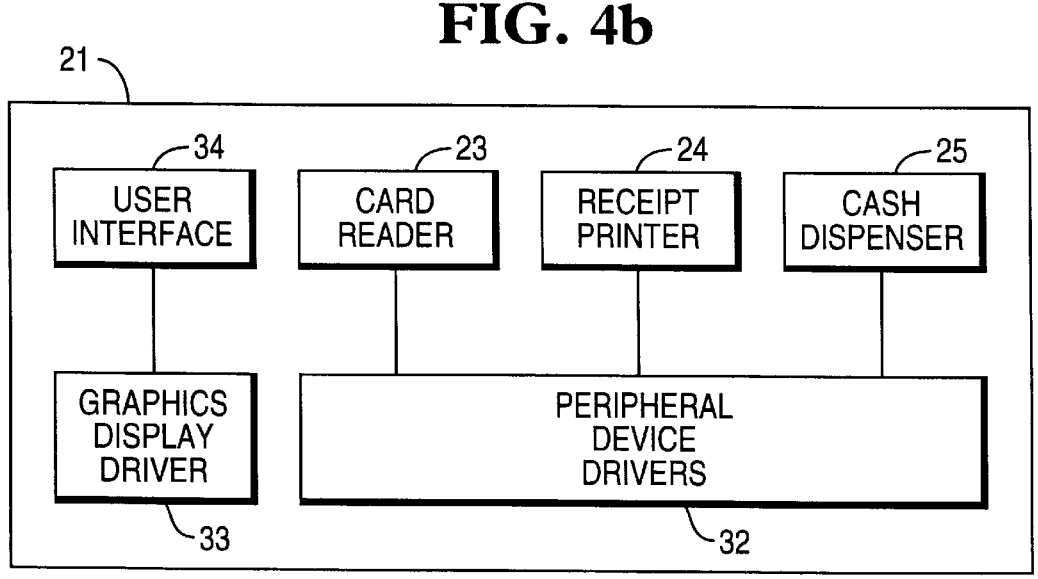
FIG. 4B illustrates a software architectural view of the embodiment of FIG. 4A.

An architectural view of the embodiment of FIG. 4A is illustrated in FIG. 4B in which like parts of FIG. 4A are similarly numbered. The application modules of card reader 23, receipt printer 24 and cash dispenser 25, e.g., considered as software modules, may control the operation of the associated peripheral modules through corresponding device drivers 32. Similarly, the user interface application module 34 may use a graphics display driver 33 to present appropriate information to the user. This application module may also use a keyboard (not shown) to gather user input.

The individual application modules that operate within various hardware embodiments of the invention such as those shown in FIGS. 2 and 4A may be programmed to operate as a team, with each application module being considered as a team member or peer. Each application module may run its own error handling, control and business logic based upon predetermined rules of operation. The applications may be event driven with internal events, for example user input or hardware activity, driving the state of each application module. As the state of an application module changes it may broadcast appropriate messages to all the other members of the team. These event-based messages may be used to synchronize the different application modules to a common application state. As the state of any application module changes, due for example to hardware events, user input or time-out conditions, so an event message may be broadcast to allow the other members of the team to act accordingly.

Initial "HELLO" messages may be used to introduce each member of the current team configuration. This introductory process may allow each team member to build a registry of the other application modules that are present and how to communicate with them. This team building process may also allow a user interface 12 to determine what peripheral devices are available and therefore what user services can be offered.

An application module that is closing down can send a "GOODBYE" message to indicate that it is no longer available. Peripheral modules can become non-functional. This can happen as a result of hardware failure (for example if a card is jammed in card reader 13) and an application module that has gone fatal may send a "GOODBYE" as it withdraws from the team. Alternatively if a peripheral module is physically removed, or is otherwise unable to signal with a "GOODBYE" message, then the first application module that attempts to send a message to the now missing application module may detect that it is missing and send a "GOODBYE" message on its behalf. When the peripheral module is reconnected, or becomes operational, its application module may broadcast a "HELLO" message to allow the other application modules to adapt accordingly.

Various transaction terminal embodiments described herein may thus operate as an event driven system. Messages may be broadcast from application modules within which an event has occurred to other application modules within the terminal. These other application modules may, or may not, be concerned with that event. For an ATM 11 and its user interface 12, card reader 13 and cash dispenser 15 a typical transaction sequence is illustrated in FIG. 5.

Referring now to FIG. 5, the first column shows an illustrative sequence of events and their associated event messages. The second, third and fourth columns show exemplary operations of user interface 12, card reader 13 and cash dispenser 14 following generation of each event message listed in the first column. In the second column, which shows a manner of operation of user interface 12, the statements within quotation marks are examples of the text displayed on a screen to the user.

In the event of insertion of a card by a new user into card reader 13 a message "CARD_INSERTED" may be broadcast by card reader 13. The effect of that message may be to cause user interface 12 to display the text "Please enter PIN". When the user has entered a PIN number a 'Validate User PIN' operation can take place. This might involve the use of links 17 and 19 to communicate with legacy host 18. If the entered PIN number is found to be valid for the particular card that has been inserted into card reader 13 then user interface 12 can be informed accordingly whereupon it may generate a "USER_VALID" event message. This may cause display of a cash selection request. The customer user may then enter a specific amount that may cause the broadcast of another event message, e.g., "CASH_REQUEST".

The "CASH_REQUEST" message may cause operation of cash dispenser 15 to count out the requested amount while at the same time user interface 12 may cause the text "Your cash is being counted" to be displayed on the screen. When cash dispenser 15 has completed its task it may generate a "CASH_STAGED" message which can be used by card reader 13 to present the inserted card partly out of the card entry slot to enable it to be removed by the user. Card reader 13 may then broadcast the event message "CARD_PRESENTED" which in turn may cause user interface 12 to display the text "Please take card".

When card reader 13 detects that the card has been taken it can generate a "CARD_TAKEN" message. This message, on receipt by cash dispenser 15 may cause the device to present cash that it has counted out. When that operation is done cash dispenser 15 may generate a "CASH_PRESENTED" message to cause user interface 12 to display "Please take cash". On dispenser 15 detecting that the cash has been taken it may broadcast a "CASH_TAKEN" message to reset all the modules to their initial condition ready for another user.

From the above description it is apparent that the messages listed in the first column of FIG. 5 can be used to drive individual application modules and thus the operation as a whole in the manner illustrated. Since the messages are broadcast they are available to all of the application modules. However in many cases only one application module or only some of the application modules may make use of certain messages. For example card reader 13 may need to know the amount of any cash withdrawal figure entered by the user so that it can update the card appropriately should that cash withdrawal be validated by server 16 and dispensed by cash dispenser 15.

Not shown in FIG. 5 are the various communications that may take place between individual modules and server 16 and legacy Host 18. Where each application module has an independent connection through communication link 17 to server 16 it can communicate directly and independently with it. For example a request may be made for information specific to the user and appropriate to conduct the current transaction. Thus dispenser 15 may require the users current balance in order to determine if the user had sufficient funds to cover a requested cash withdrawal. User interface 12 may require account balance and bank statement information in order to present these to the user.

By having a direct connection from the peripheral devices to the server it is possible to allow the peripheral application modules to take a more active role in the overall operational flow and to conduct appropriate sections of the transaction business logic along with their own error handling. This allows the user interface application 12 to concentrate on its primary task of providing user interface display graphics, animation and video facilities. Within the hardware embodiment of the invention illustrated in FIG. 2 the processing power required to operate individual peripheral devices can then be selected to optimize the cost/performance ratio.

EXAMPLE 3

FIG. 6 shows an ATM 30 connected to a legacy host 32 via a server 34, the ATM 30 having a card reader 36, a receipt printer 38, a cash dispenser 40, and a user interface 42 (including an encrypting keyboard and a display). These devices are generally with appropriate control software, and also require some form of embedded or local processing capability to conduct communications with the central processor and to implement commands received therefrom.

All applications software, peripheral device drivers and user interface files are commonly held in a mass storage device in the ATM 30. Typically these applications are large, monolithic systems with a central program 44 being used to control all aspects of the operation of the ATM 30. This central program 44 runs on a central processor and, for example, determines what graphics are presented to the customer on the display, retrieves encrypted PIN information from the card reader and passes it to the encrypting keyboard for validation, and checks that the person's account has sufficient funds if a cash withdrawal is requested.

This central program 44 also includes the necessary business logic (which integrates and manages the different functions of the terminal) and error handling routines (which minimize the possibility of the terminal having to go out of service due to a malfunction). Therefore, design of this central program 44 is very complex and time consuming. In addition, updating device drivers or applications software associated with a peripheral device is complicated because of the size of the central program 44.

Referring to FIG. 7, there is shown a diagram illustrating the software control of peripherals according to one embodiment of the present invention, wherein like numerals in FIG. 7 refer to like features in FIG. 6. In FIG. 7, an ATM 46 includes four peripherals 36,38,40,42 each having an associated control application 50,52,54,56. For example, a card reader 36 has an associated card reader control application 50. Each of the control applications is connected to the server 34 via a communications controller 58 which is responsive to each of the control applications 50,52,54,56 for facilitating communication with the server 34. Each control application (e.g. 50) controls its associated peripheral (e.g. 36) using dedicated device drivers (not shown) for that peripheral.

Referring to FIG. 8 there is shown therein a block diagram of a self service network 100 in the form of an ATM transaction network comprising an ATM 102 connected to a server 34 via a high order communications link 104 which is part of a wide area network. The link 104 provides efficient transfer of data from server 34 to ATM 102. A transaction database (or legacy host) 32 is also connected to server 34 via a conventional communications link 106.

ATM 102 houses a plurality of peripherals including a card reader 116, a receipt printer 118, a cash dispenser 120, an encrypting keyboard 128 and a display 130 (the keyboard 128 and display 130 together form a user interface). A typical ATM keyboard will have a numeric keypad and a small number of additional keys, which may be labeled "ENTER", "CANCEL" and so on. These peripherals 116, 118,120,128,130 are connected by an RS-232 link 136 to a central processor 138 housed in ATM 102.

ATM 102 also has a mass storage device 140 in the form of a hard disk. This hard disk 140 stores at least one device driver and at least one control application (50,52,54,56 in FIG. 7) for each of the peripherals 116,118,120,128,130. A TCP/IP protocol is used for communication within ATM 102.

When power is applied to ATM 102, the central processor 138 is initialized, which involves the device drivers and the control applications being loaded into the central processor 138 from the mass storage device 140. Each control application is an independent process running on processor 138. Once the device drivers and control applications have been loaded into the central processor 138, the control applications implement a team-building process to form a team of peripherals, as will be described below.

As part of the team-building process, the control application for each peripheral creates a functional group registry that is stored as a linked-list. A completed functional group registry 150 for the card reader control application is illustrated in FIG. 9A. This registry 150 has an entry for each peripheral that may be part of the team, including the card reader peripheral. Each entry has three fields: a peripheral identification field 152, a peripheral IP address field 154, and a port address field 156.

The peripheral IP address field 154 is the address of the processor on which the control application associated with that peripheral is running. Thus, in the FIG. 10 embodiment the peripheral IP address field 154 for each peripheral is the same, being the address of the processor 138 that runs all of the control applications. However, in embodiments where each peripheral runs its associated control application on its own processor then the address field 154 will contain the address of the peripheral processor, i.e. the address field 154 of each peripheral will be different.

The port address field 156 at which each peripheral receives signals is predetermined, having been written into the control application associated with that peripheral.

Initially, the registry 150 for the card reader control application will appear as shown in FIG. 9B because the control application leaves all entries in the peripheral identification field 152 blank except the identification of its associated peripheral.

Even though a peripheral receives power, it may not be available for use and therefore may not be available to join the team. For example, a peripheral may have been shut down because of a malfunction, or because it needs replenished with paper (in the case of a receipt printer) or currency (in the case of a cash dispenser). Therefore, the card reader control application performs a test of the card reader to ensure that the card reader is functioning correctly. If the card reader is functioning correctly then the control application indicates its availability to join the team by broadcasting a start-up signal (a "HELLO" message) to other control applications.

A broadcast message on a TCP/IP network uses a special reserved IP address (255.255.255.255). Every node (every device having an IP address) connected to that TCP/IP network receives the broadcast message.

The "HELLO" message includes an identifier for the peripheral being initialized and an address at which the peripheral receives signals. For example, the card reader control application would transmit the identifier "card reader", the processor address "178.132.152.212"(from processor IP address field 154), and the port address "6040" (from the port address field 156). The TCP stack within processor 138 would recognize that the IP address "178.132.152.212" relates only to itself and so would not transmit the broadcast over the physical layer. The control applications (running on processor 138) relating to the other peripherals would receive this "HELLO" message and if available to join the team would update their registries 150 accordingly.

If a cash dispenser control application transmitted a "HELLO" message with the identifier "cash dispenser", the IP address "178.132.152.212", and the port address "6010"then the card reader control application would update its registry 150 to include this information, as shown in FIG. 9C. Thus, each peripheral control application maintains a registry of the identity and address of all other active peripherals in the team.

Once the team-building process is complete, the individual control applications (50,52,54,56 in FIG. 7) running on central processor 138 use client-server techniques to communicate with server 34 to obtain customer specific transactional information from legacy host 32.

The team building process also allows display 130 to determine what peripherals are available and therefore what services should be displayed for offering to a user.

It will be appreciated that although all of the control applications are executed by the central processor 138 during operation of the ATM 102, each of the control applications (e.g. 50, see FIG. 7) is independent of the other control applications (52,54,56, see FIG. 7).

In the event of a malfunction during operation (for example if a card becomes jammed in card reader 116, or if paper jams in the receipt printer 118), a peripheral can withdraw from the team. This is effected by the control application for that peripheral sending a shut-down signal (a "GOODBYE" message) to indicate that it is no longer available. The "GOODBYE" message includes the identity of the peripheral that is withdrawing. Each control application in the team updates its registry 150 by removing reference to the withdrawn peripheral from the registry 150, thereby removing the peripheral from the team.

If a peripheral is physically removed, or if power to a peripheral fails then the first application module that attempts to send a message to the now missing peripheral will detect that it is missing and send a "GOODBYE" message on its behalf. In this case the "GOODBYE" message includes the identity of the missing peripheral rather than the identity of the peripheral sending the "GOODBYE" message. The control applications for the other (remaining) peripherals update their registries in response to this "GOODBYE" message.

When the peripheral is reconnected its associated control application will broadcast a "HELLO" message to allow the other control applications to update their registries 150. Once the team-building process is complete, any newly joining peripheral will require information about the current members of the team. Therefore, when a "HELLO" message is received after the team-building process has been completed, each active control application (i.e. the control application for each active peripheral) retransmits a "HELLO" message to allow the newly joining peripheral to create an accurate registry 150 for the team.

The individual control applications are arranged to operate as a team, with each application module being considered as a team member or peer. Having a common application flow for all control applications ensures uniformity in the way that each control application interfaces with other control applications and with any other devices in the ATM 102.

The control applications are event driven. Internal events (for example, user input or hardware activity) drive the state of each control application. As the state of a control application changes it transmits appropriate messages to all the other members of the team (i.e. all other active control applications). These event-based messages are used to enable other control applications to set themselves to an appropriate state.

As the state of any control application changes an event message is broadcast to allow the other members of the team to act appropriately. The state of a control application may change as a result of, for example, a hardware event, a user input, or a time-out condition.

The transaction terminal described herein operates as an event driven system. Messages are transmitted from the control application for a peripheral within which an event has occurred to other control applications within the ATM 102. These other control applications may, or may not, be concerned with that event. A typical transaction sequence is illustrated in FIG. 10 for ATM 102.

Referring now to FIG. 10 the first column 160 shows a sequence of events and their associated event messages. The second 162, third 164 and fourth columns 166 show operations of display 130, card reader 116 and cash dispenser 120 following generation of each event message listed in the first column 160. In the second column 162, which shows the operation of display 130, the statements within quotation marks are examples of the text displayed to a user.

Where ATM 102 is operating with a team of peripherals comprising: card reader 116, receipt printer 118, cash dispenser 120, keyboard 128, and display 130; in the event of insertion of a card by a new user into card reader 116 a message "CARD-INSERTED" is transmitted by the card reader control application to the other peripherals in the team.

The effect of that message is to cause display 130 to display the text "Please enter PIN". When the user has entered a PIN number a 'Validate User PIN operation takes place. This might involve the use of link 104 to communicate with legacy host 32 via server 34. If the entered PIN number is found to be valid for the particular card that has been inserted into card reader 116 then display 130 is informed accordingly whereupon its control application generates a "USER-VALID" event message. This causes display of a cash selection request. The user then enters a specific amount that causes the transmission of the next event message, namely "CASH-REQUEST".

The "CASH-REQUEST" message causes operation of cash dispenser 120 to count out the requested amount while at the same time display 130 causes the text "Your cash is being counted" to be displayed on the screen. When cash dispenser 120 has completed its task, its associated control application generates and transmits a "CASH—STAGED" message. On receiving the "CASH-STAGED" message, card reader 116 presents the inserted card partly out of a card entry slot in ATM 102 to enable the card to be removed by the user. The control application associated with the card reader 116 then transmits the event message "CARD-PRESENTED" which in turn causes display 130 to display the text "Please take card".

When card reader 116 detects that the card has been taken its associated control application generates and transmits a "CARD-TAKEN" message. On receipt of this "CARD-TAKEN" message, the cash dispenser 120 presents the cash that it counted out. When the cash has been presented, the control application associated with the cash dispenser 120 generates and transmits a "CASH—PRESENTED" message to cause display 130 to display "Please take cash". On dispenser 120 detecting that the cash has been removed its associated control application transmits a "CASH—TAKEN" message to all of the control applications associated with the modules in the team. On receipt of the "CASH—TAKEN" message, each control application associated with a peripheral in the team resets its respective peripheral to its initial condition ready for another user.

From the above description it is apparent that the messages listed in the first column 160 of FIG. 10 are used to drive individual application peripherals, and thus the operation as a whole, in the manner illustrated.

Although the messages are transmitted to all of the peripherals, in many cases only one peripheral or only some of the peripherals will make use of the messages. For example card reader 116 may need to know the amount of any cash withdrawal figure entered by the user so that it can update the card appropriately should that cash withdrawal be validated by server 34 and dispensed by cash dispenser 120.

Not shown in FIG. 10 are the various communications that take place between individual peripherals and server 34 and legacy host 32.

An alternative hardware architecture capable of providing an embodiment of the invention is shown in FIG. 11, which illustrates an ATM transaction network 200 comprising an ATM 202 having a plurality of intelligent peripherals including a card reader 216, a receipt printer 218, a cash dispenser 220, and a user interface 222. User interface 222 includes both a keyboard and a display unit.

The fundamental difference between the peripherals of FIGS. 8 and 11, for example card reader 116 and card reader 216, is that the peripherals in FIG. 11 are configured so that they operate individually and independently of any central processor, each peripheral being operable: to communicate directly with the server 34; to download software therefrom; and to run the downloaded software directly on its own processor. Whereas, in contradistinction, the peripherals of FIG. 8 are controlled from a central processor 138 which: communicates directly with the server 34; downloads software from the hard disk 140; and runs the downloaded software to control the peripherals.

However, in both embodiments (FIG. 8 and FIG. 11), the control applications for the peripherals, whether running on a central processor (FIG. 8) or in the individual peripherals (FIG. 11), communicate with each other and operate in response to signals generated by each other.

In FIG. 11, each peripheral 216,218,220,222 has an embedded processor, associated volatile memory (for example, 32 Mbytes), non-volatile memory for booting-up the peripheral, and a TCP/IP network connection. ATM 202 is connected to server 34 by a communication link 204, which is part of a wide area network (WAN); where the WAN connects a plurality of ATMs to the server 34. Link 204 is a high bandwidth network connection to allow for efficient and rapid download of software and uses the TCP/IP transfer protocol.

A feature of communication link 204 is that each peripheral 216,218,220,222 in ATM 202 is directly and independently connected to server 34 through link 204 and is thus an individual client to server 34. This is required for this embodiment because each peripheral must be able to download software independently of the other peripherals. In the same way as the FIG. 8 embodiment, server 34 is connected to legacy host 32 (which can be a basic banking information database) through communications link 106.

The control applications software used by peripherals in ATM 202 is stored in server 34. The same applications software can also be used by corresponding peripherals in other terminals of the network 200 that are linked to server 34. Thus, one advantage of this arrangement is that control applications software can be updated at the server 34 and all associated peripherals will download the updated software, thereby centralizing software upgrades.

In addition to link 204 providing a direct connection from each peripheral 216,218,220,222 to server 34, link 204 also enables communication to take place between the individual peripherals 216,218,220,222 of ATM 202. Thus information as to the operational state of any of the peripherals 216,218, 220,222 can be transmitted to all of the other peripherals 216,218,220,222.

When a peripheral (e.g. 216) is first powered-up, it uses non-volatile memory to boot-up and then transmits a message to the server 34. On receiving this message, the server uploads software to the peripheral to enable the peripheral to initialize and begin the team-building process.

Although the hardware architecture of FIG. 11 is different to that of FIG. 8, the team-building process and subsequent operation, as described with reference to FIGS. 9 and 10, are the same for the two embodiments. FIG. 12 shows a typical functional group registry 150' for the embodiment of FIG. 11, where each peripheral in the terminal has a different IP address because the processor in each peripheral runs its associated control application.

During operation, a request may be made by a peripheral to the server 34 for information specific to the user and appropriate to conduct the current transaction. For example, the cash dispenser 220 will require the user's current balance to determine if the user has sufficient funds to cover a requested cash withdrawal. User interface 222 may require account balance and bank statement information to display these to the user.

By having a direct connection from the peripherals to the server 34 it is possible to avoid using a central processor and a mass storage device.

It will be appreciated that the function of the communications controller 58 illustrated in FIG. 9 may be incorporated into the central processor 138 (FIG. 8 embodiment) or may be incorporated into each peripheral 216,218,220,222 (FIG. 11 embodiment), or may be a separate network router that routes data from each peripheral 216,218,220,222 (FIG. 11 embodiment) to the server 34.

The individual control applications that operate within either hardware embodiment of the invention (FIG. 8 or FIG. 11) are arranged to operate as a team, with each application module being considered as a team member or peer.

Various modifications may be made to the above described embodiments within the scope of the present invention, for example, the communications link 104 may be any convenient link and may be part of a local area network or it may be a dedicated link having a dial-up modem connection. In other embodiments, such as for a single off-site terminal, the communication link 204 may be a low speed dial-up modem. In other embodiments, a communications mechanism other than an RS-232 link 136 may be used, for example, a USB (universal serial bus), Firewire, or Ethernet link may be used.

In embodiments where a retail point of sale (POS) terminal is used in a network, the legacy host may be a retail information database. In other embodiments, the addresses at which other peripherals may receive signals may be written into the control application for each peripheral so that each control application knows the address of its associated peripheral and all possible addresses of other peripherals. In other embodiments, a different communications protocol may be used, for example, an RS-232 based protocol may be used instead of TCP/IP.

EXAMPLE 4

Figure 13:
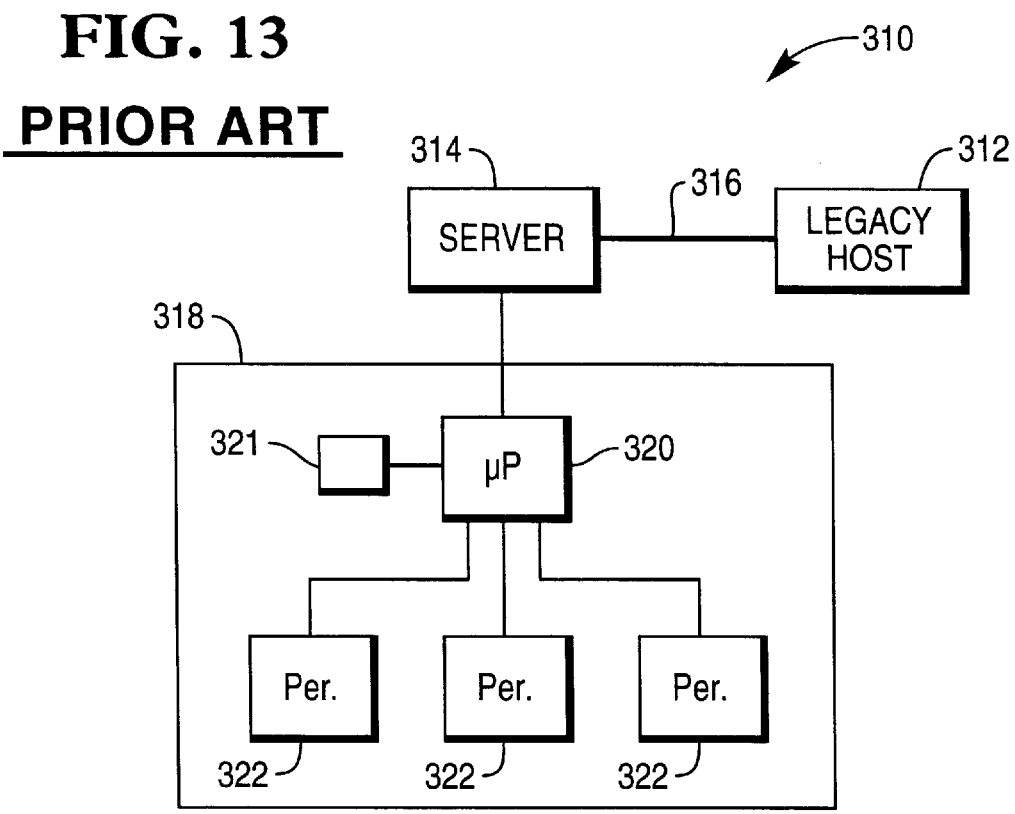
FIG. 13 is a block diagram of a conventional ATM-based transaction network.

Transaction networks comprise one or more transaction terminals connected to a server. A typical transaction terminal may be automated teller machine (ATM), a retail point-of-sale (POS) terminal, a self-service terminal (SST), or a transaction kiosk. ("SST" is a generalized term that would include transaction kiosks, POS terminals and ATMs.) FIG. 13 shows part of a conventional ATM network 310 in which an information database 312 (termed a legacy host) is connected to a server 314 by a communication cable 316. The server 314 is also connected to a terminal 318 having a central processor 320, typically PC-based, which controls the application flow (the order in which events may occur) and the associated user interface presentation for the terminal 318. The application files used by the application software are commonly stored on a hard disk 321 or other mass storage device within the terminal 318.

The network 310 is shown having one terminal 318, however, a plurality of other terminals, which may be of the same or of a different kind, may also be connected to the server 314. Simple client-server transactions are conducted between terminal 318 and the host 312 for obtaining specific customer information used in the processing of a customer's transaction. In the case of an ATM the transaction may typically be a cash withdrawal or a balance request. In the case of a retail POS terminal a typical transaction is a price lookup.

Terminal 318 includes peripheral devices 322 (referred to hereinafter as "peripherals") that are often very specific to the function of the terminal 18. Typical peripherals included in an ATM are a card reader, a cash dispenser, a receipt printer and an encrypting keyboard. These devices are generally provided with appropriate control software and require some form of embedded or local processing capability to conduct communications with the central processor 320 and to implement commands received therefrom.

Figure 14:
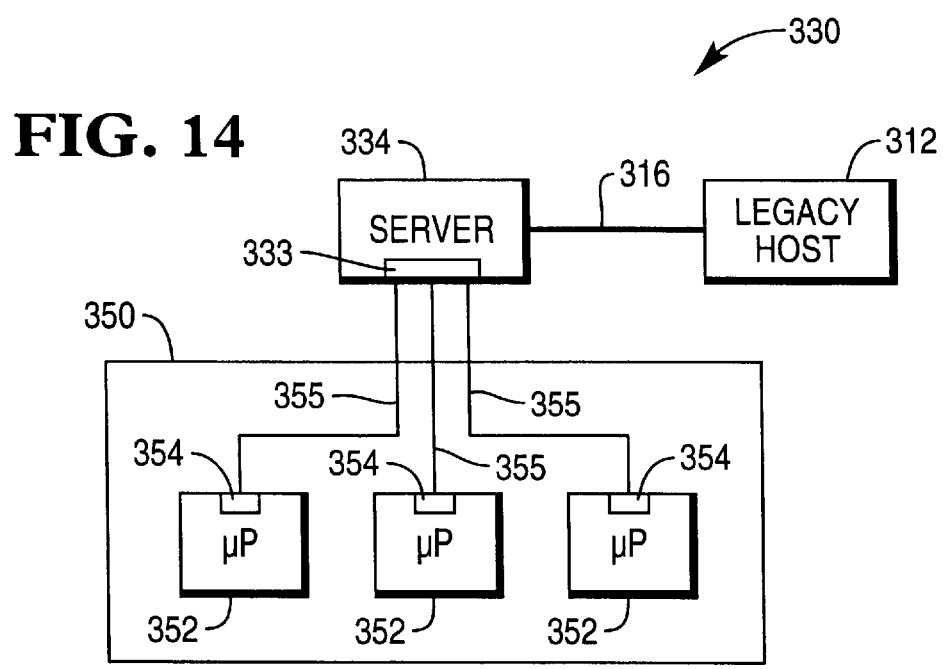
FIG. 14 is a block diagram of a transaction network according to one embodiment of the invention.

Referring to FIG. 14, there is shown therein a transaction network 330 including a legacy host 312, a server 334 and an ATM 350. The server 334 is very similar to server 314, the main difference being that server 334 stores software modules (such as applications software and operating system software) for use by peripherals within the ATM 350. The ATM 350 has three peripherals 352, each having communications hardware 354. The communications hardware 354 in each peripheral 352 is directly connected to a communication port 333 in the server 334 by a separate communication medium 355 in the form of a data cable. The hardware 354, medium 355, and port 333 together form a communication link, so that each peripheral 352 has a separate communication link. However, having separate cables 355 connecting the server 334 to the peripherals 352 may be undesirable because of the proliferation of cables that would result from increasing the number of peripherals.

Figure 15:
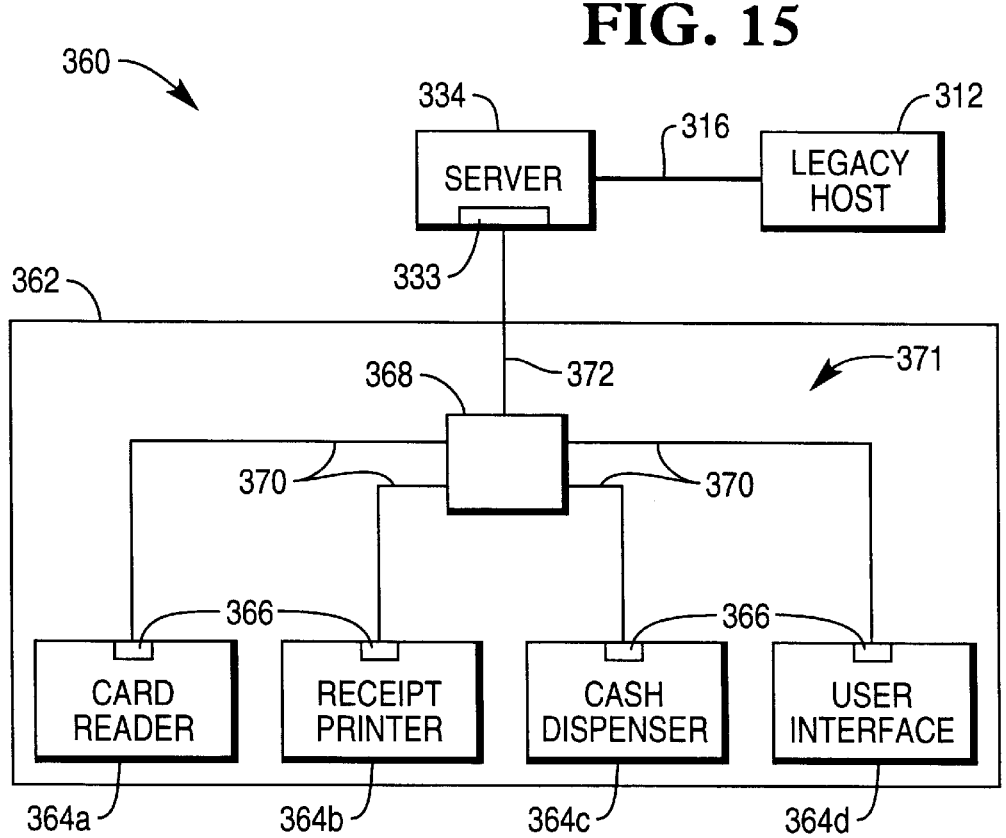
FIG. 15 is a block diagram of a transaction network according to another embodiment of the invention, showing a router connecting four peripherals in a terminal to a server.

FIG. 15 is a block diagram of an ATM transaction network 360 in accordance with another embodiment of the invention. ATM network 360 includes an ATM 362 that contains four peripherals 364: a card reader 364a, a receipt printer 364b, a cash dispenser 364c, and a user interface 364d.

Each peripheral 364 has a network interface 366 (in the form of an Ethernet adapter, see FIG. 16) which is physically connected to a multiport router 368 by a network cable 370. The router 368 receives data on each of the cables 370 (from the peripherals 364) and concentrates this data onto a single cable 372 for transmission to the communication port 333 in the server 334. The communication port 333, Ethernet adapters 366, router 368, network cables 370, and cable 372 together form a sub-network 371 to which the peripherals 364 and the server 334 are connected. The sub-network 371 implements the TCP/IP protocol and allows open standard connection between each peripheral 364 and the server 334, and also between different peripherals (e.g. 364a and 364b).

Sub-network 371 thereby provides a communication link between a peripheral 364 and the server 334. Thus, there is a communication link for each peripheral 364, whereby each peripheral 64 is able to download software directly from the server 334.

Although the peripherals 364 are connected to the server 334 via the router 368, each peripheral 364 has independent access to the server 334 and is operable to download software modules directly therefrom (i.e. software modules are not first downloaded to an intermediate location and then copied to the peripherals 64 from the intermediate location). The router 368 does not store any software modules being downloaded, it merely facilitates downloading by managing the communication between the server 334 and the peripheral 364 which is downloading the software. It will be appreciated that the flow of information is two-way, a peripheral 364 being operable to transmit information to the server 334. It will also be appreciated that the ATM 362 has no mass storage device for permanently storing the downloaded software: all downloaded software is stored in memory. In this embodiment volatile memory is used; however, in an alternative embodiment non-volatile memory could cache downloaded software for immediate access on power-on with software updates being applied via the download process described.

Each type of peripheral (e.g. a card reader 364a) needs a different software module (or modules) to other types of peripherals (e.g. a receipt printer 364b); however, all peripherals of one type (e.g. all card readers 364a) need the same set of software modules. Therefore the server 334 stores a set of software modules for each type of peripheral (e.g. 364a) in the network 360; where a set of software modules may contain one or more software modules.

Figure 16:
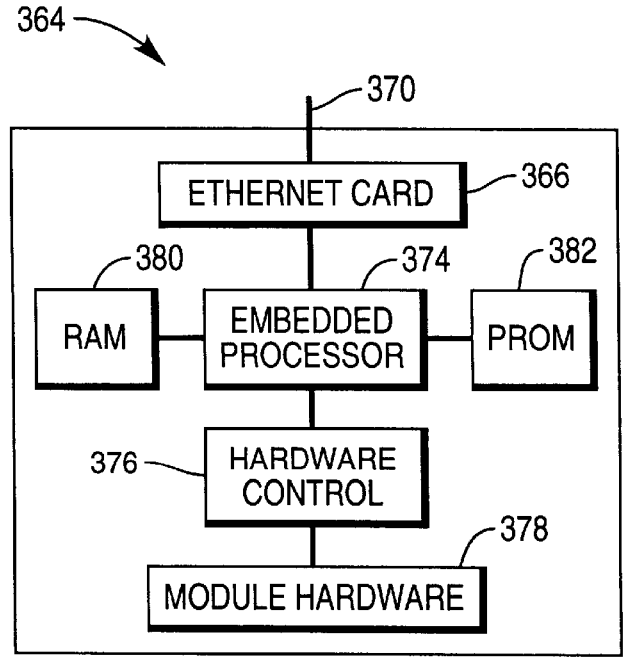
FIG. 16 is a block diagram showing one of the peripherals of FIG. 15 in greater detail.

FIG. 16 shows a block diagram of one of the peripherals 364 of FIG. 3. The peripheral 364 has an Ethernet adapter 366 (which is the peripheral communication hardware) having a unique MAC address. The Ethernet adapter 366 implements the TCP/IP protocol, and is in electronic communication with an embedded processor 374. Processor 374 executes JAVA® code, and communicates with peripheral-specific control electronics 376 which controls the hardware 378 in the peripheral 364. For a card reader peripheral 364a, the hardware 378 includes the card transport mechanism and the magnetic stripe reader. The processor 374 also has associated volatile memory 380 in the form of DRAM and nonvolatile memory 382 in the form of FLASH EPROM.

When a peripheral 364 is first powered-up, it requires an IP (Internet protocol) address. IP addresses are supplied by the server 334 which implements an ARP (address resolution protocol) and DHCP (dynamic host control protocol) service for allocating an IP address to each peripheral 364 which is connected to the sub-network 371. DHCP is a standard protocol that provides a way of dynamically allocating IP addresses to processors in a network. A range of IP addresses is assigned to the DHCP and each processor is configured to request an IP address from the DHCP server. The request and grant process uses a lease concept with a controllable time period for the lease.

When a peripheral 364 is first powered-up, its processor 374 uses FLASH EPROM 382 to boot-up and broadcast a message requesting an IP address. The broadcast message contains the peripheral's MAC address and a special "broadcast address", which is "255.255.255.255". This broadcast address is a standard feature of the BOOTP protocol; it means, transmit to every device on the subnetwork 371 that a peripheral with enclosed MAC address requires an IP address. The server 334 receives this broadcast message; allocates an available IP address; and sends a grant message to the peripheral that requested the IP address (using the peripheral's MAC address), where the grant message contains the peripheral's IP address and the server's IP address.

The newly powered up peripheral 364 receives this grant message and now knows its IP address and the server's IP address. Using this information the peripheral 364 can access the server 334 and download an operating system using a simple protocol such as TFTP (Trivial File Transfer Protocol). Once the peripheral has downloaded an operating system (in this embodiment JAVA® OS) it can store this operating system in the FLASH EPROM 382. This has the advantage that when the peripheral 364 is powered-up again it can load the operating system directly from the EPROM 382; however, the peripheral 364 will still need to obtain an IP address from the server 334 using BOOTP.

When the peripheral 364 has received its IP address and its operating system, it can then use the TCP/IP protocol to download its applications software module from the server 334 to the volatile memory 380.

One advantage of using router 368 is that the router 368 can auto-detect how much bandwidth the Ethernet adapter 366 within each peripheral 364 requires (for example, whether it requires 10 Mbytes per second or 100 Mbytes per second). Most of the peripherals, for example, card reader 364a, receipt printer 364b, and cash dispenser 364c only receive large amounts of information (software) when they are downloading software modules; at other times they only send or receive small amounts of information; thus, these peripherals 364a,b,c can operate on a low bandwidth channel (10 Mbytes per second). However, the user interface peripheral 364d frequently downloads large amounts of information to update the display; so peripheral 364d operates using a high bandwidth channel (e.g., 100 Mbytes per second).

Another advantage of using a router 368 is that the router 368 may ensure that any messages that are sent by one peripheral (e.g. 364a) within the ATM 362 to another peripheral (e.g. 364b) within the same. ATM 362 are not transmitted to the server 334 or to any other terminal in the network 360. This reduces the amount of traffic on the network 360 without adversely affecting communication between peripherals 364.

When a peripheral 364 has downloaded all necessary software modules from the server 334 then it is ready for use by the terminal 362. The terminal 362 may use one of a number of possible application architectures. For example, in one architecture a master/slave relationship exists, where the user interface peripheral 364d is the master and the other peripherals 364a,b,c are the slaves. The user interface 364d controls the application flow and instructs the other peripherals 364a,b,c to carry out specific tasks (e.g. the card reader may be instructed to read a card, the receipt printer may be instructed to print a receipt) as required. The user interface 364d issues commands over the sub-network 371 using TCP/IP.

In an alternative architecture a peer to peer relationship exists between the peripherals 364 a,b,c,d so that the peripherals 364 send message objects to each other to inform one another when significant application events occur. The peripherals 364 thereby operate in response to one another.

One advantage of the invention is that software upgrades are easily achieved by upgrading the software held on server 334 and restarting the peripherals 364 either directly at ATM 362 or via server 334. This allows for the remote administration of the entire transaction network 360 (which may include a large number of ATMs).

The ability of peripherals 364 within an ATM 362 to dynamically load required software modules provides for an efficient and easily controllable mechanism for supporting the required functionality. For example, if card reader 364a is to recognize different types of smart card and standard magnetic stripe cards then card reader 364a requires different software drivers depending on which type of card is inserted into the card reader 364a. These software drivers must be available and accessible to support the different types of electrical interfaces, data streams and communications protocols for each type of card.

By allowing the card reader 364a to download software modules from the server 334 as and when required the card reader 364 can load software modules during operation. Thus, if a user inserts a smart card, and the card reader 364a is currently configured for a magnetic stripe card (i.e. the card reader 364a has downloaded software driver modules for a magnetic stripe card), then the card reader 364a on detecting that the inserted card is a certain type of smart card will download the relevant software module for use in processing that type of smart card, as will be described with reference to FIG. 17.

Figure 17:
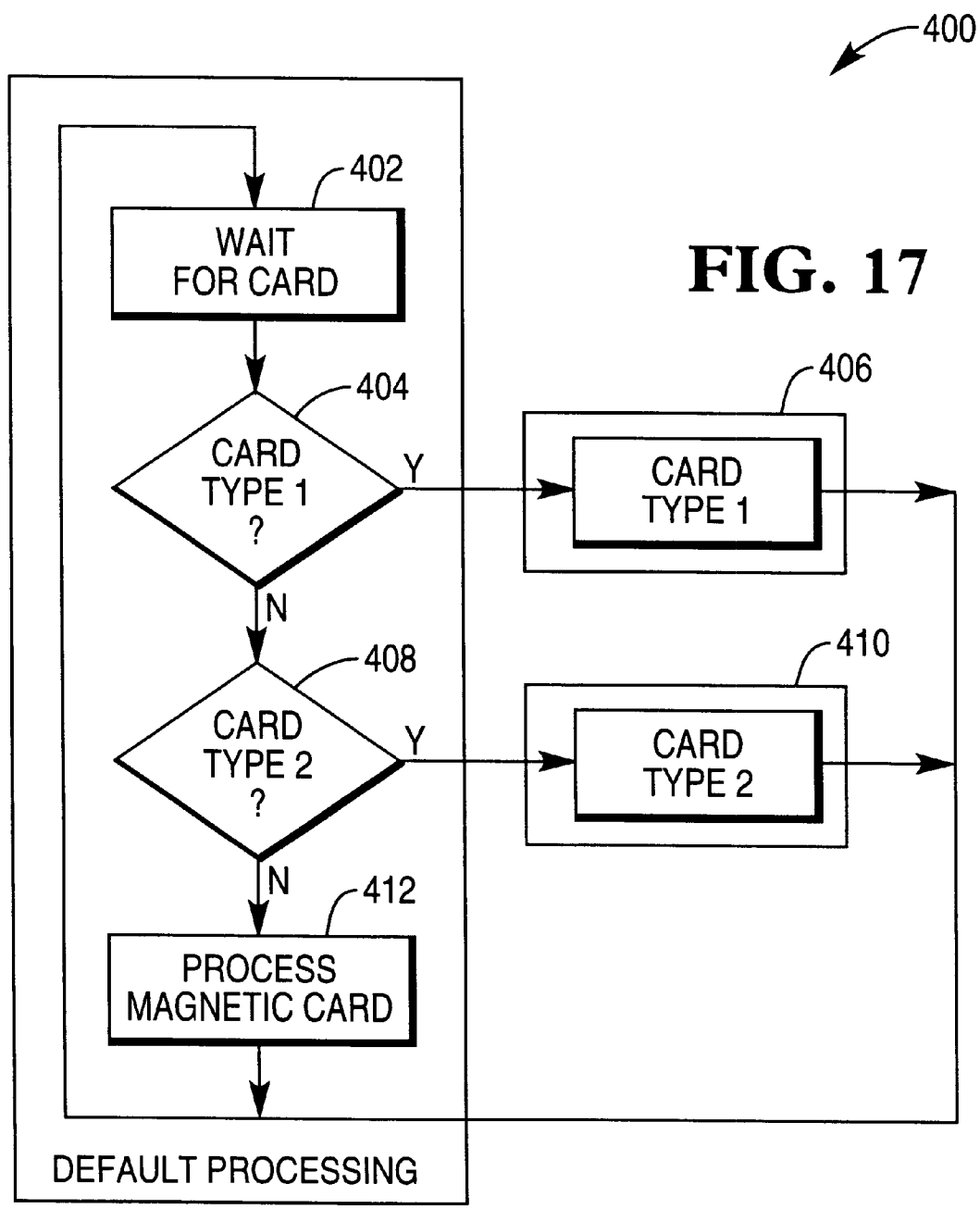
FIG. 17 is a flow chart relating to one of the peripherals of FIG. 15.

The flow chart of FIG. 17 illustrates the steps implemented by a card detection software module for recognizing two types of smart card. On powering-up, the card reader 364a will download this card detection software module and also a card driver software module, which by default is the software module for a magnetic stripe card. The ATM 360 then waits for a card to be inserted.

On detecting that a card is being inserted into card reader 364a the card detection software module provides for the required electromechanical operation to receive the card (e.g. the opening of shutters and the energizing of drive motors as required) and then identifies the type of card that has been inserted in accordance with the flow chart of FIG. 17.

Conventional ATMs that can read more than one type of card require all of the necessary software driver modules for the types of card that can be read to be available at all times during operation of the ATM. This is implemented by the ATM storing all of the required software driver modules locally. However, in ATM 362 it is only necessary to store the card detection software module because the required software driver module can be downloaded when it is needed.

The card detection software module recognizes only two types of smart card; however, if it is desired to support additional types of card then, the card detection software module only needs to be increased in size by a small amount sufficient to support the extra decision block and card type identification. Conversely, a traditional card reader would need to have its program increased by the total size of the routines required to process the extra type of card or application embedded in the card. Similar considerations apply to other modules such as the receipt printer 364b and the cash dispenser 364c.

Referring to FIG. 17, the card detection software module awaits insertion of a card (step 402). Once a card has been inserted, the software detects the card and determines if the card is a type one smart card (step 404). If the card is a type one smart card then the processor 374 (see FIG. 16) downloads a type one software driver module (step 406) from the server 334. When the type one software has been successfully downloaded the ATM 362 (see FIG. 16) processes the transaction.

If the card is not a type one smart card then the software determines if the card is a type two smart card (step 408). If the card is a type two smart card then the processor 74 (see FIG. 16) downloads a type-two software driver module (step 410). When the type two software has been successfully downloaded the ATM 62 (see FIG. 16) processes the transaction.

If the card is neither a type one nor a type two smart card then the software module assumes that the card is a magnetic stripe card and uses (step 412) the magnetic stripe card driver software module (which in this embodiment is downloaded as the default driver). The ATM 62 (see FIG. 16) then processes the transaction.

In the embodiment of FIG. 15, the server 334 may provide Internet or Intranet access, thereby allowing the receipt printer 364b to load Web pages from the server 334, in addition to loading the appropriate printer driver software modules needed to support the graphics, fonts and other imagery in the downloaded Web pages. Such software modules may be resident in server 334 and loaded to the printer 64b only as and when required. These software modules consist of code and data, so it is possible to load individual graphic imagery, along with its own printer driver software, for customizing receipts, statements and the like. It may be desirable to customize receipts and/or statements to promote a certain product or brand, or for tailoring the receipt to the user. These graphic images are transitory: taking up memory space in the printer module 364b only for the duration of their task (e.g., until they have been used by the computer).

Since each peripheral 364 has an independent connection to server 334 through a communication link, the peripheral 364 can communicate directly and independently with the server 334 not only to download software modules therefrom, but also to obtain data specific to a current transaction while the transaction is taking place. For example a request may be made for information specific to the user and appropriate to conduct the current transaction. Thus, cash dispenser 364c may require the user's current balance for determining if the user has sufficient funds to cover a requested cash withdrawal. User interface 364d may require account balance and bank statement information for presenting to the user.

Since each peripheral in ATM 362 is individually connected to server 334 the latest version of a particular software module can be made available to all ATMs in the network 360 by loading the new version of the software module into the server 334. This does not require physical access to any of the terminals in the network 60. In addition, terminal-specific software modules can be made available at the server 334. Such terminal-specific software modules may comprise marketing messages for display at the ATM 362.

By having a direct connection from the peripherals 364 to the server 334 it is possible to allow the peripheral software applications to take a more active role in the overall operational flow of the ATM 362. This allows the user interface processor to concentrate on its primary task of providing user interface display graphics, animation and video facilities. The processing power required to operate individual peripherals 364 can then be selected to optimize the cost/performance ratio.

It is desirable to monitor the operation of the peripherals 364 and for this purpose various logs and hardware tallies can be provided for. The embedded processor 374 (see FIG. 16) in a peripheral 64 can be arranged to generate such logs and tallies for use with an embedded web server for reporting the results. Access points can be provided over the network 60 to allow for diagnostic operations including the downloading of monitoring information. The reports can be in HTML form thus allowing a standard Web browser to access the information.

Various modifications may be made to the above-described embodiments. For example, in other embodiments, an ATM may be used as a general multi-media dispenser, where the media to be dispensed ranges from paper (in the form of currency notes, tickets, and books of stamps) to plastics media (such as ski passes). This requires the ability to dispense media types having different dispensing characteristics (such as timing and control parameters). Appropriate software modules can be readily downloaded by a media dispenser from a server at run time without the need to store every possible driver software module in the terminal housing the dispenser. In other embodiments, a different network protocol (such as an RS-232 based protocol) and different boot-up protocols may be used. In other embodiments, different network architecture to that shown for sub-network 371 may be used, for example the router function may be implemented by one of the peripherals such as the user interface. The processor 374 may not include a JAVA® virtual machine but may execute native machine code.

EXAMPLE 5

Client/Server concepts are introduced, with some of the potential shortcomings of existing Thick Client technology such as local storage, configuration and excessive processor performance being illustrated.

The use of this technology within existing ATM's is considered, with centralized WinTel systems and under used SDC processors being illustrated. The concept of the Thin Client as a stateless, application processor that loads all of its applications and data from the network is described. With no local storage these devices are lower in cost than their Thick Client cousins and can be administered more easily from the network. The Informa software product which is intended to be Thin Client based is discussed. While this product is currently still PC Core based, it will use Java applications to allow for dynamic download and reconfiguration. The Ultra Thin Client concept is offered as an extension of Thin Client, whereby individual peripheral modules of an ATM or POS terminal can be implemented as Thin Clients, giving dynamic reconfiguration and more efficient dispersion of processing power.

A driving factor of this example of the invention is the emergence of processors that can execute Java byte codes directly in silicon. Existing techniques for running Java applications either involve large processors running the Java Virtual machine that interprets the byte codes or the use of Just In Time compilers. The first approach has poor performance while the latter requires increased amounts of memory, an important issue in embedded applications. By executing the Java byte codes directly in silicon, performance can be regained without requiring excessive amounts of memory. The core silicon (picoJava) can be included in embedded Java processors.

The use of such processors in creating an Ultra Thin Client architecture is described. The Intel 8051 series processors and proprietary SDC used in ATM peripheral module control can be replaced by Java processors and industry standard TCP/IP networking to produce networked modules that could be connected together in combination with a Network Computer style user interface in order to provide a fully operational self-service terminal. The use of the same architecture within a Point of Sale terminal is illustrated to indicate the potential for retail transaction systems.

Various potential implementations of UTC are illustrated including the use of picoJava core silicon within a networked dispenser controller that could provide an industry standard module for use within transaction processing terminals of various vendors. Peripheral modules such as card readers and receipt printers could use discrete Java processors while various levels of user interface modules could be used dependent upon the level of display performance required for the application being provided.

In terms of software architectures, UTC can use standard Thin Client and Java techniques to load the Java OS and application code from the network. Traditional application architectures such as Master/Slave can be supported within UTC through techniques such as Remote Method Invocation, although this can reduce the effect of having disparate processing elements that are capable of running their own sections of the application as is presently preferred. Mechanisms for accessing legacy data and for supporting State of Health functioning through embedded servers and mobile intelligent agents can be incorporated.

Thin Client technology is a new form of computing architecture that is evolving within many Enterprise Information Systems as a replacement for existing Thick Client approaches. Thin Client uses fast networks and powerful servers to support Network Computers that are stateless, application processing systems permanently connected to the network. Proponents of the Thin Client and NC concepts claim that considerable improvements in the total cost of ownership of client end point terminals can be achieved within the enterprise information system context. These cost reductions occur through lower hardware costs plus savings in administration costs through the centralizing of applications and data.

Thick Client Architectures

Commercial transaction terminals such as ATMs have generally used a Thick Client architecture, whereby all of the application and driver software is stored locally to the terminal and is loaded to memory at start of day. Transient data used in transaction processing is obtained over dial up, high order communications or network connections to the legacy host.

Thick Client PCs are typically based upon the WinTel architecture (Windows Software such as Windows NT on Intel processors such as Pentium processors).

The Thick Client ATM's central processor is responsible for all application control, peripheral control, external communications, graphics and state of Health monitoring and reporting with a large, generalized processor being used to conduct all of these tasks. This solution is not the optimum for any of the tasks and requires a powerful enough processor to conduct them all through brute force. This requires a relatively large and costly processor.

This ATM architecture requires that a large central application control the user interface facilities of the terminal as well as controlling the disparate peripherals employed. Within Thick Client ATMs these, e.g., SDC based, peripherals generally already have processors of their own which are used for little more than hardware control and simple command processing.

The Thick Client models' use of terminal resident applications raises other issues. The local storage of all operating system software, device drivers, applications and data adds a unit cost for local storage media whether hard/flex disks or CD-ROM drives. There are also additional administration costs associated with upgrading applications that are becoming more significant as financial institutions see the benefits in having dynamic content on their ATMs as their primary interface to the consumer.

In its defense, however, the Thick Client architecture is well suited to traditional bank networks that use transactional based messaging to legacy hosts over the ATM Switch.

Thin Client Architectures

An alternative Thin Client model architecture has been introduced based upon the premise that all applications and their data are stored within the network and that client end points will load only those application and data segments necessary for the task at hand. The emerging Java networked computing environment is ideally suited for this. Its object oriented model splits applications into individual object classes that can be loaded over the network from a central server as they are required.

Thin Client or Network Computers (NCs) require no local storage capabilities thus reducing their initial cost. As all applications are stored at centralized locations and loaded to the Client on demand administration costs are reduced. The ability to provide upgrades and to introduce more dynamic content is also improved through this networked approach.

Thin Client technology has been implemented, for example for Informa based point of sale terminals. With peripherals including an LCD display, touch screen and card reader, this type of counter top system is intended to provide customer information and store loyalty card checking facilities. POS product versions may also have, e.g., receipt printer, cash drawer and bar code scanner capabilities. Informa may use a PC core as it's central processor running a Java VM (Virtual Machine) to allow Java based applications to be loaded from a retail branch network. Peripheral modules such as card readers and bar code scanners may be connected to the platform using serial or USB connections While such systems are still based upon a single central processor, it operates in a Thin Client mode with all applications being loaded over the retail store network from central servers. This approach assumes that an in-branch networked environment or Intranet exists, using Internet (e.g., TCP/IP) protocols.

The Thin Client architecture still requires a centralized application to present the user interface and control the peripherals. However, through the use of a Java VM, applications can be dynamically downloaded from the network. This allows for easier upgrades and allows the functionality of these terminals to be configured from a central location. In this way the administrator can turn a point of sale terminal into a Customer Information Terminal simply by issuing a new application.

Ultra Thin Client Architectures

In accordance with this invention, an Ultra Thin Client approach applies Thin Client concepts to the individual components and peripheral modules of a transaction terminal, such as an ATM, SST or POS terminal, with individual peripheral modules loading and running their own applications (e.g., Java applications) from the network. This concept is being made more attractive through the introduction of embedded Java processors. These allow the direct execution of Java applications in silicon rather through Virtual Machines and would load their application code from the network as with any other Network Computer. This approach reaps all the benefits of Thin Clients in terms of such things as software administration while the emerging Java processors allow for the application of the optimal processing power for the module concerned. The potential for these Java processors is considered first followed by the hardware and software architectures for the Ultra Thin Client model.

Java Processors

While Java is still a very young language there are various indications such as its use within Informa platforms and published white papers that there is a great deal of potential for Java not only as a programming language but also as an operating environment, based on the availability of embedded or other low cost Java specific processors.

While Java can be run on any processor and operating system through the use of an appropriate Virtual Machine, the Java byte codes are still only being interpreted causing a performance penalty against compiled, native code. By using processors that are specially designed to execute the Java byte codes directly, performance can be regained.

In accordance with the invention, the proposed Ultra Thin Client architecture would preferably use Java processors within each of the peripheral modules of a terminal. Rather than running Java applications on a Virtual Machine implemented on some general-purpose processor, the Java byte codes could be executed directly on the Java processor running the module.

Java in Silicon

Java byte codes can either be run through an interpreter (see FIG. 18, Case 1), which considerably slows down execution, or a Just In Time (JIT) compiler can be used, speeding up execution but expanding the code size by a factor of three or more (see FIG. 18, Case 2 ). The JIT approach is problematic in the memory-restricted environment involved in embedded applications, while interpreted code performance is poor.

An alternative approach is to execute the Java byte codes directly in silicon or through microcode and software traps. A Java CPU (processor) provides an environment in which to run Java with equivalent performance to native code without requiring excessive amounts of memory (see FIG. 18, Case 3 ). The Java CPU would run the Java OS (operating system), which presently requires about 512 KB ROM/128 KB RAM for memory and includes elements such as the class loader, byte code verifier, thread manager, constant pool resolution and garbage collector. Application byte codes are loaded by the Java OS and executed directly on the Java CPU.

Java Byte Codes are generally 8 bit opcodes with 0 or more operands. On average 1.8 bytes are required per instruction (a typical RISC processor requires 4 bytes per instruction). The Java CPU hard codes 85% of the opcodes with 14% being microcoded or implemented through state machines. The remaining 1% are trapped to software and emulated. Six new opcodes provide for hardware access.

PicoJava Cores

The basic core silicon for Java processors is known as "picoJava." This silicon description can be licensed from Sun Microsystems for use in various designs and it is presently used as the basis for embedded Java and other Java processors.

FIG. 19 illustrates the picoJava Core. The amounts of instruction and data cache provided in a design can be configured as can the inclusion of a floating-point data path. This allows for flexibility in terms of performance, silicon area used, cost, etc., allowing the optimum price/performance to be achieved for each embedded application.

PicoJava as a silicon description can be integrated with appropriate hardware control elements in order to provide a customized, embedded processor.

MicroJava Processor Series

The first level of true Java processor is code-named "microjava" and this combines picoJava with the other components necessary to provide a functional processor. Different performance and configuration levels will allow the systems designer to choose the optimal configuration for each application, ranging from corporate network computers (NCs) through consumer set top boxes to embedded industrial control applications.

MicroJava 700 Series Processors

Figure 20:
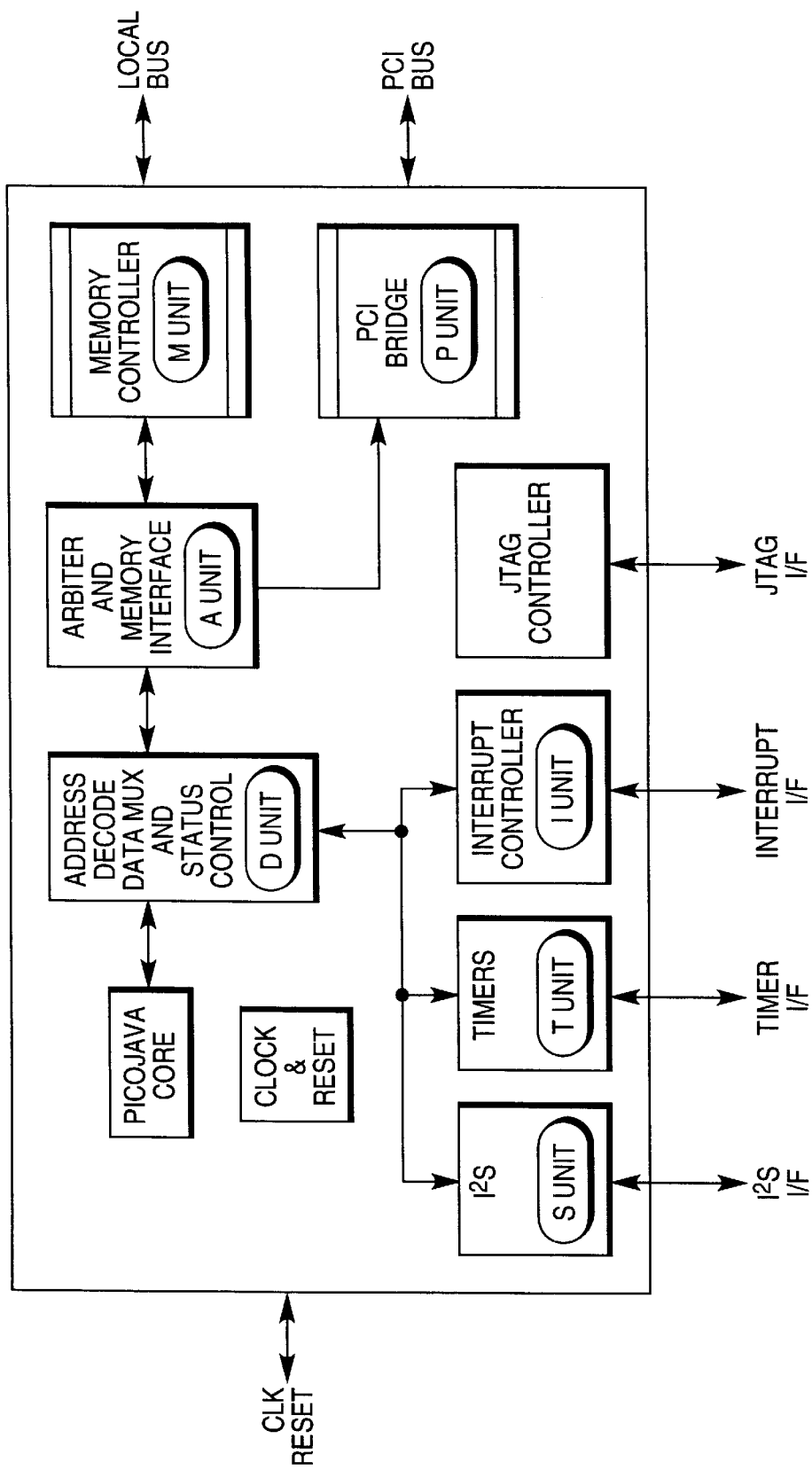
FIG. 20 is a functional block diagram of the microJava 701 processor core.

The microJava 700 series processors, a block diagram for which is shown in FIG. 20, are intended for use in the corporate NC market. Through an industry standard PCI bus these processors can be connected to standard Ethernet chips, peripheral I/O and graphics adapters in order to provide a complete Network Computer.

MicroJava 701 Specifications:

200 MHz picoJava Core.

16K Data Cache.

8K Instruction Cache.

Floating Point Unit (from SparcII).

Power Management.

8 Interrupts.

32 bit/33 MHz PCI Bus.

SDRAM/EDO/DRAM Controllers.

Flash ROM Controller.

MicroJava 500 Series Processors

Figure 21:
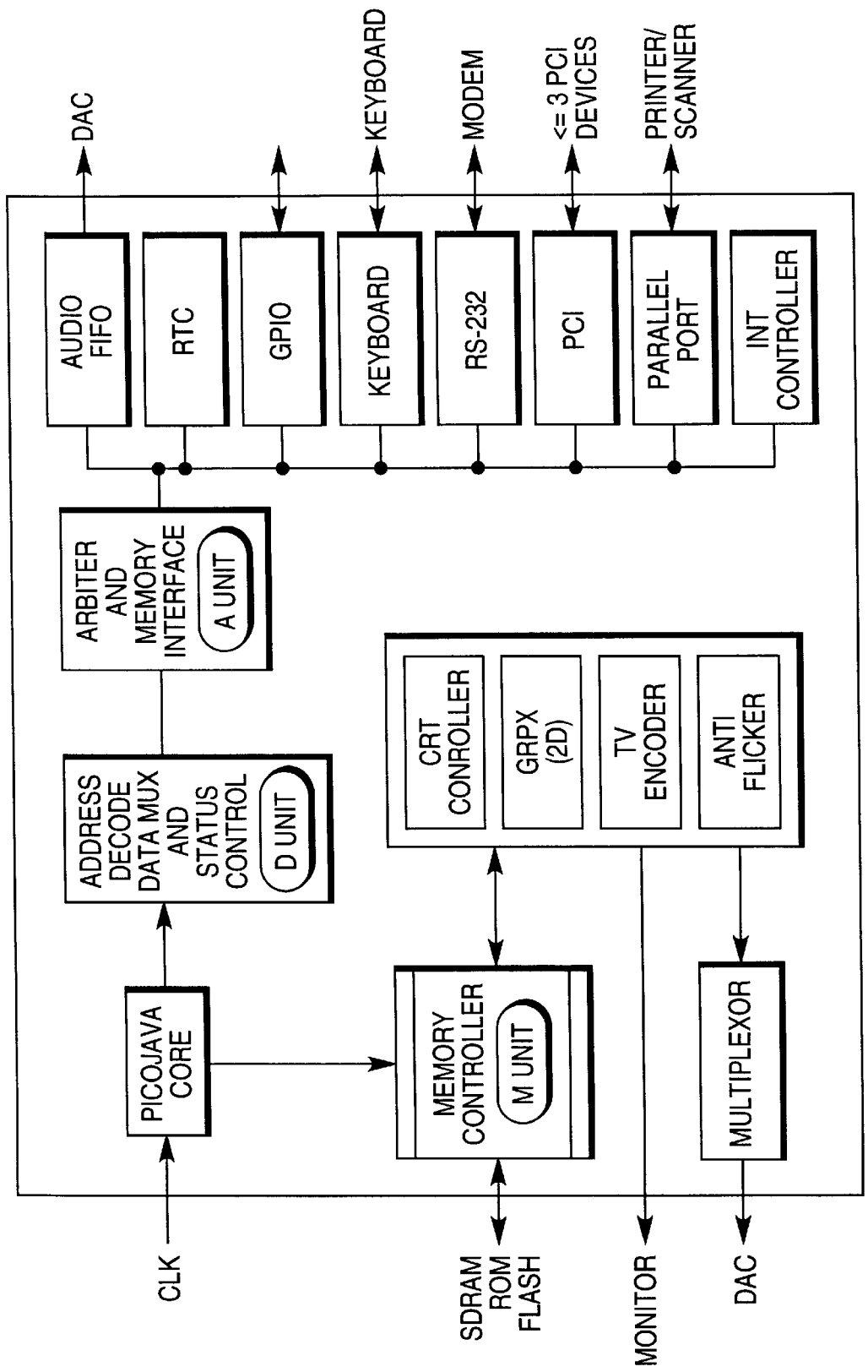
FIG. 21 is a functional block diagram of the microJava 501 processor core.

The microJava 500 series processors a block diagram for which is shown in FIG. 21, are intended for use in the consumer NC market and for set top boxes and DVD systems. While still based on the picojava core, the 500 series aims to integrate as much of the display and peripheral I/0 as possible into the silicon in order to provide high performance parts that can be made very cheaply due to the high volumes associated with the consumer market. The 500 series is targeted at modem technology rather than Ethernet and supports both TV and SVGA displays, again placing this device in the consumer market.

MicroJava 501 Specifications:

66/125 MHz picoJava core.

4K/2K Data/Instruction Cache.

Limited FPU.

PCI Bus.

SDRAM, Flash ROM.

Keyboard, Mouse, Serial Port.

High Speed Serial Port, Parallel Port.

SVGA (RGB) PAL/NTSC.

2D Graphics, CLUT/RAMDAC.

MicroJava 300 Series Java Processors

The microJava 300 series processors are intended for use within the industrial control market. These processors may closely integrate picojava core processing with Ethernet communications in order to provide for easily networked control processors. Such processors may be used in instrumentation and embedded control functions that do not require user interface display capabilities. This class of Java processor would be ideal for transaction terminal modules such as card readers and receipt printers.

ATM Terminal Modules

The peripheral modules that make up commercial Self Service Terminals such as card readers, dispensers, receipt printers etc., have used Intel 8051 series microprocessors. These are somewhat under used at present, being used for simple hardware control and command processing. An SDC communications structure upon which a number of these modules are based was developed some 10 years ago when no appropriate standards existed and this proprietary mechanism has precluded the ready use of these modules in other systems.

By embedding Java processors, either as off the shelf components (microjava 300 Series) or by using the picojava core to build module specific embedded processors, as for chip sets used in the dispenser module, it would be ideal for implementing an ATM as a series of networked modules. These Ultra Thin Client modules could be based upon industry standard TCP/IP network protocols allowing for dynamic download of Java based applications. As industry standards could be used rather than the proprietary SDC, there would be a greater potential for sharing of common modules within products of various manufacturers.

Ultra Thin Client Hardware Architectures

In accordance with the invention, the Ultra Thin Client architecture as applied within Self Service Terminals reduces the Thin Client concept to the level of the individual peripheral modules of the terminal such as the card reader or user interface. Appropriate Java based cores can conveniently operate each module as a networked component, with these components being networked together in order to create the larger terminal system.

This networked peripheral architecture allows for a highly configurable terminal architecture that allows various modules to be combined together to form simple information and point of sale terminals, through limited and full function ATMs to self service checkout terminals.

Networked Modules

Figure 22:
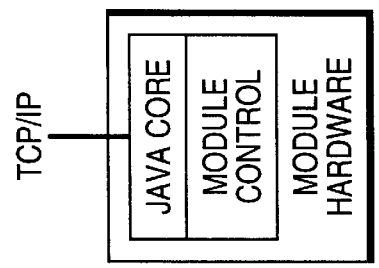
FIG. 22 is a block diagram of an exemplary use of a Java processing core implementation for control of a networked peripheral device or module, according to one possible embodiment of the invention.

In order to implement the Ultra Thin Client architecture within transaction terminals, individual terminal modules could be implemented so as to run Java applications over a TCP/IP network. FIG. 22 illustrates how a networked peripheral device or module could be constructed by combining a Java Processing core with module specific control electronics and physical hardware.

Existing RS-232 and SDC implementations of peripheral modules could be modified by retaining the modules physical hardware and control electronics and replacing the RS-232/SDC command processors with Java Cores and TCP/IP network communications.

Each module could thus operate as a Thin Client, loading its application software from the central network as necessary. Splitting up the functions of a given system into its constituent modules in this way allows the modules to operate over open standards such as TCP/IP.

Networked Peripheral Architecture

In order to construct an SST or POS Point of Sale terminal from these networked modules, it is possible to connect together a set of peripherals appropriate to the functions required.

Figure 23:
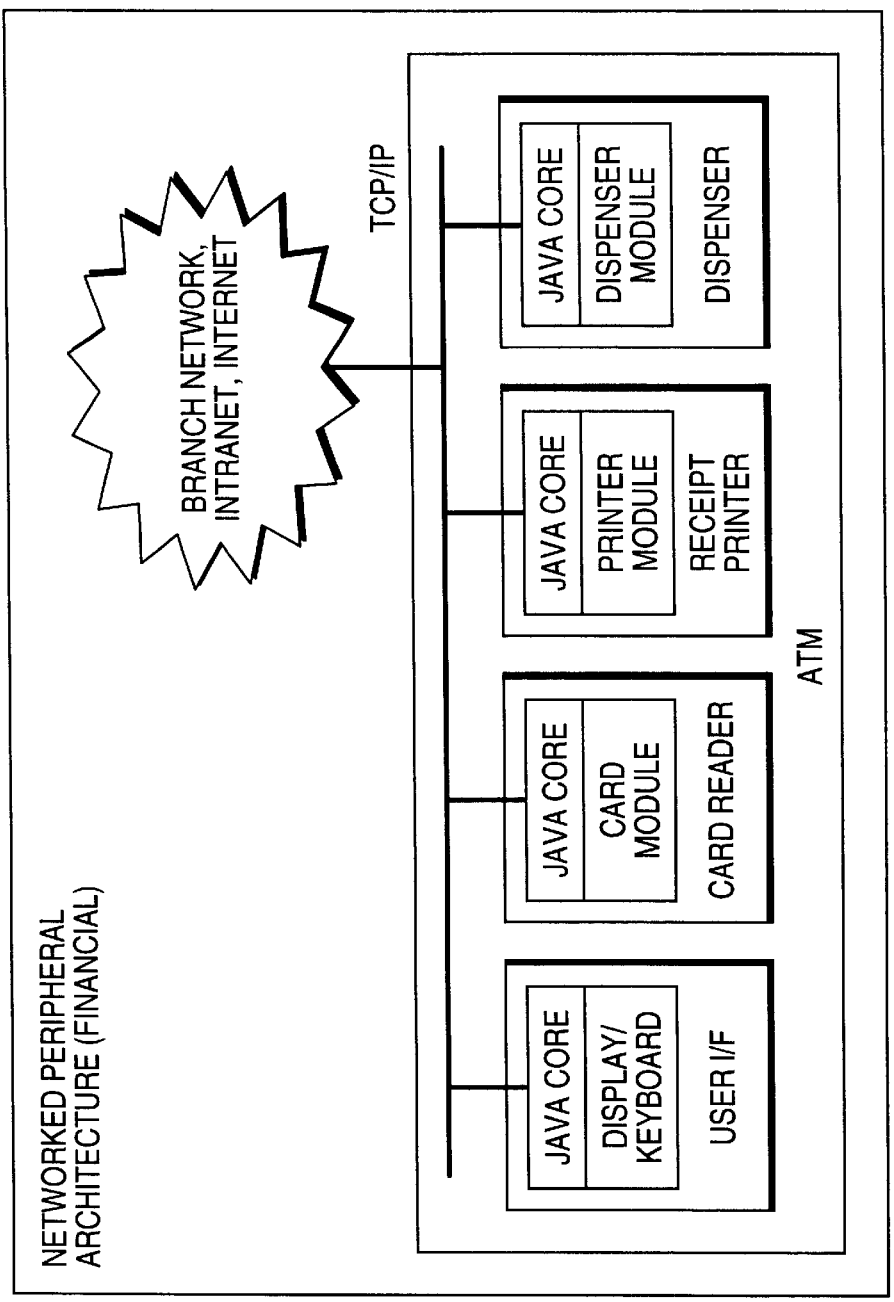
FIG. 23 is a functional block diagram of an exemplary ATM terminal made up of networked peripheral devices or modules, according to one possible embodiment of the invention.

FIG. 23 illustrates how an ATM can be created by connecting user interface, card reader, receipt printer and dispenser modules together. Mechanically the modules may remain as they are currently with a TCP/IP sub-net being created within the terminal to allow for an open standard connection between all of the modules. A router within the terminal can concentrate the individual network lines into a single TCP/IP connection to the branch network.

Figure 24:
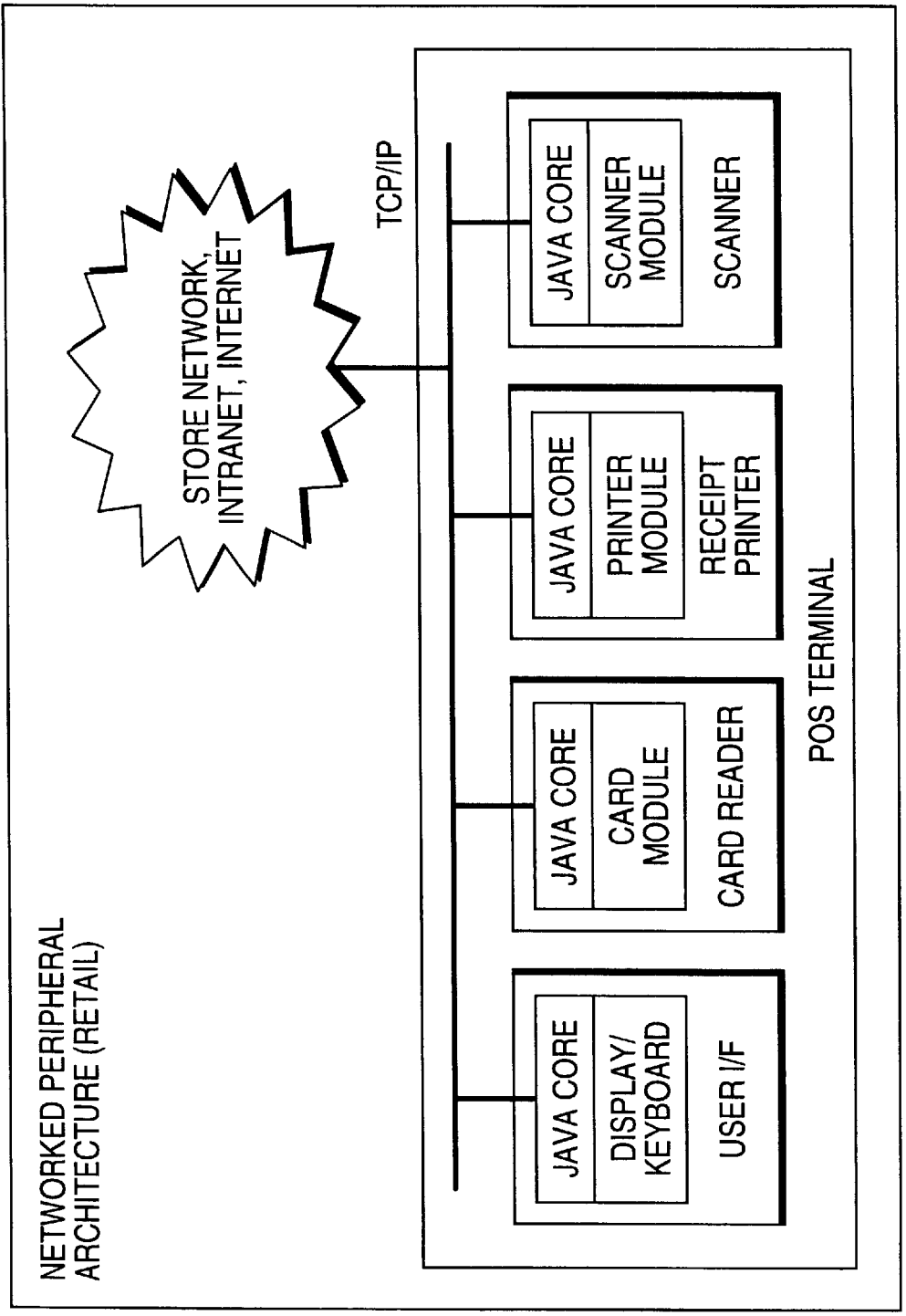
FIG. 24 is a functional block diagram of an exemplary POS terminal made up of networked peripheral devices or modules, according to one possible embodiment of the invention.

This Ultra Thin Client architecture can be easily used across different environments, allowing common modules and components being sourced in higher volumes and at a reduced cost. Using the user interface, card reader and receipt printer from an ATM system combined, e.g., with a bar code scanner module, the same ATM system modules and control software with similar applications could provide a POS terminal, as illustrated in FIG. 24. The retail store network can provide the necessary environment for the download of software and for connecting to stock and pricing information.

Networked Peripheral Implementations

There are a number of ways in which individual Ultra Thin Client, networked peripherals might be implemented dependent upon the capabilities and level of performance required.

Cash Dispenser Modules

Current implementations of the dispenser have used the proprietary SDC communication protocol using, for example, a Dance/Disco chip set that integrates Intel 8051 series core silicon with custom dispenser control electronics. These chips provide for highly integrated SDC peripheral functioning. Simpler and less proprietary RS-232 based dispenser controllers are also being developed, e.g., with appropriate drivers being written for operating systems such as Windows NT and OS/2.

Proprietary or high cost chip-sets and supporting SDC communications systems can be replaced by integrating a picoJava core with the dispenser control electronics and network electronics for an Ultra Thin Client architecture using Java Bean interface classes. This would provide a networked connection that could be integrated with NC technology for use in ATMs, teller stations and other kiosk and POS applications. A Java processor chip set for the cash dispenser would accordingly allow an industry standard networked dispenser module to be created.

Non-Display Modules

Modules such as card readers and receipt printers do not generally require display processing capabilities, just embedded Java processing. Proprietary SDC based controller cards have been used to operate such devices within current platforms.

Similar networked, Java controller cards can be used as direct replacements for such SDC controllers. These could use embedded Java processors, e.g., from the microjava 300 Series, which will preferably integrate Java processing and Ethernet connectivity. The selection of the appropriate microJava processor would allow the price/performance of each module to be tuned dependent upon the module's processing requirements.

User Interface Modules

The user interface is generally an every unit item and generally a dominant part of any transaction terminal application, no matter what application architecture is used.

Some form of user interface is a common component for all self-service and POS terminals, although different terminal types often require different display and keyboard configurations. In traditional systems, the user interface is driven directly from the central processor of the terminal; however, within the Ultra Thin Client environment, the user interface can be seen as just another one of the modules that go to make up the terminal. This has the advantage that the user interface module can be relieved of the responsibilities for state of health management (as individual modules can be made to take that on for themselves). A modular approach allows various levels of display performance to be created that can better align the price, performance and functionality required for each terminal.

Self Service Terminals

In terms of self-service terminals where the need is for a medium to large display device, either based upon a CRT or an LCD, a VGA/SVGA capable user interface module can be required. For simpler display capabilities such as text or limited graphics on monochrome displays lower performance Java processors can be suitable, as only a small amount of processing power would be required for display purposes. For more complex graphical applications with color graphics and animation, the set top box or higher level NC processors may be appropriate to provide sufficient performance for these extended display capabilities.

Video Kiosks

Where video enabled applications were to be provided, either to support video conferencing or as video playback for advertising purposes a PC based approach with a Java Virtual Machine would allow appropriate video processing cards to be added in order to provide an appropriate solution. Alternative platforms, similar to Sun Microsystems' Java Engine 1, may incorporate MPEG video capabilities with high levels of Java performance for use in multimedia kiosk applications.

Point of Sale Terminals

POS terminals that provide SST level display (e.g., by way of self-service, interactive terminals). Such systems may require equivalent processing capabilities to those of SSTs and can readily be implemented using the Ultra Thin Client architecture approach.

Cash Registers/Operator Interfaces

Where non VGA displays are required, such as character/graphic LCD panels used in operator panels and simpler POS terminals, embedded Java processors (e.g., microJava 300 Series processors) could be efficiently used to drive appropriate display electronics in an Ultra Thin Client architecture.

Ultra Thin Client Software

In accordance with the invention, Ultra Thin Client modules can operate in exactly the same way as Thin Clients and Network Computers, with the majority of their software being loaded from the network to which they are connected. By being Java based, such modules are inherently networked with a number of application architectures possible.

State of health, configuration and control facilities can be included directly within individual peripherals through the use of embedded servers and intelligent agent technologies.

Networked Environments

Ultra Thin Client modules can operate within a standard networked environment in exactly the same way as Thin Client or Network Computers do. Each UTC module preferably has a connection or communications link to a central server from which it loads its application software and optionally its operating system software.

Java OS

The operating system used by an Ultra Thin Client module can be the Java OS. This includes facilities such as thread management, garbage collection and class loading. The Java OS can either be stored at the UTC module, in ROM, or it can be loaded from the network upon module boot up. In the later case the module could typically have a very basic Boot ROM that uses Bootstrapping and TFTP protocols in order to access the server and load the Java OS operating system.

Application Software

In order to load the appropriate application, a Dynamic Host Control Protocol service can be used on the central server each time the module boots up. This service provides an excellent mechanism for software upgrades as only the software stored on the server needs to be managed with individual modules being managed automatically. This also provides a mechanism for the dynamic reconfiguration of module applications. As all configuration files can be held at the server, the administrator can modify the configuration and remotely re-boot any terminal. The new configuration and application can then automatically loaded to the modules of the terminal.

Application Architectures

The Ultra Thin Client approach allows a number of application architectures to be deployed, including traditional Master/Slave configurations as well as approaches such as the presently preferred Ultra Thin Team Architecture implementing this invention.

Master/Slave Application Architectures

In traditional ATM applications the central application is seen as the master with slave processes running on each of the peripheral modules. The master process sends commands to the slave processes that perform some operation and respond with status information. Slave processes may also respond in an unsolicited manner, as a result of some event, although typically the master process will be monitoring for such a response.

This architecture could be implemented within the Ultra Thin Client architecture in accordance with this invention. The user interface module could act as master with other peripheral modules acting as slave processes to it. A Java facility known as Remote Method Invocation allows the master process to 'Call' methods in slave processes within other network elements. This would allow for a traditional command/response paradigm.

Unsolicited responses could be supported through the master process providing a socket server that slave processes would send messages to. The socket server thread would generate events within the Java event model allowing the master process to receive unsolicited 'Events' upon which it could act in a normal manner.

This approach, while possible, defeats some of the ideas behind Ultra Thin Client architecture, by forcing the user interface to take on responsibility for the whole application and the associated processing requirements. Even with the possibility of devolving the state of health processing to the peripheral modules, which is in any event preferred, the full advantages of the Ultra Thin Client model are potentially under used in this master/slave application architecture.

Ultra Thin Team Application Architectures

The Ultra Thin Team Architecture is a software approach where each module maintains its own event driven version of the application state machine. The individual modules that make up a given terminal are seen as equivalent peers that send or broadcast messages in response to physical and software events within their module. Each module can be responsible for conducting its own activities within the application as a whole, with the messaging being used to synchronize activities.

As all modules can exist on the same network, any of them can use the services of the network and the central server, such as access to legacy host information. This differs from traditional systems where only the master process could directly connect to the legacy host and so had to conduct all transaction processing for the application. By allowing individual modules to conduct their own transaction processing, while increasing the amount of synchronization required, the overall processing load can be throughout the modules.

The UTTA approach allows individual peripheral modules to be used more extensively and can relieve the user interface module of some of its responsibilities, allowing it to concentrate upon its primary task of display processing.

Application Transaction Services

Java supports a number of mechanisms for transaction services that allow Java applications to access legacy host information. This allows existing account processing systems to be integrated with the new Java based delivery mechanisms.

The NCR Corporation's TopEnd Transaction Processing system has been supported under Java by Remote Client classes. These allow a Java application to instantiate transaction services such as 'Account' from which balance information can be obtained. These classes hide the complexity of accessing a TopEnd Server and legacy host behind simple Java method calls.

Application SQL Database Access

Sun Microsystems and others have been developing database access techniques based upon standards such as SQL. The JDBC API provides Java programmers with a uniform interface to a wide range of relational databases, and provides a common base on which higher level tools and interfaces can be built.

State of Health Monitoring

An extremely important feature of many commercial ATMs is their ability to monitor and report their State of Health. Given the high availability that is required of an ATM and the 24 hours a day 7 days a week operation mode, the ability to monitor the status of all components of the terminal can be vital. As replenishable items such as cash and receipt paper are used up the terminal should be able to detect and report this in order to allow for scheduled replenishment. In the case of situations requiring immediate attention such as a card or paper jam, the terminal should be able to report errors to an appropriate person in order that they can take corrective action.

The Internet/Intranet nature of Java and NC based approaches to the ATM Ultra Thin Client architecture facilitates use of technologies such as embedded web servers and intelligent agents to enable State of Health reporting as well as other maintenance functions.

Embedded Servers

Each Ultra Thin Client module can be a part of a branch or retail locations Intranet and as such can support embedded servers. These allow each module to provide either true Web server interfaces or proprietary interfaces by way of a proxy server. These can be queried for information on the status of the module by a remote client interface. Typically this would be done using standard Internet Web protocols, allowing communications via ordinary Web browsers, such as on a Thick Client (e.g., a PC with Netscape Communicator or MS Explorer) or an NC Client (e.g., with a Hot Java Browser). This technique would allow a replenisher or maintenance engineer to monitor individual modules of the ATM from their normal workstation. With the ability of mobile PCs to access the Internet over wireless/cellular connections, the need for an operator panel at the ATM is removed as the engineer could simply access the diagnostic functions of each peripheral from their mobile PC. Replenishers might do the same using personal digital assistants (PDAs) which can now similarly provide wireless access to the Internet.

Mobile Agents

Mobile intelligent agent technology can be readily applied using the Ultra Thin Client architecture in accordance with this invention. A Mobile intelligent agent is functional software (code and data) that is capable of transporting itself between interconnected computers. Upon arrival the agent software is able to run, within the confines and security permissions of its current host. Through standard interfaces the agent can query the host for information or can potentially present some form of user interface on the host's screen.

Using the Ultra Thin Client architecture Monitor Agents could roam the local network looking for any modules that were experiencing difficulties or monitoring their use of replenishable items. These agents could periodically return to their home server, reporting the condition of the network and allowing replenishment operations to be appropriately scheduled. The increasing number of ATMs going off-site to retail shops and petrol stations means scheduled replenishment will increasingly be an issue in ATM network management.

Intelligent service agents could automatically be sent out when branch staff logged in each day. These agents could identify the available replenishers to all of the modules within the branch. When a critical problem occurred such as a card or paper jam, the module could send off an alarm agent that could work its way round the list of addresses it has until it finds someone that can assist it (trained, authorized and at their desk). These agents could automatically move around the network querying the capabilities registered against each addressee and presenting a user interface on their terminal as appropriate. This would also work in the off-site environment as an alarm agent from an ATM in a petrol station could appear on the point of sale terminal for a simple fault or it could go off to a remote field service location when more complex problems occur.

Sun Java Engine 1 Description

Figure 25:
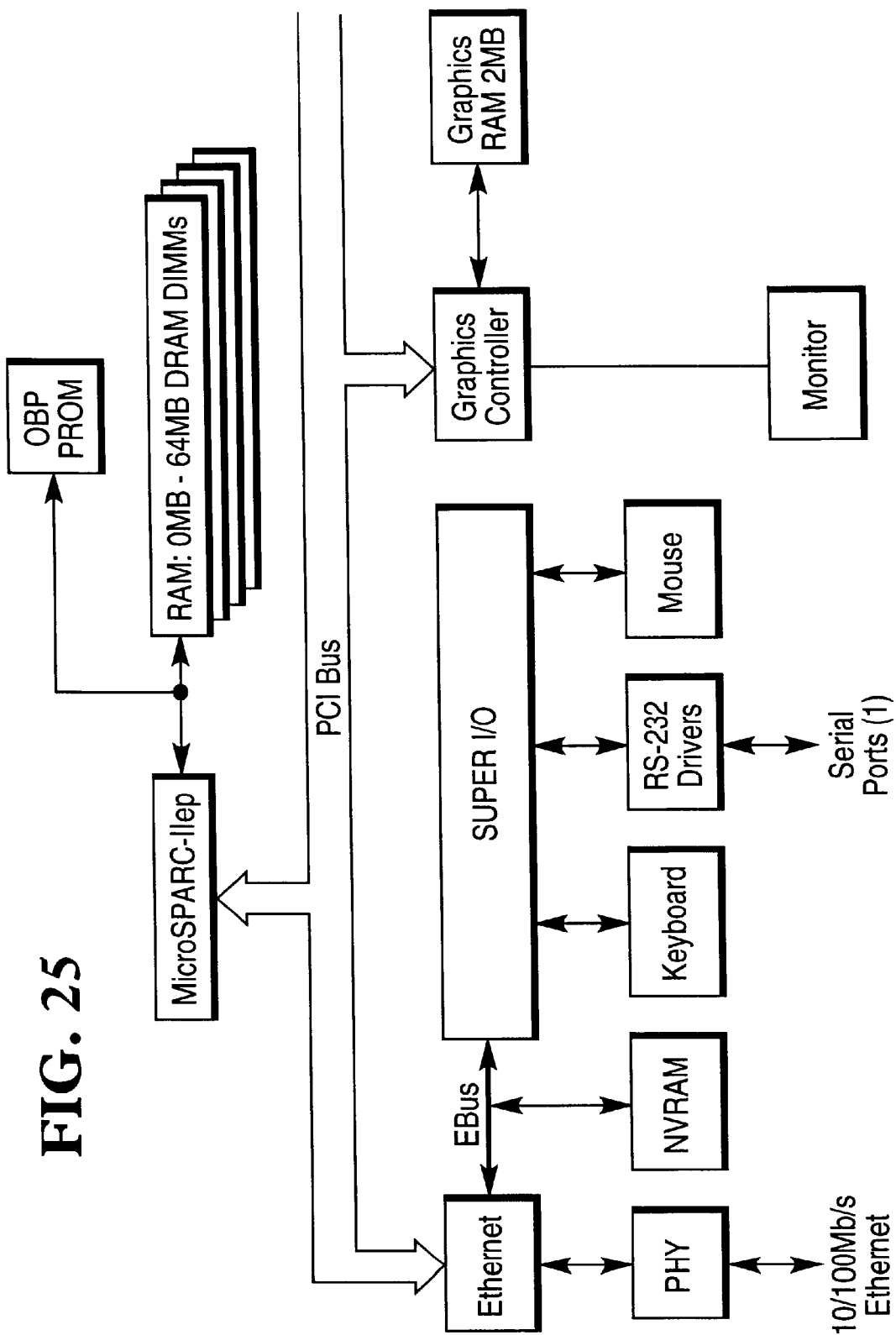
FIG. 25 is a functional block diagram of the Java Engine 1 Java processing board, designed for Thin Client or networked computer applications.

One version of a Java Engine I board made by Sun Microsystems uses a Sun MicroSPARC-IIep, providing a complete NC package on a single PCB that can be integrated with other components and packaging either as a stand alone NC or as part of an NC based embedded system. The block diagram shown in FIG. 25, illustrates the major components of this board.

The microSparc-IIep processor uses a standard PCI bus to connect to devices such as an Ethernet controller and graphics controller.

The Java Engine 1 uses a Flash PROM to boot from, using BOOTP and TFTP protocols to load the Java OS operating system from an appropriate server. Applications can be loaded using Dynamic Host Control Protocol from the same server. The actual application loaded can be controlled from the DHCP service on the server, thus providing for centralized administration.

Exemplary Ultra Thin Client Kiosk

Sun Microsystems' Java Engine 1 and other platforms may be used to provide a simple kiosk or point of sale terminal, as will be described.

Kiosk Hardware

Figure 26:
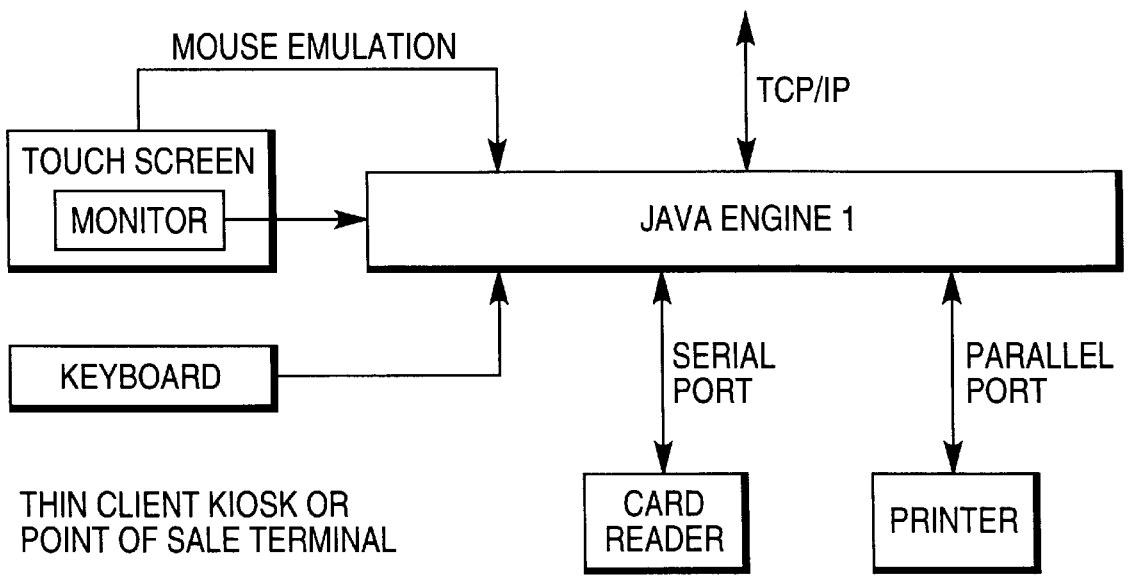
FIG. 26 is a functional block diagram of an exemplary use of the Java Engine 1 board shown in FIG. 25, for constructing a Thin Client POS terminal or kiosk.

The Java Engine 1 presently supports an SVGA display, standard keyboard and mouse ports, and serial and parallel ports. FIG. 26 illustrates how a simple kiosk or point of sale terminal might be constructed using a Java Engine 1 board.

Using electrical connections conforming to the PS/2 standard, the physical keyboard can be configured to be anything deemed suitable for the application. A kiosk used for interactive Web browsing might have a standard QWERTY format while a POS terminal might only present numeric and control keys.

Touch Screen technology has progressed to a level where mouse emulation is easily achievable giving easy access to generic applications. As Java is presently intended to operate with single button mouse configurations, the lack of a right button on a touch screen based mouse would not be an issue in a touch screen environment.

The serial port on the Java Engine could provide access to RS-232 Card Readers while the parallel port would allow a parallel printer to be used.

The Java Engine 1 is inherently networked over TCP/IP connections allowing for application download or on the fly reconfiguration (e.g., as required for Informa).

For off-site locations where only POTS lines are available, technologies such as the Northern Telecom 1-Meg modem could be connected directly to the TCP/IP port. This technology is intended to provide "always available" Internet (xDSL), allowing off site kiosk placement without changing the core configuration.

Kiosk Software

Illustratively, a basic kiosk application could be written in Java. This could be a self-contained Java application loaded over the network and run on the Java Engine 1 in a true Thin Client manner.

An alternative approach, in accordance with this invention, involves embedding browser technology within a Java application. The Java application could control access to peripheral devices such as the card reader and support a browser that provides an environment for Web based facilities to be used within a kiosk terminal.

In order to access the RS-232 and Parallel Ports on the Java Engine 1 appropriate drivers will be required. These ports could be used in this environment by providing appropriate Java Beans to represent card reader and printer functions. Applications would then be able to use standard processes without concern over the underlying implementation (microSparc-IIep or microJava 701).

Network Architectures

Some of the network issues associated with Ultra Thin Client are considered, such as bandwidth requirements, single line presence to the network, off-site connections.

Router Based Architectures

Figure 27:
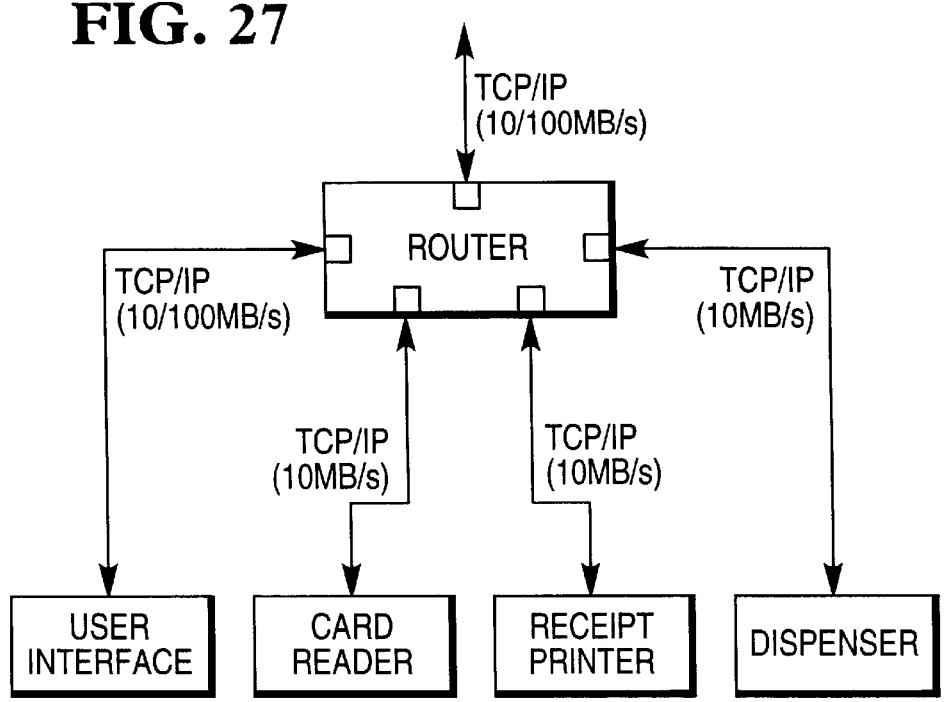
FIG. 27 is a functional block diagram of an exemplary ATM terminal made up of networked peripheral devices or modules, and using a network communications router, according to one possible embodiment of the invention.

In FIG. 23 a UTC financial system architecture is illustrated as having a network router to connect together all the disparate peripherals of the terminal, this is shown more clearly in FIG. 27. A primary reason for this is so that the ATM only presents a single network line to the branch network; however, the router can also provide access to different levels of bandwidth dependent upon the requirements of the peripheral. Modules such as the card reader, receipt printer and cash dispenser do not require high levels of bandwidth once they have loaded their applications from the central server. It is therefore appropriate to run these devices on lower bandwidth (less expensive) network devices at the expense of higher application download times. In the case of the user interface, however, this potentially has much higher bandwidth requirements, especially if browser type applications are being used, where graphics and web pages will be loaded dynamically. The user interface applications is may also be substantially larger than peripheral applications thus requiring larger bandwidth for application downloads.

An intelligent router function within the ATM would reduce external network traffic by not passing through internal messaging, ensuring that such messaging remained within the ATM.

Dual Port User Interface Design

Figure 28:
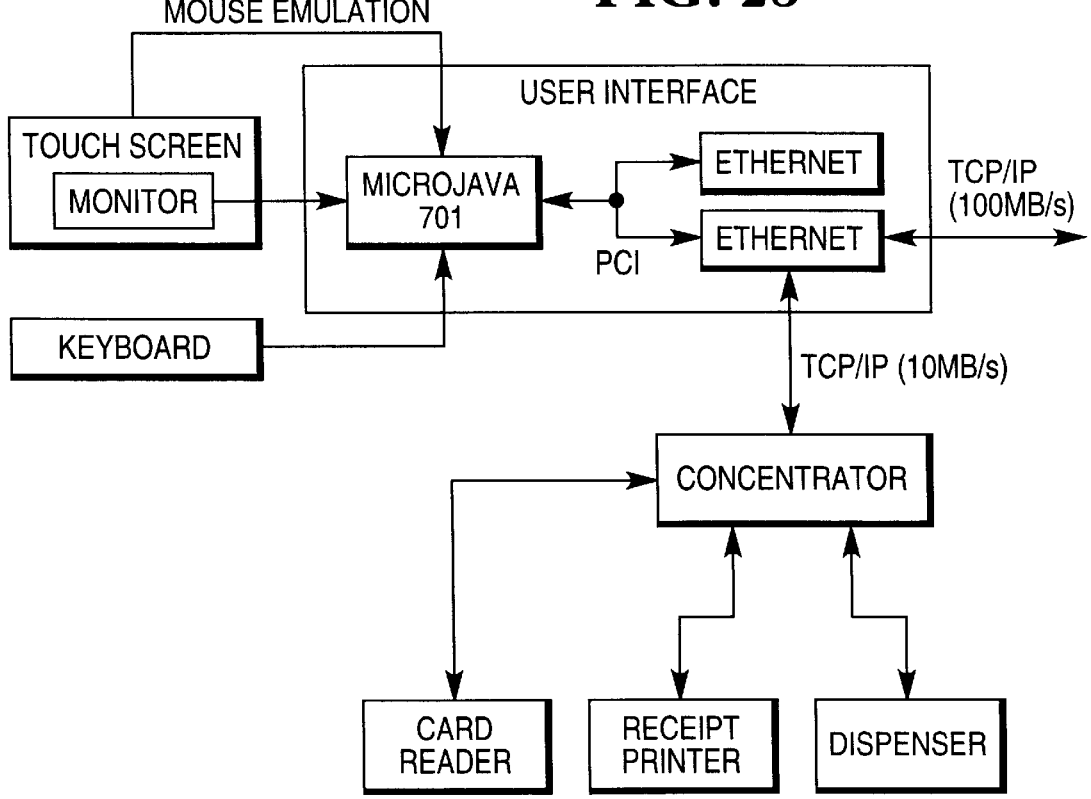
FIG. 28 is a functional block diagram of an exemplary ATM terminal made up of networked peripheral devices or modules, and using a dual port user interface, according to one possible embodiment of the invention.

An alternative approach is a dual port user interface as illustrated in FIG. 28. Here the user interface is physically in a master/slave relationship with the other modules, although the software architecture does not need to reflect that. A single connection is exposed to the external network with the user interface, again preferably having a high bandwidth connection to the server for application and graphics downloads.

The peripheral modules can operate on lower bandwidth, but still standard, network connections. A simple concentrator function is all that is required to provide the internal network connection.

Routing functions could be performed (typically in software) within the user interface element. Again the routing functions may be used to restrict internal, peer to peer messaging traffic to within the terminal. They also may provide for routing of messages to and from the 'slave' peripherals and the central server.

Modem Port User Interface Design

Figure 29:
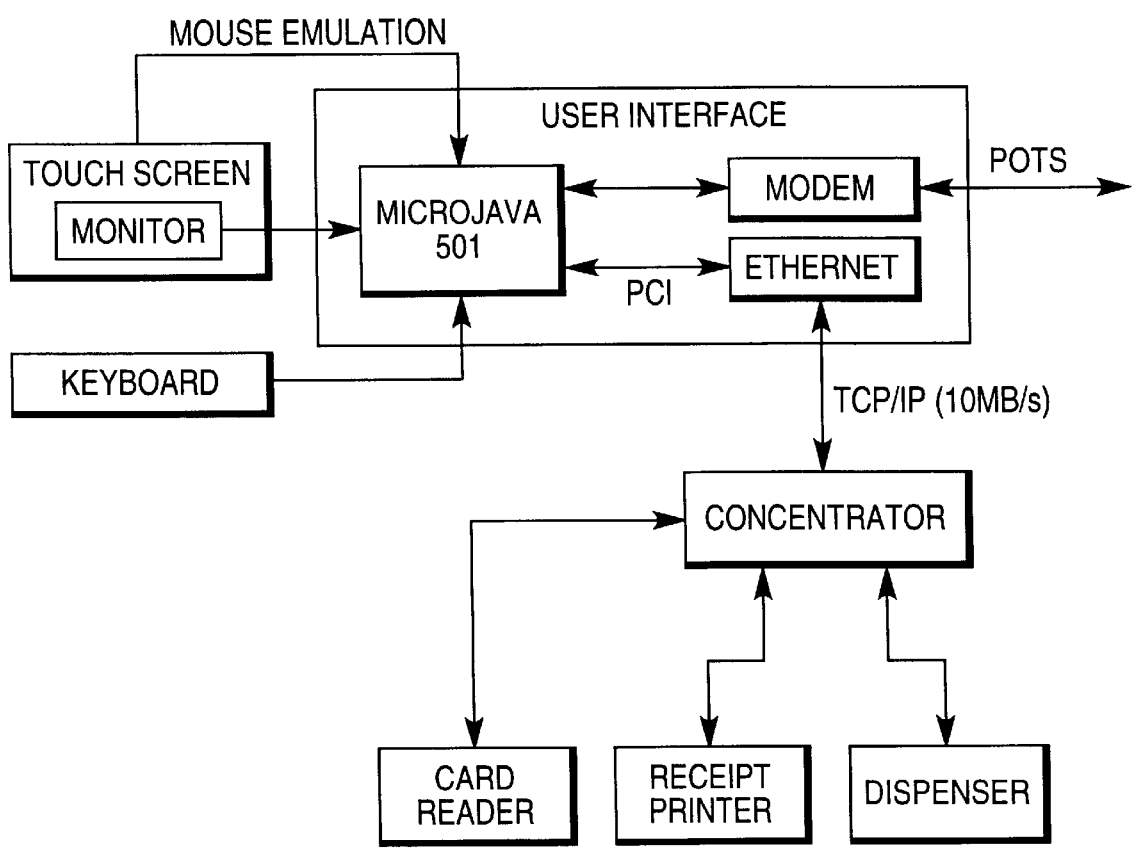
FIG. 29 is a functional block diagram of an exemplary ATM terminal made up of networked peripheral devices or modules, and using a modem port user interface, according to one possible embodiment of the invention.

A similar approach to the dual port user interface is to use a modem port approach as illustrated in FIG. 29. In this design the same internal architecture is used and as with all of these designs the peripheral modules may remain the same throughout. However, the inexpensive set top box technology (e.g., microJava 501) combined with using a modem based connection to the outside world allows this design to provide a cost effective solution for non networked environments.

Application download and response times will be less within this design although the type of functionality provided may not require complicated applications. Such a design would be useful in the bar top or convenience store ATM market where no network exists, but where Thin Client features such as dynamic application download and Ultra Thin Client facilities such as embedded Web servers and mobile intelligent agents may be extremely important.

EXAMPLE 6

The Ultra Thin Client concept is a move away from the traditional ATM architectures based upon a "Thick Client" central processor with disparate peripherals connected, e.g., via SDC.

Thick Client architectures are being replaced in some instances by the Thin Client or networked computer concept. In this a powerful, but stateless, machine is employed at the client end with all application software and data being loaded over standard networks from a central server. This allows for reduction in the cost of the client system while giving advantages such as centralized administration and automatic application upgrade.

The Ultra Thin Client concept is driven by advances in network branch/store environments and by the emergence of Java capable processors that could be embedded in peripheral modules.

In accordance with this invention, the Ultra Thin Client architecture extends the basic Thin Client approach to the level of the individual peripheral modules of the ATM or retail point of sale terminal. Java based processors would be used to operate individual modules such as the card reader, receipt printer and cash dispenser. The user interface can similarly be provided by a Java processor or by one of the emerging NC systems that provide Java Virtual Machines.

The Ultra Thin Team Architecture (UTTA) is an application architecture that has been designed to operate on the individual modules of a UTC based transaction terminal such as an ATM. It can use the capabilities of Java programming to provide module specific applications that are capable of collaborating in such a manner as to provide a complete ATM application.

The Java language can be used to implement UTTA; this allows messaging classes to be developed that are used by all the individual modules of the ATM. Each module can operates within it own Java Virtual Machine, either on the same physical machine or on separate physical Java capable machines. Alternatively, Java interpreters or Java processors can also be used.

UTTA provides a devolved application environment, where individual modules can be responsible for its own section of the application. Modules can communicate on a peer to peer basis by sending message objects over a TCP/IP network. A module registry function can allows individual modules to identify all the other members of the module team as they come on line, allowing for automatic configuration of an ATM at start of day.

UTTA applications can be event driven with each module maintaining an application state machine. By broadcasting messages to the other members of the team whenever a significant application event occurs, all members of the team can remain synchronized to the higher-level application flow.

The UTTA prototype provides user interfaces for the hardware control modules (card reader, receipt printer, cash dispenser) that allowed for the simulation of hardware events when appropriate hardware is not available. The prototype was used for demonstrations of the concept and could be used as part of an application development environment. The described interfaces can also simulate hardware failures again for use in application development.

The UTTA prototype used an NCR TopEnd transaction server to demonstrate how individual modules can obtain appropriate user account information that is required for them to operate their sections of the application.

While the aim of UTC is to use Java processors to operate individual modules, the UTTA prototype demonstrated how these Java based applications can use a socket connection to a Ulysses/SDC application in order to control legacy hardware.

Thin Client Architecture

Figure 30:
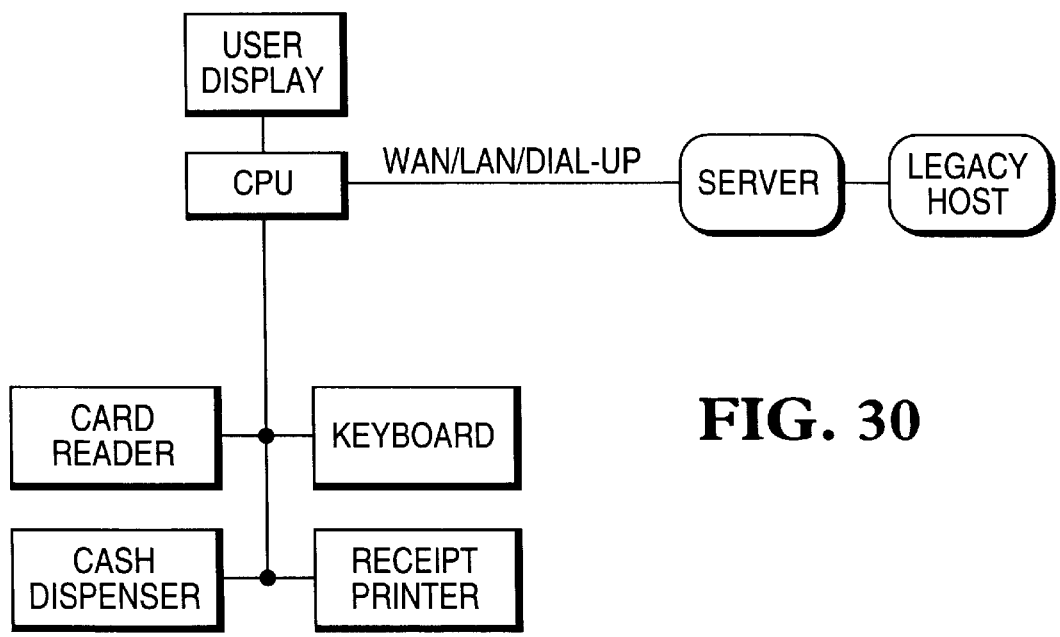
FIG. 30 is a functional block diagram of an exemplary ATM terminal using a Thin Client networked computing model architecture.

One move that is addressing some of the issues with the traditional Thick Client transaction terminal architectures is towards a Thin Client architecture, an exemplary block diagram for which is shown in FIG. 30 for a Thin Client ATM. With this approach, the physical architecture remains similar to Thick Client except that no mass storage device is used, with all application software being downloaded from an Application Server when the device is turned on. A Thin Client terminal would generally still use peripheral devices connected to a central processor, with the attendant issues of central control and peripheral driver update, however, it would also use a high bandwidth network connection (TCP/IP) to the server, to allow for efficient application downloads, although lower speed dial-up modem approaches could still be employed for single off-site terminals. Once operational and in possession of downloaded software, the central processor would use client-server techniques to communicate with the application server to obtain customer specific transactional information from the legacy host.

Ultra Thin Client Architecture

Figure 31:
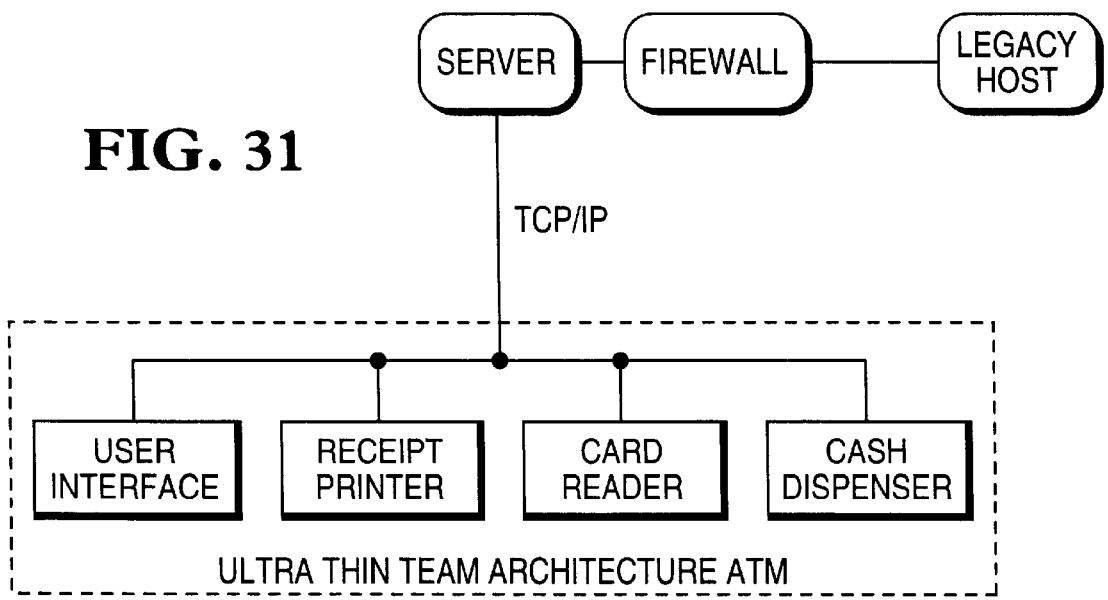
FIG. 31 is a functional block diagram of an exemplary ATM terminal using an Ultra Thin Client networked computing model architecture, according to one possible embodiment of the invention.

The Ultra Thin Client architecture extends the Thin Client approach to the lowest level, by treating each individual component (peripheral) of the terminal as an individual Thin Client device. Each of these devices is connected directly to some server system, over LAN, WAN or dial up type connections. These devices are capable of downloading the latest version of their software from the server whenever they are started or reset. Software upgrades can be made at the Server level by a system administrator, providing for controlled and secure deployment of application upgrades at various levels within the network (WAN, LAN or terminal). This allows peripheral module upgrades to be applied to every terminal in a network, while allowing branch or terminal specific marketing messages to be introduced to self-service terminals. An exemplary block diagram for which is shown in FIG. 31 for an Ultra Thin Client ATM.

By having a direct connection from peripheral devices to the server, it is possible to allow the peripheral applications to take a more active role in the overall application flow. This allows the central processor (which is actually now the user interface processor) to concentrate on its primary task of providing custom graphics, animation and video facilities. The processing power required to operate individual peripheral devices can then be selected to optimize the cost/performance figure.

The peripherals and the user interface operate as a team, with each component being thought of as a team member or peer. Each component runs its own section of the application based upon agreed rules of operation. These applications are event driven with internal events, (user or hardware events) driving the state of each module—as this state changes it broadcasts to all the other members of the team. These external message events allow each team member to know the state of the team as a whole and act accordingly. This approach provides for easier development of the user interface application, as it does not need to control all of the peripheral devices directly, as they are responsible for running themselves. The messages broadcast by peripherals can be standardized, again leading to improvements in the development of any user interface application.

Ultra Thin Team Architecture

The Ultra Thin Team Architecture (UTTA) uses a series of networked peripheral devices that work as a team in order to provide a transactional terminal. Each module is connected to a central server within a bank branch or retail store. This server acts as a repository for the application software used by the Thin Client modules. It also acts as a proxy server to the legacy host function that is required to provide customer or product specific information during the operation of a transaction. The module and server connections are provided using standard networking protocols such as TCP/IP.

A communications "firewall" can be used to keep the ATM transactions secure, and also to protect the modules from outside interference. The modules themselves need have no knowledge of the network beyond the branch or local server. Only a very simple boot code needs to be present in a module's ROM or PROM, allowing it to boot up, initiate a network session with the server and download the current version of its application software.

Ultra Thin Team Architecture

The Ultra Thin Team Architecture concept has been used to develop a four module ATM, comprised of a user interface, card reader, cash dispenser and receipt printer. Each peripheral was been developed to a software prototype level, that is, the common functions of an ATM were simulated in the software itself, e.g., be it removal of cash by a customer or errors that may occur in the hardware itself.

Module Architecture

Figure 32:
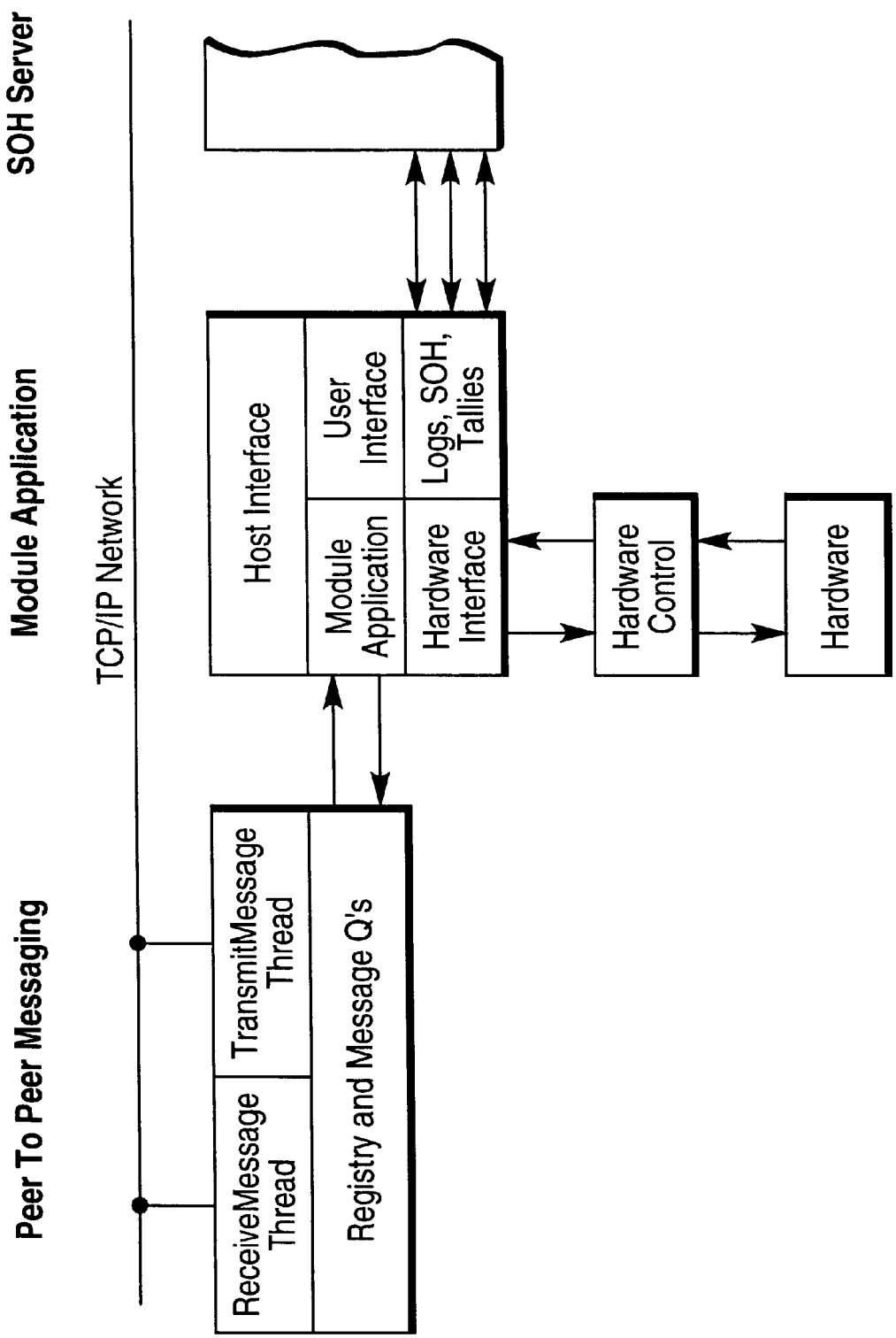
FIG. 32 is a functional block diagram of exemplary application and control software associated with a networked peripheral device or module for use in an Ultra Thin Client Team application architecture, according to one possible embodiment of the invention.

Each module application was broken down into three logical units, shown in FIG. 32.

The Peer to Peer Messaging system dealt with identifying the other modules in the team and transmitting messages to and from these over the network layer. This section dealt with all of the registering of other modules, the initialization of message queues and the generation of events to the module application when messages were received.

The Module Application system operated as a state machine based upon message events received from other modules and hardware events generated through the interface to hardware under its control. For development purposes, the User interface component could be either a full user oriented interface (in the case of a commercialized user interface module), or a simulated diagnostic interface, used by the other three modules to provide user interaction with the system. The Host Interface component allowed the module application to communicate with a central server in order to obtain user-specific information for use in a transaction process.

An additional area of the overall architecture, not covered by the prototype, concerns the modules' ability to store logs, tallies and state of health information. This data can be used by an embedded state of health server, which provides client-server communications with the main server for the purpose of diagnostic operations. The embedded server can monitor the status of its peripheral module providing a standard means for an external client interface to extract this and present it to a user.

Java Development Environment

The coding for the prototype was developed mainly in Java, using Symantec Cafe as the development environment. However, one specific section, dealing with hardware control within a module, used C++ code to produce a Windows compatible application for controlling the physical card reader peripheral.

As Java projects are typically split up into various packages, individual modules were coded in their own Java package, such as utta.cardreader and utta.userinterface. These packages contained the main application code for each module, with the 'plug-in' functions, such as messaging and hardware control also found in their own distinct Java packages.

UTTA Module Environment

The four networked peripheral software modules all ran together on the same machine, as four independent Java Virtual Machines. The modules themselves were not aware of this and still communicated via network broadcasts. Modifications can be made to the code to allow the project to code to run across more than one machine, e.g., separately on the different physical peripheral modules, as will be described.

Peer-to-Peer Messaging

One of the key elements of the UTTA architecture for Automated Teller Machines is the peer-to-peer messaging that may place between the individual modules that make up the machine. Individual modules, within a given team, can communicate by sending event-based messages to one another. These messages can be used to synchronize the different modules to a common application state. As the state of a given module changes, due to hardware events, user input or time-out conditions, an event message can broadcast to the other members of the team allowing them to react accordingly.

Messaging Architecture

The Peer to Peer messaging section of the UTTA module architecture prototype is indicated In FIG. 32.

Messages were broadcast so that all modules were aware of all relevant information about the application state. For example it was necessary for the card reader to know the amount of any cash withdrawal so that it could update the card appropriately should that cash withdrawal be validated and processed by the cash dispenser application.

All messaging was handled inside each module by an instance of a MessageApp class, which was part of a utta.message package. The files found in this package shown in FIG. 33. Use of this package allowed the individual modules to send specific, pre-defined messages to other modules inside the simulated single ATM.

The Message Class

Messages were passed between the individual modules of the simulated ATM using object serialization to send and receive instances of a message object. The elements of the Message Class are given in FIG. 34.

The most important values associated with the class are of course the message itself (which was text based), and an accompanying integer value, used to define additional message parameters, such as the amount of cash requested during a withdrawal. This extra value is also was used during the creation of the start-up messages that were sent when the modules booted up. While the message itself contains HELLO, this value was set to the port number that the module's server is listening on. (The term "server" can have several meaning depending upon the context used. In one instance it refers to a computer, such as a central server, application server, or a proxy server, for servicing connected computing terminal devices ('clients') on a network. In another instance it may refer to a simple thread or process function of listening for data sent to it by another thread or process (also called a 'client'). In this latter context, different servers were used in prototype modules to receive various messages, both text and class based.)

There were also several other parameters that were sent with the message—allowing a message to reach its destination, but also allowing for the receiving server to be able to track where the message came from. To identify the sending module two fields were included—the name of the module and also its ID number, which was assigned at start-up. Adding these values to the module's registry can service both an embedded web server and the intelligent agents that need access to it. Finally, a boolean value was used to help identify the message type—TRUE for a start-up message, and FALSE for a normal 'informing of state change' message.

Module Registry

The modules may know about each other by creating an internal registry, which stores information about the ATM components, such as their name, what port number their server is located on—all the data required to send that module a message. Using this information, a module can then make a simple send call, and the message will be sent to every module that has been defined in the registry. A block diagram of the basic registry concept is illustrated in FIG. 35.

The process of building such a registry of other modules and how to communicate with them was used to allow the user interface to determine what peripheral modules are available and therefore which user services would be offered. For example, if a module discovers that the receipt printer is not present—because it will not be defined in its registry, then the interface can safely remove the 'Print Receipt' button from the menu screen.

Using this registry system process, modules can be added or removed from the system at any time and the rest of them will update and adapt to cater for this. In addition, this may allow for the concept of 'hot plugging and unplugging' of the modules, without having to switch off any of the others while doing so. This is possible where each module is a separate networked peripheral, and does not rely on the other team members for it to operate. The ATM effectively becomes "Plug and Play."

Creating a Module Registry

When a module initially boots up, it can send out a special start-up message to a known range of port numbers on the local machine. The prototype implementation of the ATM uses the following port numbers:

6000: The User Interface
6010: The Card Reader
6020: The Cash Dispenser
6030: The Receipt Printer Note that although the port numbers were fixed, the message package was written to handle dynamic port numbers—that is why messages are sent out across the range 6000 to 6040, and not just to the other three known numbers.

Ultimately, with the UTTA architecture being implemented with four separate networked peripherals, rather than just one that is running four Java virtual machines, the modules could start up by sending out a broadcast message to the IP address, 255.255.255.255. This is a reserved address that can be used to send network messages to all IP numbers on a local network segment.

Figure 36:
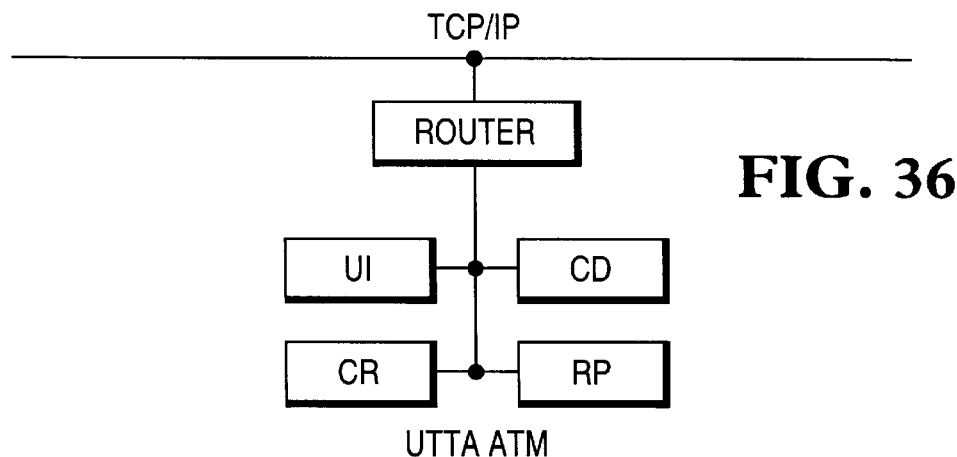
FIG. 36 is a functional block diagram of an exemplary ATM terminal made up of networked peripheral devices or modules, and using a network communications router, according to one possible embodiment of the invention.

Referring to FIG. 36, a network router on the back of each machine could keep any 255 broadcast messages local to the ATM, and therefore prevent the start-up messages from traveling further up the network topology, and possibly into other ATMs on the same branch network. The router functioning can ensure that a module will not start up and send messages to a module that is not actually part of its ATM.

Figure 37:
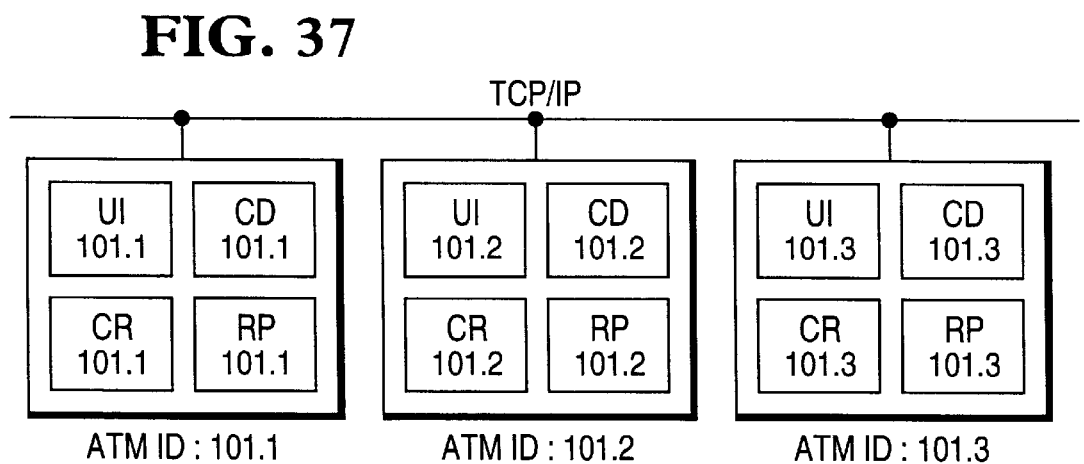
FIG. 37 is a functional block diagram illustrating an exemplary identification number assignment scheme for messaging with networked peripheral devices or modules in an Ultra Thin Client Team application architecture for ATM terminals, according to one possible embodiment of the invention.

The scan message first sent out consists of several parts. The most important being the actual message, which in this case is HELLO. Additionally, the start-up message contained the following fields:

the name of the module sending the message—such as CARD_READER, or USER_INTERFACE the unique identification number of the module the port number that the server listening for returning messages is located on Each of these fields enabled the modules to communicate with one another. The identification number may be unique among the ATMs, but remain the same in all the modules of a single machine, as shown in FIG. 37.

Such identification numbers can be used both by the ATMs, and by the branch server to identify themselves on the branch network. Individual modules can use them to ensure they only talk to other modules that have the same number, whereas the branch server can make use of the ID when retrieving State-Of-Health information about the machine.

When a module receives a HELLO message it can perform several tasks with the incoming data. Firstly, it may be required to return a REPLY message, which the original module uses as confirmation that other peripherals are active in the machine. Both modules can now create a registry entry for each other using this message data. The IP address of the module that sent the message can be extracted via socket commands, as can the other attached message data, such as server names, IDs and port numbers. All this information can be entered into the module's registry.

Figure 38:
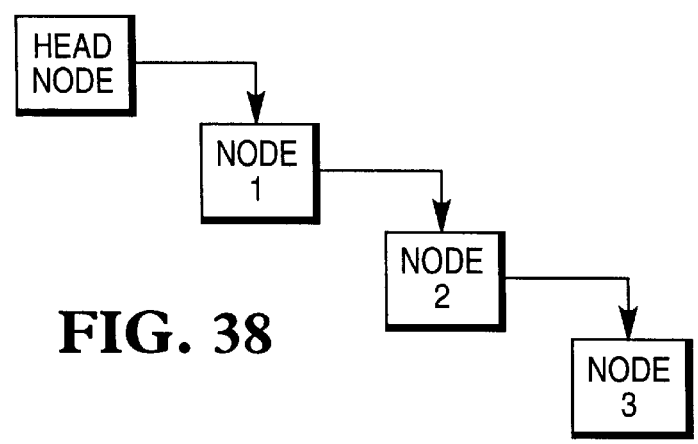
FIG. 38 is a simplified block diagram of a linked-list type internal registry use by networked peripheral devices or modules in a prototype Ultra Thin Client Team application architecture for a simulated ATM terminal, according to one possible embodiment of the invention.

The registry itself was stored as a linked-list, as diagrammed for example in FIG. 38, with each node in the list corresponding to one of the ATM modules. The first node was set to always contain information about the module itself, with the other two or three locations being used for the rest of the modules. These nodes were defined in a RegNode class. Because a linked-list was dynamic, it means that the registry could always be kept up to date even when modules were being added or removed from the overall system.

Due to the multithreaded nature of the Java code, all the methods that accessed the list inside the registry were declared as synchronized, meaning that only one thread can get access to run that method at a time. Additionally, access to the list itself was controlled via semaphores, so it was simply not possible for two threads to be using the list at once, and possibly changing data that the other thread needs to run. If that happened, it could cause significant problems, with one thread removing a node from the list, just as another is about to use some of the data from it.

When a module received the HELLO or REPLY message it was programmed to make a quick check of the list to see if a node already existed with the same details—if it did not then an associated node was created and added to the list. Module information was removed from the registry on receipt of a GOODBYE message. Again, the list was first checked to see if the dead module existed before any attempt to remove the node was made.

Sending and Receiving Messages

Modules were programmed to use the information stored in their registry to broadcast messages to others within the team. However, the actual application part of the module did not deal with any of the network code, such as messages and registries. The network code was defined in a separate message package that was then imported into the various modules. Each of the four modules all used the same messaging code to perform these functions—e.g., there was not a unique 'peer to peer' package for each module. Therefore, all of the code within the message package was quite generic.

This was proved with the registry operation. Each module's registry ended up identical to the other modules—the only difference being what order the registry entries appear in. The registry database could be used by a module to broadcast events and state changes that occur within. This was the real purpose of the message package.

Message sending between the modules was carried out by a client thread. Message receiving is carried out by a server thread. How the classes within the message package related to one another will now be described.

Figure 39:
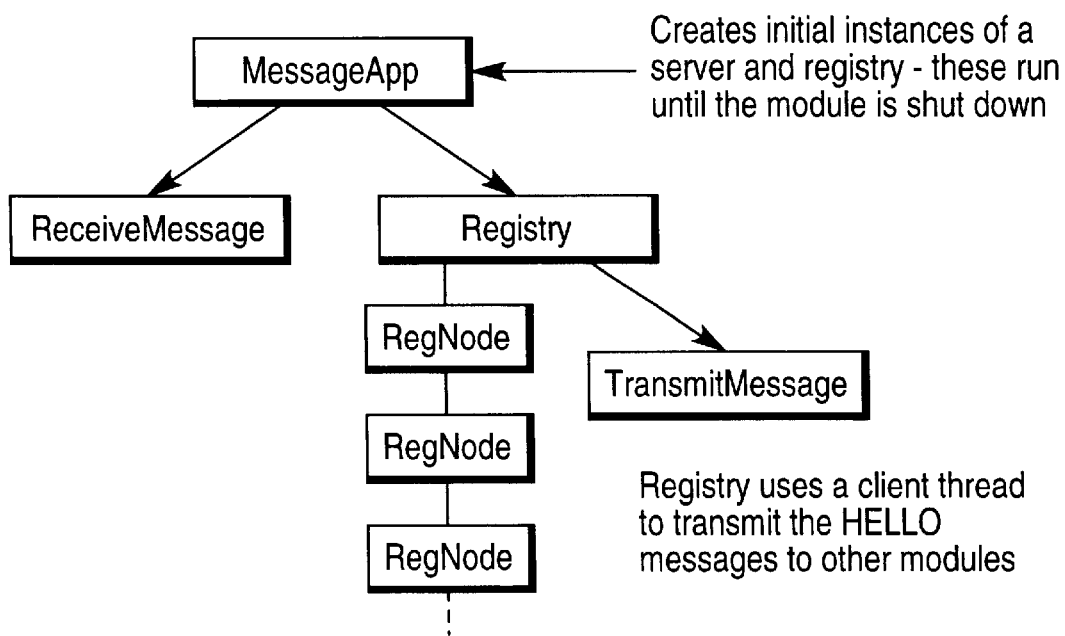
FIG. 39 is a simplified block diagram of the functional relation messaging program elements for networked peripheral devices or modules in a prototype Ultra Thin Client Team application architecture for a simulated ATM terminal, according to one possible embodiment of the invention.

MessageApp was the main class—that is, the class that the modules actually instantiated within themselves to handle all messaging functions for them. They used this class as an interface to the network and the other team members without concern about the details involved in getting it all to work. MessageApp generally controlled everything within the message package. The basic functionality of MessageApp is shown in FIG. 39.

When it is first created, the MessageApp class carried out two tasks—initializing a class to create and monitor the registry, and similarly, initializing a class to run a server that listens for messages from other modules. These two classes are Registry and ReceiveMessage respectively. The Registry class was also responsible for sending out the initial HELLO messages required to actually create a registry. To send these messages another class was used—TransmitMessage.

TransmitMessage was an extremely 'stupid' class, in that it did not know anything about what team members were already active, or where they were. For a message to be sent by this class, it only needed two pieces of information:

1. The actual message, which was created using the Message class.
2. The destination of this message, in the form of an IP number and a port number.

Once this information was acquired, TransmitMessage created a socket connection to the receiving server and then transmitted the actual Message class. This was possible due to one of the new features of Java 1.1—Object Serialization—which allows instances of classes to be broken down into a stream of bytes, sent across the network and then reconstructed at the other end, ready for use again.

This reconstruction was carried out by the server—ReceiveMessage class. This class, which ran code in its own thread (and therefore was not affected by the main application) opened a ServerSocket connection when first created, which allowed the various TransmitMessage instances to send their messages to it. A server runs in an infinite loop, endlessly listening for and processing incoming messages. As each message arrived, the server recreated the actual class and proceeded to extract the message data from it. The message text was used to perform several checks that were important to the module's state.

Firstly, data about the message's original location was worked out and compared with information in the registry (the server thread had access to the Registry instance created by MessageApp). If it discovered that the message came from a module that was not previously known about, then the registry was updated with this new information.

Secondly, the server had to decide whether to reply to the message. This goes back to how the registry is created, by each module replying to any HELLO messages it received. If server received a HELLO message, then the server simply created an instance of TransmitMessage with the relevant details and replies to the sending module.

Thus, both the server and the client threads played a part in the construction of the registry. The module's server thread had to decide whether nodes within the list should be added (due to HELLO or REPLY messages), or to be deleted due to a module shutting down. A GOODBYE message was broadcast when this happened, informing the other modules that it was no longer available for communications. However, the client thread also monitored the state of other modules and to help to keep the registry up to date. If, when trying to connect to another server, the client thread discovers that a connection cannot be made, it retried for a further four times until it decided that the module just was not there any more. It was then this module's duty to perform two tasks:

1. Updating its own registry by removing the 'dead' module from the list, and
2. Sending out a special GOODBYE message on behalf of the dead module, so that other team members would know that the departed module was no longer active.

Message Queues

Referring back to the MessageApp class, how the class stored the messages that were received by the server will now be explained.

Java 1.1 now defines a set of event handling routines for common events such as mouse clicks and window operations. However, this method of dealing with such events was put to use by creating events that are not standard to Java. In this case it was desired that the MessageApp class inform its parent class that a message has arrived. This could have been done by passing the class a reference to its parent when it is created, and MessageApp could then call its parent's methods using that reference. But that meant the methods (that may be private to the parent) have to be made open in order for this to happen. By getting MessageApp to cause an event that would be picked up by its parent, the parent class was programmed to decide on what action to take according to the event.

This was done by registering the parent as an ActionListener with MessageApp—meaning it listened for events that MessageApp broadcast within their virtual machine. In this case, a MESSAGE_RECEIVED event was be generated. Upon detection of this event, the parent module used standard event handling methods (such as actionPerformed) to deal with the event. All four modules actually made a call to getMessage, which is one of MessageApp's methods. It then returned the received message to the module.

Linked lists were again used here. As each message was received by MessageApp it added it to a list of received messages. When a module made a call to get at one of the messages, the oldest one was returned, that is, the message node at the head of the list. As the message was retrieved by the parent module, the actual list node was deleted—and the next message along became the new head of the list. This system of storing messages meant older ones would not be overwritten by newer messages if they arrived before the module had retrieved the older messages. This was needed for occasions when the module was busy performing a task and had not yet had a chance to handle the next event in its event-queue. A good example of this was when a card is first inserted. Three items of data (account number, PIN number, and maximum amount) were all sent in quick succession to the modules.

UTTA ATM Application

The Module Application Section, relationally illustrated in FIG. 32, was where the vast majority of code for the modules resided, and was thus a most important part of the overall UTTA ATM application.

Every module within the UTTA architecture prototype was event driven, that is, the decisions it made always depended on events that occurred within the system and what state the module was in at that moment in time. The team as a whole reacted to these state changes, keeping the flow of the application smooth, but more importantly, correct. It was essential that the individual modules reacted to changes within the others. The card reader should present the card when the transaction is finished—the receipt printer should print the receipt when requested to do so. Any problems with the control flow of one module would upset the balance with the rest of the team. For example, a worst case scenario might be a card suddenly being inserted while cash was being presented—this should be an entirely illegal sequence of events as far as transaction terminal modules are concerned, but if it did happen, then the modules should be prepared for it.

Figure 40:
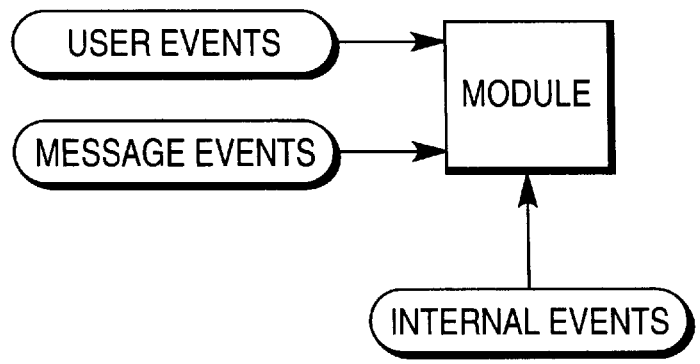
FIG. 40 is a simplified block diagram illustrating types of events reacted to by event-driven networked peripheral devices or modules in a prototype Ultra Thin Client Team application architecture for a simulated ATM terminal, according to one possible embodiment of the invention.

There were three main types of event that the modules would react to, as illustrated in FIG. 40.

Firstly, there were user events, such as buttons being pressed, mouse clicks, or movement of the windows. Then there were the events that were generated internally by the module itself. These could be due to a time-out, e.g., because of the customer taking too long, or just a standard event occurring like starting up or shutting down. Finally, there were the events that occurred due to messages received from the rest of the team.

As mentioned earlier, the only contact a module actually had with the network message functions it performs was through the interfacing it did with the MessageApp class. When a message arrived at the module's server, it was passed back up the chain of command to this class. It was then up to MessageApp to get the message right to the top of the chain—to the application itself.

Figure 41:
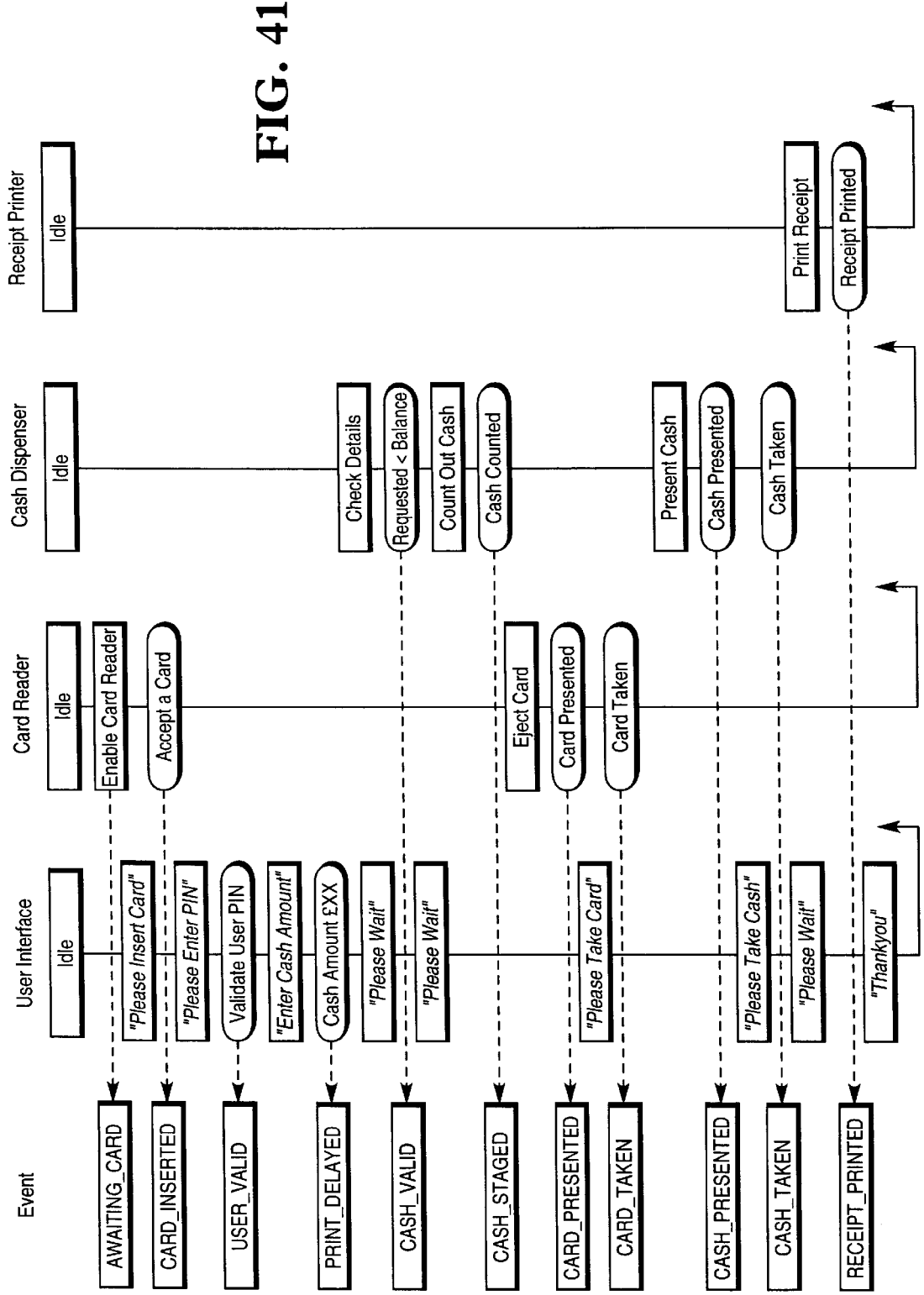
FIG. 41 is a flow diagram for the application flows for an exemplary standard ATM transaction by networked peripheral devices or modules in a prototype Ultra Thin Client Team application, according to one possible embodiment of the invention.

One way to understand how these messages worked, is to look at the flow diagram in FIG. 41 that shows pictorially the application flow for a standard ATM transaction— withdrawing cash with a receipt. Note how the flow shows the ATM's operation as continuous—once it reaches the bottom, it loops back up to the top again, ready to accept the next customer.

Module Applications

The code structure of each of the modules was reasonably similar (with only the user interface being significantly different).

All the code for controlling a module's application control flow was found in the main class for that module—e.g., CardReader, ReceiptPrinter, CashDispenser, and in the case of the User interface, Application. These classes were also responsible for controlling the application's window, and any controls (such as buttons) that might be visible on it.

Card Reader, Receipt Printer and Cash Dispenser

The following description is relevant for the first three modules. The user interface will be covered on its own in the next section.

The module application classes were split up into five main sections, listed here in the same order as they appeared in the code.

1. Class field declarations. All the variables used within the module were declared here. This includes any state variables that the module may use, including the instances of the various plug-in modules, such as the messaging, embedded web-server and the agent handling.
2. The constructor. In all three cases, the constructor did little more than set up the controls used by the module's interface. It also made a call to setMessages, which initialized each of the plug-in classes that were used.
3. The main class methods. These included Main (for actually starting the module) and Restart and Shutdown, which were used by the module to inform the rest of the team that it is going off-line or assuming an unable state. The methods for detecting the actual events were also in this section. ActionPerformed decoded the messages, deciding if they came from one of its interface controls or from a plug-in class, passed to it via the ActionListeners class.
4. Code for performing the application's control flow. As messages were received from other team members (detected by actionPerformed) they were dealt with in a method called processMessage. This method used line after line of if-else statements dealing with all the different events that could occur during the life of a module. Also included were the various methods the module needed to deal with the message. Examples of these methods were printReceipt or cardinserted.
5. In-line classes. These were inserted into the code to handle two things. The first class, called ModuleWindow handled the event when the application's window was closed. This provided notification of the event, and allowing the module to inform the rest of the team that it was shutting down. The second class, ModuleMouse, was used to detect mouse clicks on the main window of the application. Various mouse clicks were used for testing purposes as will be further described.

Figure 42:
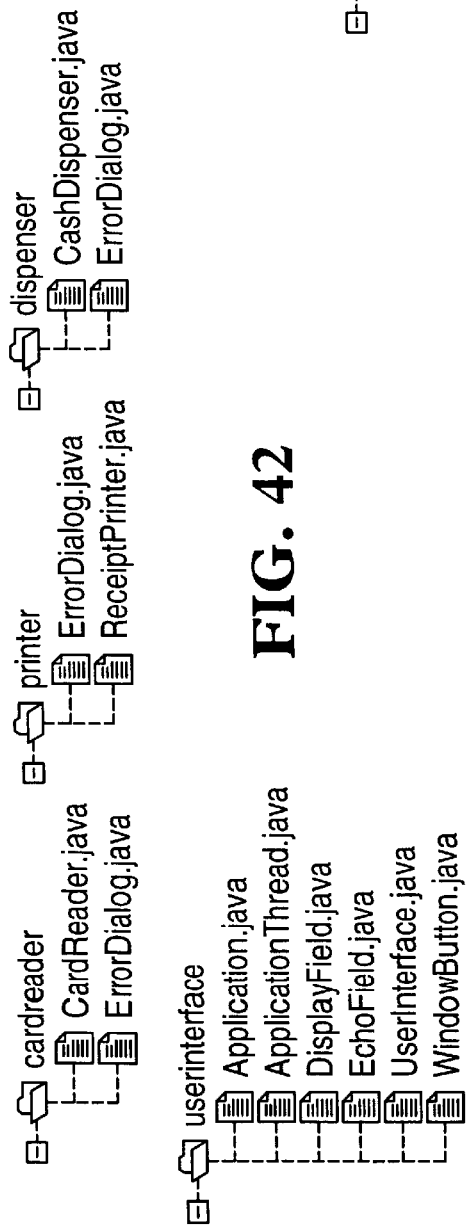
FIG. 42 is a software file directory listing of software application files for networked peripheral devices or modules used in a prototype Ultra Thin Client Team application architecture for a simulated ATM terminal, according to one possible embodiment of the invention.

Application Section code for each of the three modules separately packaged, and also came with an additional dialog class (ErrorDialog) that allowed a user to force the module to simulate 'hardware errors' that might occur in the real terminal, such as card jams, cash jams and running out of receipt paper. The packages can be seen in FIG. 42.

User Interface

The user interface module Application Section was different in that it had several classes that were used to build up the whole application, although like the above modules, it only had one main class for controlling the flow of the application. A short description on each of the classes found in the user interface package is provided in a later section below.

The actual class that created and ran the user interface application is UserInterface. This was a very short class, performing just one or two functions that it needed to get up and running. As with the other modules it created and ran instances of each of the plug-in classes, although an instance of MessageApp was not declared here. The main purpose of this class though, was to set up the instance of Application, which handled events, drawing the interface, and controlling MessageApp.

Application was a very big class, with a lot of code contained within it, although it is however, quite straight forward. There were just two main goals that the class had to achieve —firstly, it dealt with the event messages that came from the other modules; but it was also responsible for creating all the different screens that were displayed. Each 'view' seen by the customer is generally different screen, with the old one being destroyed as each new one is displayed. The user interface presented not just one screen with buttons that change, instead it presented a series of individual screens that were displayed when necessary.

As with the other module classes the code was split up into several distinct sections to help with understanding it:

1. Declarations of all the variables used within the class. MessageApp was also declared here, as was the instance of Application Thread that controlled and monitored the timing related to drawing the screen, and also the time-outs that occurred. There were three other variables of importance that were also used here—DisplayField, EchoField and WindowButton—each instance being an array of these classes, and used throughout the code for displaying text, pictures and buttons on the interface.
2. The constructor. It called setMessages as before, but it also loaded in all the GIF screen images that were used by application at this point so were no delays later when displaying the screens.
3. The method resizeApp. This method allowed the user interface application windows to be resized during execution, with any controls visible on screen at that time also resizing, getting either bigger or smaller so that all the available space was used.
4. The event handling method actionPerformed. There were many events and state changes to deal with here so this method was quite big, although the format of it remained the same throughout. At the start of the method, the incoming message was retrieved from MessageApp and then a series of if-else statements were used to decide what to do according to the message. In most cases it meant calling code to redraw the screen, as well as making calls to send out messages as the user progressed through the various menus and options.
5. Methods that actually created the screens. Controls were added to each frame and then the display thread was told about the time limit for that screen. All the screen displays then added the default display of Cool-Card and Jeeves along the bottom.

Module Utilities

The next few sections describe various components of the modules that played a part in their application control flows. They are not in any order of importance, as all were required by the modules to perform their tasks correctly. The sections describe a combination of the actual module screens, how they handled time-outs, and how the modules needed to change their states when other members of the team went off-line, either due to faults or from shutting down completely.

Time-Outs

Figure 43:
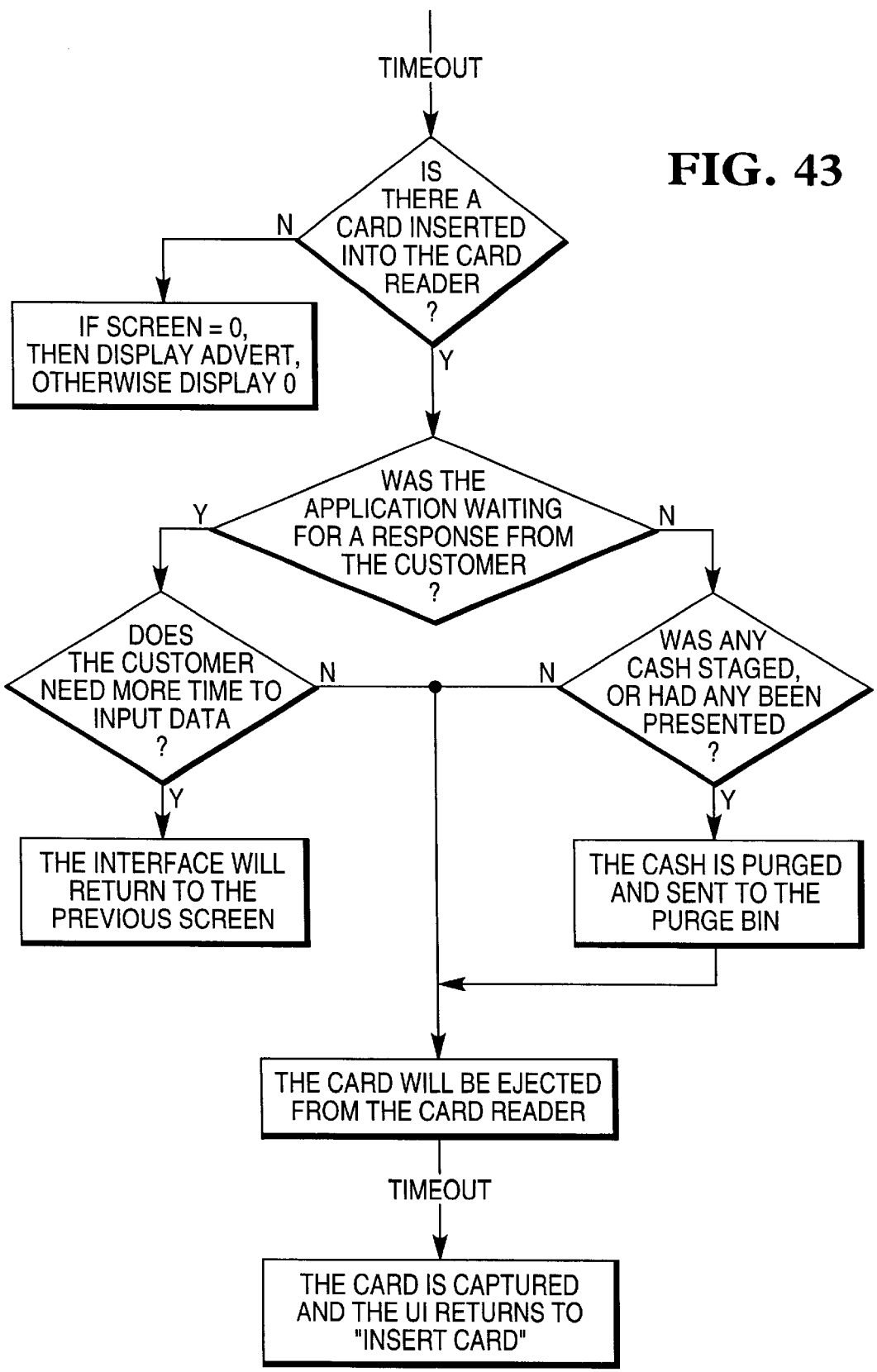
FIG. 43 is a flow diagram for a time out sequence used by a card reader networked peripheral device or module in a prototype Ultra Thin Client Team application architecture for a simulated ATM terminal, according to one possible embodiment of the invention.

Time-outs could occur within the user interface module for several reasons. The diagram in FIG. 43 helps to explain how the Application class decided upon what action to take (and also what messages to send) when a time-out event happened.

There were two main types of time-out event—internal ones, that is, ones that were only detected and dealt with by the user interface, and external ones, that although happening inside the Interface's virtual machine, may have had to be dealt with by other modules, such as capturing cards or cash.

Module Shutdowns

The four module members of the team were programmed with an ability to adapt themselves to changes in state that occurred to other members of the team. The most difficult event that they had to deal with is when one of the other team members actually shut down. This could be at a relatively safe time, when a customer is not actually using the ATM; however the modules should be able to deal with the cases when a team member goes off-line while a transaction is taking place.

All the modules (with the exception of the user interface) could simulate hardware errors that may occur in a real system. Depending of the severity of the error, the module may decide to shut itself down and no longer be registered as part of the team. When an error occurs, the module may also make calls into its relevant Tallys class to update the data stored there. Each of the modules dealt with these events in a different way.

If the card reader should shut itself down, this is an instant cue for the user interface to display its 'Out of Service' screen, as there is no way any transaction with the ATM should take place. However, if a transaction was already in place, both the cash dispenser and the receipt printer may have to take action. If any cash is either staged or presented it should be purged immediately. Similarly, any requests for receipts should be canceled.

Should the cash dispenser shut down at any point the user interface should remove all cash related options from the main menu. It also should check that it did not fail during a withdrawal, in which case an error message should be displayed to the customer, shortly followed by their card being ejected by the card reader. Again, with the receipt printer, any requested prints should be canceled.

The receipt printer itself shutting down is not quite such a serious error as it does not affect the overall application flow as much as the other three modules. If it does shut itself down the user interface should remove any receipt options from the menu. If it happens during an actual receipt print, the event can be just ignored by the interface, which may return to the 'Insert Card' screen if a RECEIPT_PRINTED message is not received after a certain delay.

Finally, if the user interface should fail (which may happen if the window itself is closed) then the card reader should either eject or capture a card (depending on its current state) and then shut itself down until the user interface comes back on-line. If any cash was staged or presented it is purged, and any receipt requests were canceled.

Miscellaneous Classes

Figure 44:
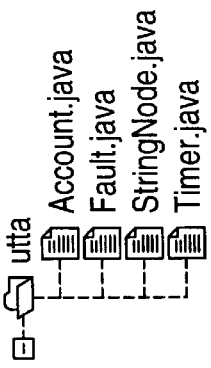
FIG. 44 is a software file directory listing of miscellaneous files for networked peripheral devices or modules used in a prototype Ultra Thin Client Team application architecture for a simulated ATM terminal, according to one possible embodiment of the invention.

There were four other classes that were part of the UTTA package, as shown in FIG. 44, that each module needed to be able to function properly.

Firstly, there was a class Account that was used by the modules to access the legacy host for bank account details. Its use within the package is described in detail in a later section below.

That leaves two classes—Fault and Timer—neither of them being used by the user interface. Fault was written to provide a consistent look to the code throughout the three modules that can generate hardware errors. Each of its variables were declared public allowing a module to compare its own variables with the values stored in this class. For example, the following statement:

if (cashLevel== Fault.CASH_OUT)

could just of easily been written with Fault.CASH_OUT substituted for its exact value, but using the Fault class helped the readability of the code.

Timer was used by the modules in various places, although its primary use was in delaying a module's flow for some reason. This may be to simulate a hardware function, such as transporting money from the cash cassette to the staging area, or by the card reader while it waits for a few seconds before accepting a card after the last transaction is finished.

The methods within the Timer class (which was a sub class of Thread) allowed a module to set how long the delay would be for and start the timer, and also to check on its progress or interrupt it at any point before it was finished.

Interface ScreenShots

Each of the captured screenshots presented in FIGS. 45–50 and 54–55 show the various modules at a certain stage in their application control flow. Most of the time, the buttons on the card reader and cash dispenser were disabled, and the receipt printer was blank, for the purposes of this disclosure, the pictures show the interfaces as they may look when a user may interact with them.

Note that the interface screens seen in the figures were from three separate applications that communicated with one another via the network—they are not three windows belonging to a global 'ATM' program.

Card Reader

Figure 45:
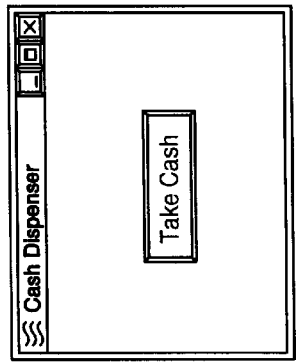
FIG. 45 is a screenshot of a display window associated with the functioning of a card reader networked peripheral device or module in a prototype Ultra Thin Client Team application architecture for a simulated ATM terminal, according to one possible embodiment of the invention.

The card reader's interface screen, illustrated in FIG. 45, consisted of a button that could be in one of three states—disabled, enabled ("Insert Card") and enabled ("Take Card"). The button remained disabled to indicate to the user that it was not possible to perform any actions with the card reader module. For example, during a transaction when a card is inserted, the button would be disabled until the ATM decided to return the card to the customer. At this point, the button could be clicked again, and "Take Card" would appear on the button face.

Cash Dispenser

Figure 46:
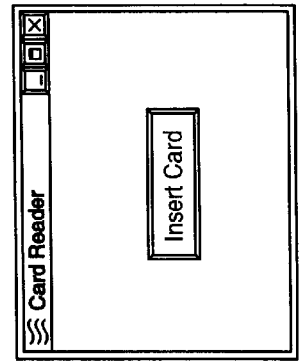
FIG. 46 is a screenshot of a display window associated with the functioning of a cash dispenser networked peripheral device or module in a prototype Ultra Thin Client Team application architecture for a simulated ATM terminal, according to one possible embodiment of the invention.

The cash dispenser's interface was similar to the card reader's, as shown in FIG. 46, except its button would only ever display "Take Cash" —there were no other actions that could be performed with the module. Like the card reader, the button was disabled unless the action could happen. In this case, only when cash was presented by the ATM, and the user interface was displaying "Please Take Cash", would the button re-enable and allow itself to be clicked. As soon as the event happened, the button was disabled until the next time someone requested money from the machine.

Receipt Printer

The receipt printer had no direct interaction with the user.

Figure 47:
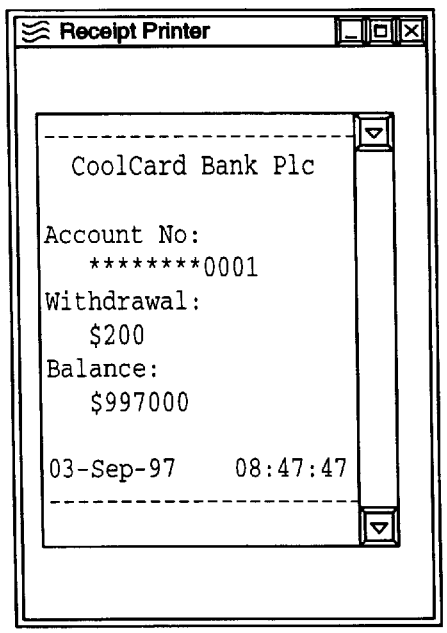
FIG. 47 is a screenshot of a display window associated with the functioning of a receipt printer networked peripheral device or module in a prototype Ultra Thin Client Team application architecture for a simulated ATM terminal, according to one possible embodiment of the invention.
Figure 48:
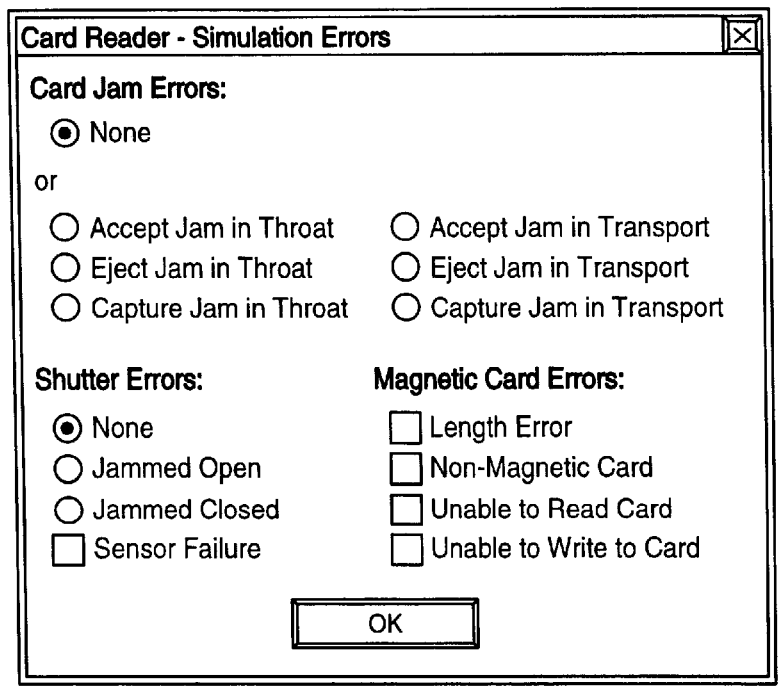
FIG. 48 is a screenshot of a display window associated with the error dialog functioning of a card reader networked peripheral device or module in a prototype Ultra Thin Client Team application architecture for a simulated ATM terminal, according to one possible embodiment of the invention.
Figure 49:
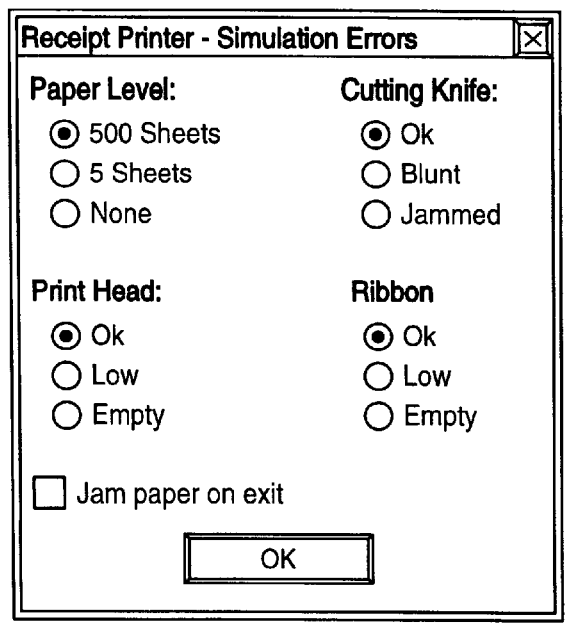
FIG. 49 is a screenshot of a display window associated with the error dialog functioning of a receipt printer networked peripheral device or module in a prototype Ultra Thin Client Team application architecture for a simulated ATM terminal, according to one possible embodiment of the invention.
Figure 50:
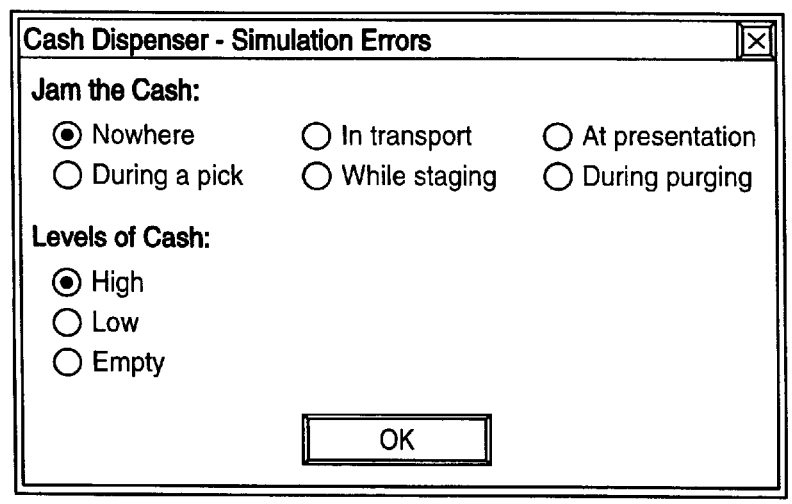
FIG. 50 is a screenshot of a display window associated with the error dialog functioning of a cash dispenser networked peripheral device or module in a prototype Ultra Thin Client Team application architecture for a simulated ATM terminal, according to one possible embodiment of the invention.

The receipts were output from the module in two ways—a full receipt print, which followed a cash withdrawal from the ATM, and a simpler receipt print, which could be asked for without cash. The interface illustrated in FIG. 47 shows the output from a full printout. As well as the customer's account number and remaining balance, the amount of money involved in the last transaction (the withdrawal) is also shown. The simpler version of a receipt did not show this extra field.

Unfortunately, due to the nature of Java's cross platform features, the text formatting of the receipt printer may not look the same on different computer systems—even two PCs running Windows 95 can produce slightly different outputs using the same data.

Error Dialogs

Each module (apart from the user interface) also had a dialog (shown in FIGS. 48–50) associated with it that was used to decide what sort of simulation error would take place while running through the code. Once an error had been selected, it would not actually happen until that point in time when the module was in that state. For example, if a card jam while ejecting a card is chosen, the actual error would not happen (or be logged in the tallies) until the card reader tried to eject a card.

The windows themselves could be displayed by double-clicking a mouse anywhere in the module's window apart from on controls such as buttons.

TopEnd

TopEnd is an NCR Corporation product that provides a transaction based messaging environment that supports client and server side development on many UNIX and Windows platforms. This technology can be used by the ATM software modules to access a remote server running TopEnd, and retrieve realistic, albeit dummy, bank account details. This information can then be used by the modules to provide 'real' bank accounts that can have money debited from them each time a withdrawal is made from the machine.

TopEnd Remote Java Classes

The architecture diagram in FIG. 32 shows how the TopEnd Remote Java Classes may fit into the overall system.

TopEnd was originally developed for C and C++ programming environments, but a newer version in Java has since been produced. The TopEnd Java Remote Client (JRC) functionality was available for use in prototype form enabling development of a Java based client that could easily communicate with a TopEnd server.

Unfortunately, the server we had access to was still running the older code, so TopEnd was integrated using the older class files.

Account Class

The account details were stored on a remote legacy host, which itself was running TopEnd as a means of supplying its data in response to client requests. The UTTA architecture achieved this by allowing a special class, Account, to handle all the TopEnd processing.

Account's sole task was to connect to the remote host and access the accounts stored there. The ATM modules could then pull the same details from the Account class, without concern about network connections, or the correct way to talk to TopEnd in order to get the correct data. Account acted as an interpreter between the modules and the remote server.

Figure 51:
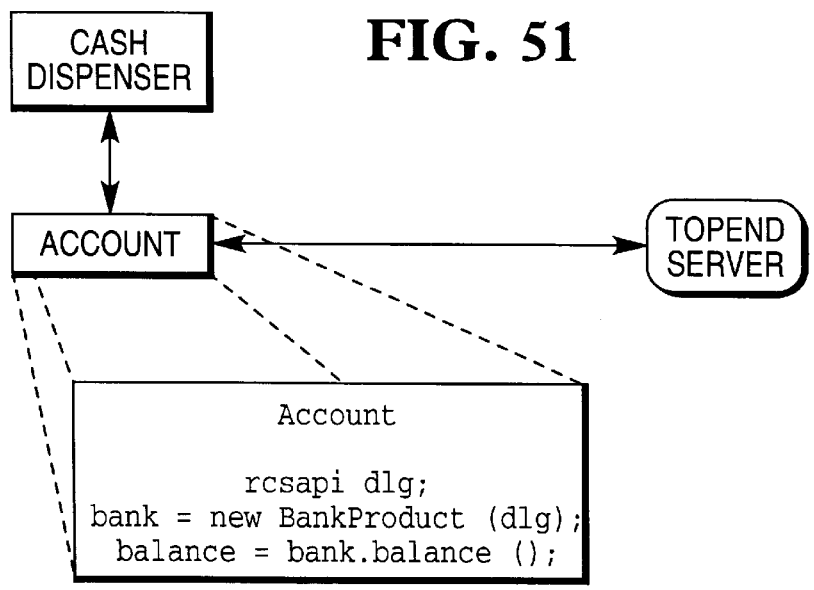
FIG. 51 is a simplified block diagram of the functional relation between a cash dispenser networked peripheral device or module and a legacy host through a TopEnd type interface in a prototype Ultra Thin Client Team application architecture for a simulated ATM terminal, according to one possible embodiment of the invention.

Account used classes from two Java objects to retrieve the data—Topend and Icm. The code in the diagram in FIG. 51 is a simplified version of what took place. Topend code was used to create a Rcsapi object, which was a special dialog designed to connect between the client and TopEnd. However, this sort of code was very low level, so interface classes from Icm could be used to help simplify things. A BankProduct class would take an account number and then retrieve all the information on that account from the server. It was then just a task of calling the relevant methods of BankProduct to get at the data.

The Account class kept a permanent track on whether it was succeeding in contacting TopEnd. The modules used this information to alter their states accordingly. If the remote host could be reached (or some other problem occurred that stopped Account from getting the data), then the modules reacted by informing the user that their transaction could not take place.

Each of the modules used a different instance of Account, which all had to be updated whenever significant events occurred that would change the account details.

The user interface required access to account balance data. One of the options available from the interface's main menu was 'Display Balance' that printed the current balance in the middle of the screen. When a customer inserted a card and was busy entering their PIN number, the instance of Account used by the interface would go away and retrieve the current balance. Therefore, once the user was logged in, if they happened to select 'Display Balance', the details could appear on screen instantly.

The receipt printer also only used current balance data. Although the transaction history could be used (either for normal receipt prints, or for a full journal print), the module was intelligent enough to work out the history itself. Two receipt prints were available—the first only requiring the current balance to be printed. Again this data was retrieved by the module while the customer entered their PIN number. The other type of receipt (printed after a cash withdrawal) had to be able to inform the user of the amount just withdrawn. This was done simply by subtracting the amount withdrawn (which was given to the module during the CASH_REQUEST message) from the balance data that it held. This saved a bit of time as it did not need to make another connection for data it could work out itself.

For the cash dispenser, balance data was obviously used to check if the customer was authorized for the amount they have requested; however, the module also made a call into the debit method of Account, allowing Account to then use TopEnd methods to update the account details stored on the legacy host. The module worked by not debiting the account until the cash had been withdrawn. This was noticeable in a slight delay between pressing the 'Take Cash' button, and the user interface displaying either 'Your receipt is being printed' or 'Thank you for your service' to the customer.

Hardware Control

Referring again to FIG. 32 showing a simplified picture of the UTTA prototype architecture, an area so far untouched concerns the control of real ATM hardware by the Java software.

Eventually, an aim of the Ultra Thin Client project was to embed Java processors into the modules themselves, so all hardware control would be done directly. However, in the prototype, the hard ware was controlled a full PC core, talking to the module hardware via the SDC communication method. This was done with a PC running Microsoft NT4, which contained software allowing it to run as a Self Service Terminal (SST), based on a personaS platform. The Serial Distributed Control (SDC) communications system was used to interface the processor with the hardware.

Ulysses

The software used to control the hardware is Ulysses, an API of C code commands to perform common tasks with whatever module hardware is chosen, be it a card reader, a receipt printer, or both.

This prototype project concerned itself with running a card reader—an F280 personaS model, which can read and write to all three tracks on a card. The standard Java card reader, which was already developed, simulated the common tasks with interface buttons that could be pressed whenever the user needed to 'Insert Card', or 'Remove Card'. The hardware interface took this one step further, allowing a user to interact with the UTTA ATM as usual, but with the added realism of being able to perform all magnetic card operations with a read card reader. When the user interface displayed 'Please Insert Card', a card could be popped into the hardware, activating a response in the Java software, which then continued as normal —it did not actually care (or know) if the response came from a button on screen, or from a real piece of metal and wires.

Communication between the Java card and the 'Windows' program was achieved using network sockets again, similar to how the peer to peer messaging worked. This time, however, the commands passed between the two systems were even simpler, as plain text statements told the program what to do. For example, when the UTTA ATM started up, the first thing the card reader module would do is enable the hardware to accept cards. If this is not done then the actual hardware should not allow a customer to insert a card into it. The following steps would occur:

1. Java sends out ACCEPT_CARD to Windows.
2. Windows intercepts this message and decides upon an action to take.
3. In this case, it used a Ulysses function call to tell the hardware to accept cards from customers.
4. When Windows received a response from the hardware (saying that it will accept cards), then it passed this message back to Java.
5. Java then completed the process by informing the other modules that cards could be inserted. At this point the user interface would now display 'Please Insert Card'.

Note that in points 3 and 4, Windows made a call to the hardware and then waited for a response. Everything that happened between the software and hardware was based on this command and response concept. If Windows sent out an ACCEPT_CARD command, it expected a (solicited) response confirming this action. However, there were also unsolicited messages that could be generated by the hardware. These were messages that Windows knows may happen—it just does not know when. For example, a customer inserting or removing a card from the hardware would cause these messages to be sent. There is no way for the software to know exactly when a customer might perform these actions.

Figure 52:
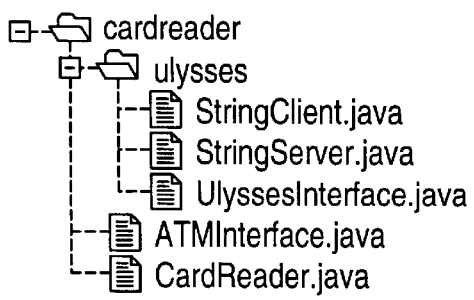
FIG. 52 is a software file directory listing of software used to control a card reader networked peripheral device or module used in a prototype Ultra Thin Client Team application architecture for a simulated ATM terminal, according to one possible embodiment of the invention.

The files involved in all of this could be found in several folders, as shown in FIG. 52. The Java files were part of the UTTA package as usual; however, this new implementation of a card reader used the same file names as the old one. Care was taken to ensure that Java and Ulysses CardReader classes were kept separate, with the correct classes being used as appropriate. Note also, that this version no longer included an ErrorDialog class, as there was no need for the software to simulate the hardware errors any more.

The additional classes inside the Ulysses folder were part of a whole new package—utta.cardreader.ulysses, which contained specific classes with no other purpose other than to talk to a Windows program.

This program, named UlyssesApp, was located in a folder named after itself—UlyssesApp. The source files for it (.cpp and .h) were found in UlyssesApp\, with the actual executable (.exe file) in UlyssesApp\Debug\.

Card Reader Class Modifications

Naturally, some changes were required to the CardReader class to enable it to work with real hardware. The standard card reader that simulates the hardware does so by running through several methods that correspond to certain card reader events, such as insertCard and ejectCard. These methods were replaced by extra calls to the Windows NT machine, which would then execute those commands on the hardware itself.

First though, a way for Java to talk to Windows had to be devised. It has already been mentioned that the actual communication takes place using sockets that send and receive the most basic of ASCII strings, however, extra classes were needed to get these messages to and from between Windows and the new server and client that handled these messages.

To achieve this, a class was created that provided the Java card reader with a number of standard methods that it could call, such as sendMessage and getMessage—both similar in operation to the methods of MessageApp, used for the peer to peer messaging. This new class, ATMInterface, provided the high level Java card reader with extremely simply calls that it could make that correspond to the rest of its application flow. For example, when a customer inserted a card, Java received the response via ATMInterface. The actual CardReader class did not know where this response came from, it only knew that a card had been inserted. Again it could use ATMInterface to make a READ_CARD call— whatever happened after that did not matter, as eventually the response data would be returned via ATMInterface to CardReader.

Figure 53:
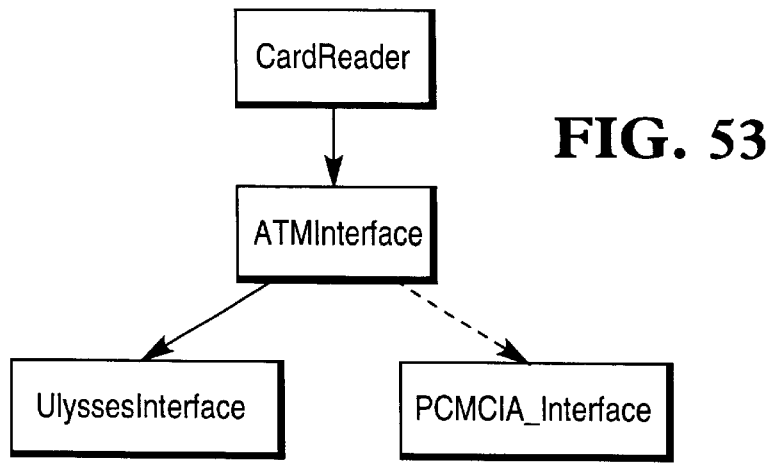
FIG. 53 is a is a simplified block diagram of possible interface relations for controlling a card reader networked peripheral device or module in a Thin Client Team application architecture for an ATM terminal, according to one possible embodiment of the invention, FIG. 54 s a screenshot of a display window associated with the operation and testing of a card reader networked peripheral device or module in a prototype Ultra Thin Client Team application architecture for a simulated ATM terminal, according to one possible embodiment of the invention.
Figure 54:
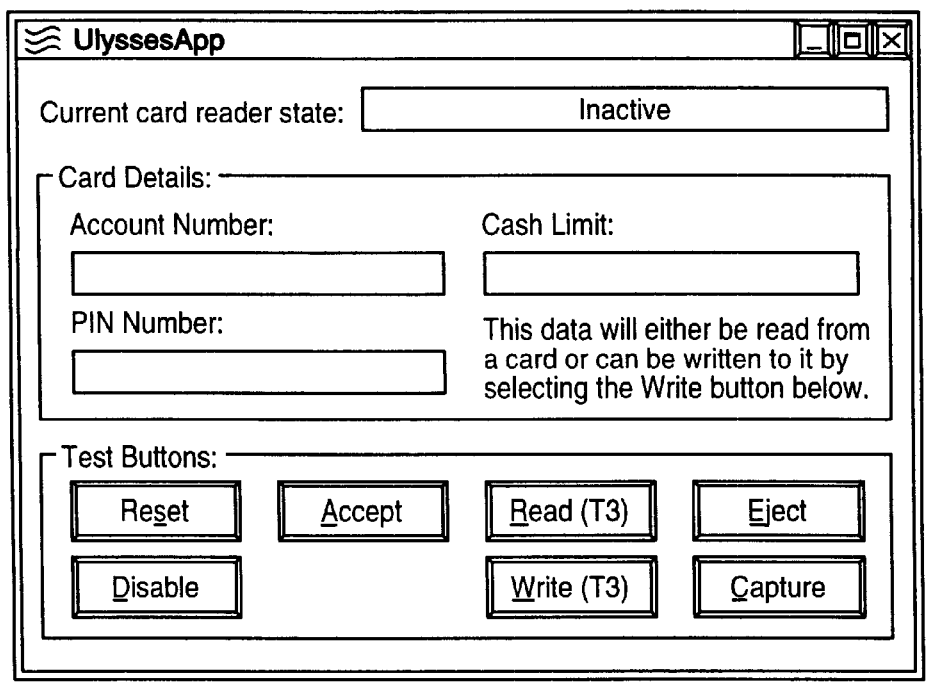

Use of the fact that the CardReader class did not know about the hardware would allow several things. By subclassing ATMInterface into a more generic UlyssesInterface, functions required for talking to Windows, as well as a server and client to handle the networking were enabled. If it was decided to control the hardware a different way, say using PCMCIA, then all that may have to be done is create another sub class of ATMInterface that had methods for handling that. These interface concepts are shown in FIG. 53.

The new classes—UlyssesInterface, StringServer and StringClient—were all created in there own package, which was in a sub-folder of Cardreader, called Ulysses. The server and client routines were practically identical to the message package ones. The only difference being that they now sent and received text messages rather than full blown Java classes. In fact, there probably would not have been any need for them at all if Java could handle templates.

To get the incoming responses back up to the CardReader level, a number of methods were used. Firstly, when the server (which was controlled by UlyssesInterface) received a message it passed it back to its parent. By decoding the message, which also contained T-Code data appended to the end of the string, UlyssesInterface could decide what ActionListener message to pass back up to Java. Although the main card reader thought was dealing with an instance of ATMInterface, it was actually working with UlyssesInterface, thanks to inheritance.

UlyssesApp—Controlling Hardware via Windows

How a Windows program was used to actually control the hardware will now be discussed. In the prototype, Java sent commands to this program, which in turn had to return responses, either solicited or unsolicited—just the same as the hardware itself does.

To get all this to work, the program (called UlyssesApp) had to do several things:
1. Register itself with the hardware, and let it know that responses must be send to its window.
2. Set up a server that could listen for incoming messages from Java.
3. Decode those messages and decide what command to send to the hardware.
4. Listen for responses from the hardware and immediately pass that response on to Java.
5. 'Unlock' itself from the hardware when it was finished.

Many of the function calls found within the UlyssesApp program were part of the Ulysses API that was used to enable the application to control the card reader. Numbers 1 and 5 above relate directly to this API—they were carried out in order for everything to work correctly. If you did not register the window at start-up then no responses would be received from the hardware, and similarly, if you did not unlock the server when finished, no other programs (or the same program if loaded again) were be able to access the card reader.

UlyssesApp was a dialog-based program—that is, it was really nothing more than a simple window that could display text and a few controls. It was nowhere near as complicated as a normal Windows program that may have multiple windows, menus and controls. There are four main files in the UlyssesApp project that help illustrate how the program worked.

UlyssesDlg.cpp and UlyssesDlg.h—these two files defined the dialog itself. The majority of the code for the whole application was located in the *.cpp file.

Message.h—this was used to define user message-maps that were used in addition to the standard message-maps, such as WM_CLOSE or WM_DESTROY.

Server.h—this defined a function that could listen for messages from Java, posting them on to the main dialog when received.

The message-maps played a very important role in the operation of the application. Obviously, the normal message-maps for button presses and window commands were still present, but we needed to define several new ones. The module server, which ran as a thread (in its own file) had to be able to inform the dialog of when a message had arrived. It did this by first decoding the text message and then deciding on a suitable message map that it could post to the dialog. By adding in message-map handlers in the main dialog, code could be included that ran whenever one of these messages was received.

Secondly, the hardware communicated with the application by sending a message to it, informing the dialog of a response. Ulysses API calls could then be made to retrieve the actual message, which was then be processed and sent to Java.

Additional Control of the Card Reader

However, just writing a program that responded to Java commands, and then passed these commands on to the hardware was not enough. What was wanted was full control of the hardware (so you could write your own cards with account numbers that were relevant to you, as in the case of TopEnd), as well as the ability to let Java use the program as an interpreter.

Therefore, additional control buttons were added to the interface of the application that allowed a user to directly issue commands to the hardware without having to run the Java ATM. These can be seen in the screenshot in FIG. 54.

The UlyssesApp program for controlling card reader hardware output responses it received to the dialog window.

However, these messages were not translated much from the form in which they were received from the hardware. The table in FIG. 58 summarizes the T-Code data that accompanies the messages, explaining what each code stands for.

The interface was split up into three main areas. At the top, an output area was used to display the responses returned from the hardware. The output took the form of the command response, for instance ACCEPT or UNSOLIC, and also included the T-Code data associated with it.

The second area of the interface was labeled 'Card Details', and had two purposes. Firstly, w hen data was read from the card it was displayed in the appropriate boxes of this area. However, when a card was inserted, it was possible for the user to change the data in any of the boxes—using the 'Write' button would cause this new data to be written to the card.

There were seven control buttons available for use, although when interfacing with Java the commands RESET and DISABLE were not used. When Java commands were received by the program, it simply called the corresponding code that would be executed had the button with that command been pressed. This removed any need for duplicate code. However, it did mean that if the buttons were used to control the hardware, responses would still be sent to Java, whether it was active or not.

Figure 55:
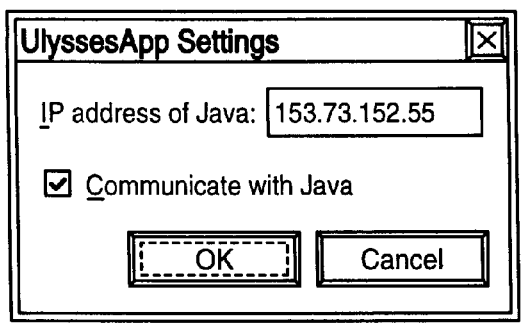
FIG. 55 is a screenshot of a display window associated with the user control of Java communications for testing of a prototype Ultra Thin Client Team application architecture for a simulated ATM terminal, according to one possible embodiment of the invention, FIGS. 56A, B and C are listings and descriptions of Java program files used for operation and control of networked peripheral devices or modules in a prototype Ultra Thin Client Team application architecture for a simulated ATM terminal, according to one possible embodiment of the invention.

To avoid network problems if the application failed the connection to the receiving module, a small settings dialog was included that allowed the user to specify two things—the IP address of the machine that the Java program was running on and also whether to send responses to Java or not. The dialog window is shown in FIG. 55.

Switching off Java communications meant the control buttons on the main dialog could be used for the prototype without the worry of network connections failing.

The settings box could be displayed in the application in the same way as the ErrorDialog boxes were used by the Java modules—a double-click of the mouse anywhere on the form would call up the window.

Format of the Card Data

There is a further section that will be discussed concerning the UlyssesApp program—how the data stored on the card was actually used by the Java ATM modules.

Magnetic card data can be stored across three tracks of a card, but for the purposes of this project only Track 3 was used. The card reader itself can handle a stream of data up to 105 bytes in length. According to the protocol used, this data must begin with the sentinel ';' and finish with '?'. However, when actually writing to the card you generally do not include it as the card reader will add it itself. It is usually only when reading data from a card you need to worry about the extra two bytes.

After the ';' two more characters are used—0 and 1. Standard cards then usually include the account number next. Pieces of data in the cards are separated with using a double equals—'=='. Data after the account number will usually contain encrypted PINs, etc., but here we were not concerned about card security. Therefore, the UlyssesApp program expected data on a card to be in this format:

;01ACCOUNT_NUMBER==PIN_NUMBER==MAX_AMOUNT==000, . . . , 000?

Where MAX_AMOUNT is the maximum daily cash amount a customer could still withdraw with that card. The zeros at the end of the data stream were used to fill it out to around 84 bytes in size.

When the data was read off the card, the three main areas were split up and displayed in the text boxes on the dialog. Each string of data was then passed to Java in a separate message. All data was stored as strings (and not integers) for ease of use—some account numbers can be up to 16 characters in length, which would generally too big a number to practically store as an integer.

Java and C++ Class Files

The Java classes for the prototype UTTA software package are listed in FIGS. 56A, B and C listed in package order, with files within a package listed alphabetically. The main purpose of each class in the UTTA package is described in the figures. FIG. 57 provides similar information for the C++ classes and files involved in the prototype UlyssesApp program for card reader control.

While various embodiments and examples of the invention have been described, it will be understood that the invention may be otherwise embodied and is intended to be defined and limited only by the scope of the following claims.

What is claimed is:

1. A banking or retail transaction network comprising a server and one or more transaction terminals, each of the transaction terminals containing a plurality of peripheral devices adapted to function as constituents of the transaction terminal operating through the server in the transaction network, wherein the server is arranged to store applications and driver software for the peripheral devices and communication links are provided from the server to the peripheral devices so that the server and the peripheral devices can communicate independently of the transaction terminal to enable the applications and driver software to be downloaded directly from the server to the peripheral devices.

2. A network according to claim 1 in which the peripheral devices include their own embedded processors to which the communication links are able to download software from the server.

3. A network according to claim 2 in which the devices each include hardware control elements controlling the hardware of the device and the processor embedded in a device operates the hardware control elements in a manner determined by the software downloaded to the processor through the communications link.

4. A network according to claim 1 in which the communication links also enable the peripheral devices of a terminal to communicate with each other.

5. A network according to claim 1 in which the peripheral devices are selected from the following peripheral devices, namely: a user interface, a card reader, a receipt printer, a cash dispenser, and a bar code scanner.

6. A network according to claim 5 in which one of the peripheral devices is a card reader capable of reading from and writing to smart cards.

7. A network according to claim 5 in which one of the peripheral devices is a user interface comprising a keyboard and a display unit.

8. A network according to claim 1 in which the communication links are dedicated links.

9. A banking transaction network according to claim 1 in which the communication links comprise a modem and information signal transfer media enabling transfer of signals from the modem through a telephone network to a server.

10. A banking transaction network according to claim 1 in there is provided a banking information database and a communications link between the banking information database and the central server.

11. A banking transaction terminal including a plurality of peripheral devices adapted to function as constituents of the banking transaction terminal in which communication links are provided from individual devices to link said devices directly to an external server, wherein the external server and the peripheral devices can communicate independently of the banking transaction terminal.

12. A terminal according to claim 11 in which internal communication links are also provided between the peripheral devices to enable such devices to communicate directly with each other.

13. A terminal according to claim 11 in which the peripheral devices are selected from the following peripheral devices, namely: a user interface, a card reader, a receipt printer, a cash dispenser, and a bar code scanner.

14. A terminal according to claim 13 in which the user interface comprises a keyboard and a display unit.

15. A terminal according to claim 11 in which the communication links are dedicated links.

16. A terminal according to claim 11 in which the communication links comprise a modem and information signal transfer media enabling transfer of signals from the modem through a telephone network to a server.

17. A banking transaction network comprising a plurality of banking transaction terminals according to claim 11 together with a central server to which each of the communication links from the individual peripheral devices of the terminals are connected.

18. A banking transaction network comprising a plurality of banking transaction terminals, each of the banking transaction terminals including a plurality of peripheral devices adapted to function as constituents of the banking transaction terminal in the banking transaction network, a central server, and communication links from the terminals to the server characterized in that the links extend from each individual peripheral device in a terminal directly to the server so that the central server and the peripheral devices can communicate independently of the banking transaction terminal.

19. A network according to claim 18 in which there is provided a banking information database and a communications link between the banking information database and the central server.

20. A transaction network comprising a server and at least one terminal, each terminal containing a plurality of peripheral devices adapted to function as constituents of the transaction terminal operating through the server in the transaction network, the network being characterized in that the server is arranged to store software for the peripheral devices, and communication links are provided from the server to each peripheral device, whereby each peripheral devices is operable to download software directly from the server independently of the terminal.

21. A transaction network according to claim 20, where each peripheral devices is operable to configure itself using the downloaded software.

22. A transaction network according to claim 20, where the software stored on the server includes applications software and peripheral driver software.

23. A transaction network according to claim 20, where each peripheral device includes an embedded processor that operates with the communication links to download software from the server.

24. A transaction network according to claim 23, where each peripheral device includes hardware control elements controlling the hardware of the peripheral device, and the embedded processor operates the hardware control elements in a manner determined by the downloaded software.

25. A transaction network according to claim 20, where each peripheral device has a non-volatile memory for storing boot-up information, whereby, on powering the peripheral device, the contents of the non-volatile memory may be used for initializing the peripheral device.

26. A transaction network according to claim 20, where the peripheral devices communicate with the server using the TCP/IP protocol.

27. A transaction network according to claim 20, where the communication links also enable the peripheral device of a terminal to communicate with each other.

28. A transaction network according to claim 20, where the peripheral devices are selected from the following peripherals, namely: a user interface, a card reader, a receipt printer, a cash dispenser, and a bar code scanner.

29. A transaction network according to claim 20, where an information database is in communication with the server.

30. A transaction network according to claim 20, where the communication links include a router for concentrating information from the peripheral devices and transmitting that information across a single connection.

31. A transaction terminal including a plurality of peripheral devices adapted to function as constituents of the transaction terminal, each of the peripheral devices having communication hardware for use in connecting to a server, whereby, in use, each peripheral device is operable independently of the transaction terminal to access the server and to download software directly therefrom.

32. A transaction terminal according to claim 31, where the peripheral communication hardware is an Ethernet adapter.

33. A transaction network system comprising a server and at least one terminal, each terminal containing a plurality of peripheral devices adapted to function as constituents of the terminal operating through the server in the transaction network system, where the server stores a plurality of independent software modules, where at least one software module is associated with each peripheral device, and where communication links are provided from the server to each peripheral device so that the server and the peripheral devices can communicate independently of the terminal, whereby each peripheral device is operable to download one or more of the independent software modules directly from the server and to configure itself using the one or more downloaded software modules.

34. A transaction processing terminal including a plurality of modular elements that intercommunicate through a connected sub-network using IP protocols and that adapted to function as constituents of the transaction processing terminal operating through a remote server in a transaction network, and a router that concentrates communications between the modular elements and the remote server through a single IP protocol connection to the server, wherein the remote server and the modular elements can communicate independently of the transaction processing terminal to enable applications and driver software stored on the remote server to be downloaded directly from the remote server to the modular elements.

35. A peripheral device adapted to function as a constituent for a transaction processing terminal, the peripheral device including a dedicated processor, read/write memory, an I/O port, and a communication link to a remote server, wherein the peripheral device is configured for installation of software by download from the remote server independently of the transaction processing terminal using a Dynamic Host Control Protocol service when the peripheral device is initialized.

36. A peripheral device adapted to function as a constituent for a transaction processing terminal, the peripheral device including a dedicated processor, read/write memory, an I/O port, and a communication link to a remote server, wherein the peripheral device is configured for re-booting of the peripheral device initiated through the remote server independently of the transaction processing terminal over a connected network using a remotely executing Dynamic Host Control Protocol service.

37. A transaction processing terminal comprising a plurality of networked peripheral devices adapted to function as constituents of the transaction processing terminal operating through a remote server in a transaction network, each of the peripheral devices having its own data processor controlling operations of the device through execution of software applets downloaded to the device over the network from the remote server independent of the transaction processing terminal.

38. A transaction processing terminal comprising a plurality of networked peripheral devices adapted to function as constituents of the transaction processing terminal operating through a remote server in a transaction network, each of the peripheral devices having its own data processor controlling operations of the device through execution of software applets downloaded to the device over the network from the remote server independent of the transaction processing terminal via Web browser functioning incorporated within the device.

39. A transaction processing terminal comprising a plurality of networked peripheral devices adapted to function as constituents of the transaction processing terminal operating through a remote server in a transaction network, each of the peripheral devices having its own data processor controlling operations of the device through execution of interpreted software applets downloaded to the device over the network from the remote server independent of the transaction processing terminal and interpreted via virtual machine functioning incorporated within the device.

40. A transaction processing terminal comprising a plurality of networked peripheral devices adapted to function as constituents of the transaction processing terminal operating through a remote server in a transaction network, each of the peripheral devices having its own data processor controlling operations of the device through execution of compiled software byte code downloaded to the device over the network from the remote server independent of the transaction processing terminal and compiled via compiler functioning incorporated within the device.

41. A transaction processing terminal comprising a plurality of networked peripheral devices adapted to function as constituents of the transaction processing terminal operating through a remote server in a transaction network, each of the peripheral devices having its own data processor that directly executes byte code downloaded to the device over the network from the remote server independent of the transaction processing terminal to control operations of the device.

42. A banking or retail transaction terminal comprising a plurality of peripheral devices adapted to function as constituents of the transaction terminal operating through a remote server in a transaction network, each of the peripheral devices having control applications associated therewith, communication links for enabling the control applications to have individual access to an external server independent of the transaction terminal, and a central processor for providing processing power for the peripheral devices.

* * * * *